US012688747B2

(12) United States Patent
Cost

(10) Patent No.: US 12,688,747 B2
(45) Date of Patent: Jul. 21, 2026

(54) MULTI-MODE BULK BANKNOTE FEEDER

(71) Applicant: Crane Payment Innovations, Inc., Malvern, PA (US)

(72) Inventor: Evan John Cost, Audubon, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 84 days.

(21) Appl. No.: 18/291,901

(22) PCT Filed: Jul. 28, 2022

(86) PCT No.: PCT/US2022/074274
§ 371 (c)(1),
(2) Date: Jan. 24, 2024

(87) PCT Pub. No.: WO2023/010091
PCT Pub. Date: Feb. 2, 2023

(65) Prior Publication Data
US 2025/0095428 A1 Mar. 20, 2025

Related U.S. Application Data

(60) Provisional application No. 63/226,705, filed on Jul. 28, 2021.

(51) Int. Cl.
*G07D 11/16* (2019.01)
*B65H 1/14* (2006.01)
(Continued)

(52) U.S. Cl.
CPC ............... *G07D 11/16* (2019.01); *B65H 1/14* (2013.01); *G07D 11/14* (2019.01); *G07D 11/20* (2019.01);
(Continued)

(58) Field of Classification Search
CPC ... B65H 1/08; B65H 1/10; B65H 1/12; B65H 1/14; B65H 1/16; B65H 1/18; B65H 7/02; G07D 11/14; G07D 11/16
See application file for complete search history.

(56) References Cited

U.S. PATENT DOCUMENTS 4,361,318 A 11/1982 Stobb
5,429,347 A 7/1995 Leonard
(Continued)

FOREIGN PATENT DOCUMENTS

CN 104150250 A 11/2014
CN 109850615 A 6/2019
(Continued)

OTHER PUBLICATIONS

International Search Report and the Written Opinion of the International Searching Authority dated Nov. 1, 2022, in connection with International Application No. PCT/US2022/074274, 11 pages.
(Continued)

*Primary Examiner* — Patrick Cicchino

(57) ABSTRACT

A bulk banknote feeder can operate in a single banknote feeding mode or a bulk banknote feeding mode. The bulk banknote feeder can include an accept inlet and a landing platform installed in the accept inlet. The landing platform assembly includes a landing platform, landing platform pins, landing platform cranks, position gears, and one or more springs. The landing platform includes slots perpendicular to a motion of the landing platform. The landing platform pins interface to the slots of the landing platform. The landing platform cranks interface with the landing platform pins. The position gears include slots to allow pressure pins to travel within the position gears. The one or more springs provide an upward force on the landing platform and the landing platform pins through the landing platform, and the
(Continued)

upward force on the landing platform pins causes the landing platform cranks to rotate.

16 Claims, 49 Drawing Sheets

(51) Int. Cl.
*G07D 11/14* (2019.01)
*G07D 11/20* (2019.01)
(52) U.S. Cl.
CPC ............................ *B65H 2403/5331* (2013.01); *B65H 2511/414* (2013.01); *B65H 2701/1912* (2013.01)

(56) References Cited

U.S. PATENT DOCUMENTS

| | | | | |
|---|---|---|---|---|
| 5,932,313 | A | 8/1999 | Barton | |
| 6,318,714 | B1 * | 11/2001 | Beskitt | G07D 11/40 414/796.5 |
| 8,342,515 | B2 * | 1/2013 | Iwata | B65H 3/0669 271/248 |
| 8,622,189 | B2 * | 1/2014 | Morino | G07D 11/50 194/206 |
| 10,504,315 | B2 * | 12/2019 | Dunn | B65H 3/047 |
| 10,665,064 | B2 * | 5/2020 | Harty | B65H 1/14 |
| 2003/0057220 | A1 | 3/2003 | Abe et al. | |
| 2003/0080495 | A1 | 5/2003 | Abe et al. | |
| 2007/0152396 | A1 | 7/2007 | Tanahashi et al. | |
| 2008/0142583 | A1 | 6/2008 | Yokoi et al. | |
| 2009/0314839 | A1 | 12/2009 | Saltsov et al. | |
| 2011/0169213 | A1 | 7/2011 | Iwata | |
| 2012/0006646 | A1 | 1/2012 | Morino et al. | |

FOREIGN PATENT DOCUMENTS

| | | | | |
|---|---|---|---|---|
| JP | 07137883 A | | 5/1995 | |
| JP | 2003123123 A | | 4/2003 | |
| JP | 2004133676 A | | 4/2004 | |
| JP | 4746189 B2 | | 8/2011 | |
| JP | 2018128971 A | | 8/2018 | |
| WO | WO-2021140549 A1 | * | 7/2021 | B65H 1/14 |

OTHER PUBLICATIONS

Examination Report No. 1 dated Jan. 22, 2025, in connection with Australian Application No. 2022320805, 3 pages.
Extended European Seach Report dated Jun. 2, 2025, in connection with European Application No. 22850527.7, 8 pages.
Office Action dated May 22, 2026, in connection with Chinese Application No. 202280052504.0, 27 pages.

* cited by examiner

MULTI-MODE BULK BANKNOTE FEEDER

CROSS-REFERENCE TO RELATED APPLICATIONS

This application is a 371 National Stage of International Application No. PCT/US2022/074274, filed Jul. 28, 2022, which claims priority to U.S. Provisional Patent Application No. 63/226,705, filed Jul. 28, 2021, the disclosures of which are incorporated herein by reference.

TECHNICAL FIELD

This disclosure relates generally to automated payment systems. More specifically, this disclosure relates to an architecture of a multi-mode bulk banknote feeder implementation within a banknote deposit-withdrawal system or other system.

BACKGROUND

Banknote deposit-withdrawal systems can be included in cashier safes, gaming machines, cashier-assisted automated cash handling systems, change providing systems, self-service terminals such as self-checkout terminals, vending machines, ticket dispensers, photocopiers, ATMs, and the like. In banknote deposit-withdrawal systems, a bulk banknote feeder allows for individual insertion of a banknote bunch. Bulk banknote feeders, by necessity, have larger openings than single banknote feeders. The larger opening presents more opportunity for foreign object ingress, such as coins, credit cards, trash, etc. Previous bulk banknote feeders have moving mechanisms at an inlet to provide the necessary pressure on the banknote bunch, which slows down single banknote feeding through the different banknote deposit-withdrawal system or other systems. Thus, current systems have to compromise between single banknote and bulk banknote use cases, such as in reducing an amount of banknotes that are included in a bulk banknote use case. Smaller banknote bunch sizes result in wasted motion and time.

SUMMARY

This disclosure provides a multi-mode bulk feeder device or other system.

In various embodiments, a bulk banknote feeder can operate in a single banknote feeding mode or a bulk banknote feeding mode. The bulk banknote feeder can include an accept inlet and a landing platform installed in the accept inlet. The landing platform assembly includes a landing platform, landing platform pins, landing platform cranks, position gears, and one or more springs. The landing platform includes slots perpendicular to a motion of the landing platform, and the landing platform adjusts in relation to an opposing surface of the accept inlet. The landing platform pins interface to the slots of the landing platform. The landing platform cranks interface with the landing platform pins. The position gears include slots to allow pressure pins to travel within the position gears. The one or more springs provide an upward force on the landing platform and the landing platform pins through the landing platform, and the upward force on the landing platform pins causes the landing platform cranks to rotate.

In various embodiments, a bulk banknote feeder can operate in a single banknote feeding mode or a bulk banknote feeding mode. The bulk banknote feeder can include an accept inlet, a transportation mechanism, a landing platform, a trailing edge sensor, a stacked banknotes sensor, a diverter gate, a separation mechanism, and a processor connected to the stacked banknotes sensor, the separation mechanism, and the transportation mechanism. The accept inlet is structured to receive a banknote bunch. The transportation mechanism is configured to move a banknote along a movement path of the bulk banknote feeder. The landing platform is installed within the accept inlet and is configured to adjust between a single banknote feeding mode and a bulk banknote feeding mode. The trailing edge sensor is installed along the movement path and is configured to detect a trailing edge of the banknote. The stacked banknotes sensor is installed along the movement path and is configured to detect stacked or overlaid banknotes. The diverter gate is installed along the movement path and configured to reroute refused banknotes that have a trailing edge that has moved past the diverter gate along the movement path. The rerouted refused banknotes are routed to a refuse outlet. The separation mechanism is installed along the movement path and is configured to separate stacked banknotes. The processor is configured to identify, using the stacked banknotes sensor, stacked banknotes. The processor is also configured to return, using the transportation mechanism, the stacked banknotes that have not cleared the diverter gate to the separation mechanism. The processor is further configured to separate, using the separation mechanism, the stacked banknotes into single banknotes. In addition, the processor is further configured to move, using the transportation mechanism, the single banknotes through the movement path as the single banknotes are separated from the stacked banknotes.

A bulk banknote feeder system comprising a landing platform, a motor, a shaft coupled to the motor, one or more driving wheels coupled to the shaft, an idle wheel, a spring axel, a tach sensor, separation wheels, and a processor coupled to the motor, the tach sensor, and the separation wheels. The landing platform is for receiving a banknote bunch. The one or more driving wheels is coupled to the shaft, where the motor rotates the one or more driving wheels to advance a top banknote. The idle wheel is in contact with the top banknote and rotates when the top banknote is advanced. The spring axel in which the idle wheel is mounted to maintains contact of the idle wheel with the top banknote. The tach sensor is configured to measure a rotation of the idle wheel. The separation wheels separate the top banknote from a stacked banknote.

In various embodiments, a bulk banknote feeder can include an accept inlet and a processor. The accept inlet can include an adjustable platform. The processor can control the adjustable platform in a single banknote feeding mode to receive single banknotes. The processor can also control the adjustable platform in a bulk banknote feeding mode to receive a banknote bunch of more than one banknote.

In certain embodiments, the adjustable platform is a landing platform at a bottom surface of the accept inlet and is configured to lift the banknote bunch in the bulk banknote feeding mode to a top surface of the accept inlet.

In certain embodiments, the adjustable platform is a top plate at a top surface of the accept inlet and is configured to apply pressure to the banknote bunch against a bottom plate of the accept inlet.

In certain embodiments, the accept inlet further includes a trailing edge sensor on an opposing surface of the accept inlet from the adjustable platform. The processor is further configured to identify a trailing edge of a banknote using the trailing edge sensor.

In certain embodiments, the trailing edge sensor can include an idle wheel, a spring, and a tach sensor. The idle wheel is configured to rotate based on a movement of a first banknote. The spring is positioned through a center of the idle wheel and configured to apply a force on the idle wheel against either the first banknote or a second banknote that is adjacent to the first banknote in the banknote bunch. The tach sensor is configured to measure a rotation of the idle wheel.

In certain embodiments, the trailing edge sensor can further include a driving wheel, a shaft, and a motor. The driving wheel is configured to contact the first banknote. The shaft is coupled to a center of the driving wheel. The motor is coupled to the shaft and configured to rotate the shaft and the driving wheel to the movement of the first banknote by a rotation of the driving wheel contacting the first banknote.

In certain embodiments, a mechanism to move the idle wheel is configured to introduce contact between the idle wheel and the first banknote. The platform is configured to move the idle wheel actively. In certain embodiments, the mechanism to move the idle wheel can be a passive system lifted by a banknote.

In certain embodiments, the bulk banknote feeder further includes ribs applied to each side of the adjustable platform adjacent to sidewalls of the accept inlet.

In certain embodiments, the bulk banknote feeder further includes ribs applied to a sidewall of the accept inlet adjacent to the adjustable platform.

In certain embodiments, the processor is further configured to identify that the idle wheel has stopped rotating. The processor is further configured to control the motor to stop rotating the shaft and driving wheel. In certain embodiments, a braking element is added to the idle wheel to stop the idle wheel from rotating when a banknote is not actively rotating the idle wheel. In certain embodiments, the processor discards signal from the tach sensor of the idle wheel when the last banknote has left the platform.

In certain embodiments, the accept inlet further includes a diverter gate installed along a movement path and configured to reroute refused banknotes that have a trailing edge that has moved past the diverter gate along the movement path to a refuse outlet.

In certain embodiments, the accept inlet further includes a stacked banknotes sensor and a separation wheel. The stacked banknotes sensor is installed along a movement path and configured to detect stacked banknotes. The separation wheel is installed along the movement path and configured to separate the stacked banknotes. The processor is further configured to control the separation wheel to separate the stacked banknotes detected by the stacked banknote sensor.

In certain embodiments, the adjustable platform includes slots perpendicular to a movement of the adjustable platform. The accept inlet further includes pins, position gear, and one or more springs. The pins are interfaced to the slots of the adjustable platform. The position gears include slots to interface with the pins and allow the pins to travel within the position gears. The one or more springs are configured to provide a force on the position gears to rotate the pins and move the adjustable platform towards an opposing surface of the accept inlet.

In various embodiments, a method is provided for a bulk banknote feeder including an accept inlet with an adjustable platform. The method includes controlling the adjustable platform in a single banknote feeding mode to receive single banknotes. The method also includes controlling the adjustable platform in a bulk banknote feeding mode to receive a banknote bunch of more than one banknote.

In certain embodiments, the adjustable platform is a landing platform at a bottom surface of the accept inlet and is configured to lift the banknote bunch in the bulk banknote feeding mode to a top surface of the accept inlet.

In certain embodiments, the adjustable platform is a top plate at a top surface of the accept inlet and is configured to apply pressure to the banknote bunch against a bottom plate of the accept inlet.

In certain embodiments, the method further comprises identifying a trailing edge of a banknote using a trailing edge sensor, where the trailing edge sensor is included in the accept inlet on an opposing surface of the accept inlet from the adjustable platform.

In certain embodiments, the method further comprises moving a first banknote to rotate an idle wheel that has a force applied from a spring to force the idle wheel against either the first banknote or a second banknote that is adjacent to the first banknote in the banknote bunch, wherein the spring is positioned through a center of the idle wheel. The method also further comprises measuring a rotation of the idle wheel using a tach sensor.

In certain embodiments, the method further comprises rotating, using a motor coupled to a shaft with a driving wheel, the driving wheel to cause movement of the first banknote by a rotation of the driving wheel contacting the first banknote.

In certain embodiments, the bulk banknote feeder further includes ribs applied to each side of the adjustable platform adjacent to sidewalls of the accept inlet.

In certain embodiments, the bulk banknote feeder further includes ribs applied to a sidewall of the accept inlet adjacent to the adjustable platform.

In certain embodiments, the method further comprises identifying that the idle wheel has stopped rotating. The method also further comprises controlling the motor to stop rotating the shaft and driving wheel.

In certain embodiments, the method further comprises rerouting, using a diverter gate installed along a movement path, refused banknotes that have a trailing edge that has moved past the diverter gate along the movement path to a refuse outlet.

In certain embodiments, the method further comprises controlling a separation wheel to separate stacked banknotes detected by a stacked banknote sensor. The stacked banknotes sensor is installed along a movement path and configured to detect the stacked banknotes. The separation wheel is installed along the movement path and configured to separate the stacked banknotes.

In certain embodiments, the method further comprises rotating, using one or more springs coupled to position gears, pins to move the adjustable platform towards an opposing surface. The adjustable platform includes slots perpendicular to a movement of the adjustable platform. The pins are interfaced to the slots of the adjustable platform. The position gears include slots to interface with the pins and allow the pins to travel within the position gears. The one or more springs provide a force on the position gears to rotate the pins and move the adjustable platform towards an opposing surface of the accept inlet.

Other technical features may be readily apparent to one skilled in the art from the following FIGURES, descriptions, and claims.

Before undertaking the DETAILED DESCRIPTION below, it may be advantageous to set forth definitions of certain words and phrases used throughout this patent document. The term “couple” and its derivatives refer to any direct or indirect connection between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1A through 8, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

As used throughout this specification, the terms currency denomination, denomination of currency, valuable document, currency bill, bill, banknote, bank check, paper money, paper currency, and cash may be used interchangeably herein to refer to a type of a negotiable instrument or any other writing that evidences a right to the payment of a monetary obligation, typically issued by a central banking authority. In addition, direction, orientation, or axis may be used interchangeably herein to refer to the direction of linear mechanical movement of components. In this specification, the terms banknote storing unit, banknote storage, banknote storing portion, tamper-evident storage, and secured banknote storage may be used interchangeably herein to refer to a type of an instrument or any other device that may store currency from any systems incorporating a banknote acceptor.

A bulk banknote feeder includes a platform mechanism that is designed in such a way that the upper position of the plate may be set by a force applied using a motor, geartrain mechanism, and spring. An initial force applied to the plate pulls the plate down into a "ready" position. The ready position can be anywhere in the travel of the geartrain, which provides greater adjustability for an aperture.

When a banknote bunch is inserted, the bulk banknote feeder can detect the banknote bunch. The geartrain "releases" a plate by moving in an opposite direction. The spring presses the plate against the banknote bunch. The spring applying the force instead of the motor is an advantage by not requiring a precision motor and additional sensors along with calibration. As the banknote bunch is processed, the spring moves the plate upward until the banknote bunch is fully processed. The sequence for a single banknote feeding mode would be a special case for the bulk feed sequence. The differences would be that the ready position of the plate would be at the top of the travel and not require moving during the feeding process. The improvements of the bulk banknote feeder are related to the moving of the landing platform and force being applied by a spring instead of a motor.

The embodiments of a document transport system illustrated in FIGS. 1A through 8 are for illustration only. FIGS. 1A through 8 do not limit the scope of this disclosure to any particular implementation of a document transport system.

Figure 1A:
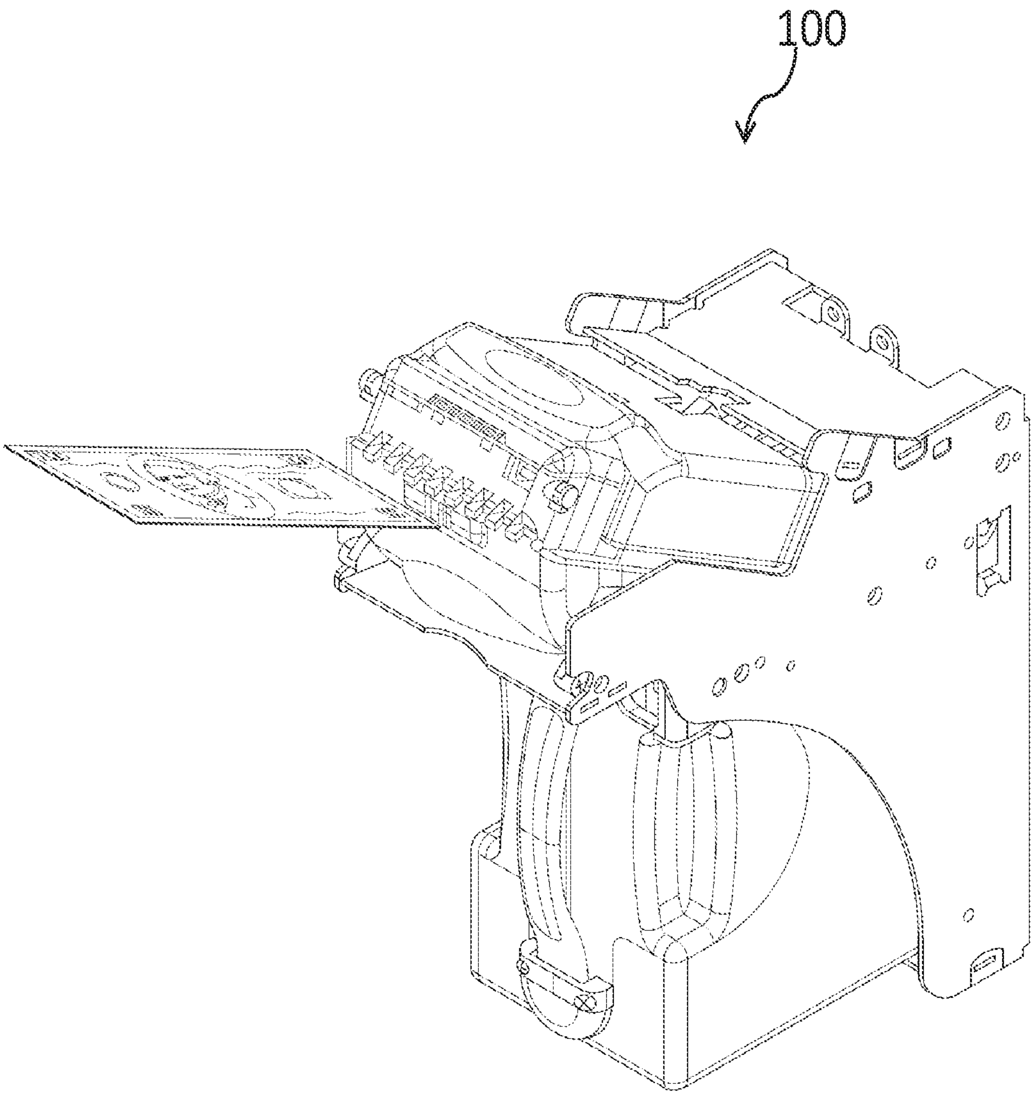
FIG. 1A illustrates an example of a banknote accepting apparatus in accordance with various embodiments of the present disclosure.
Figure 1B:
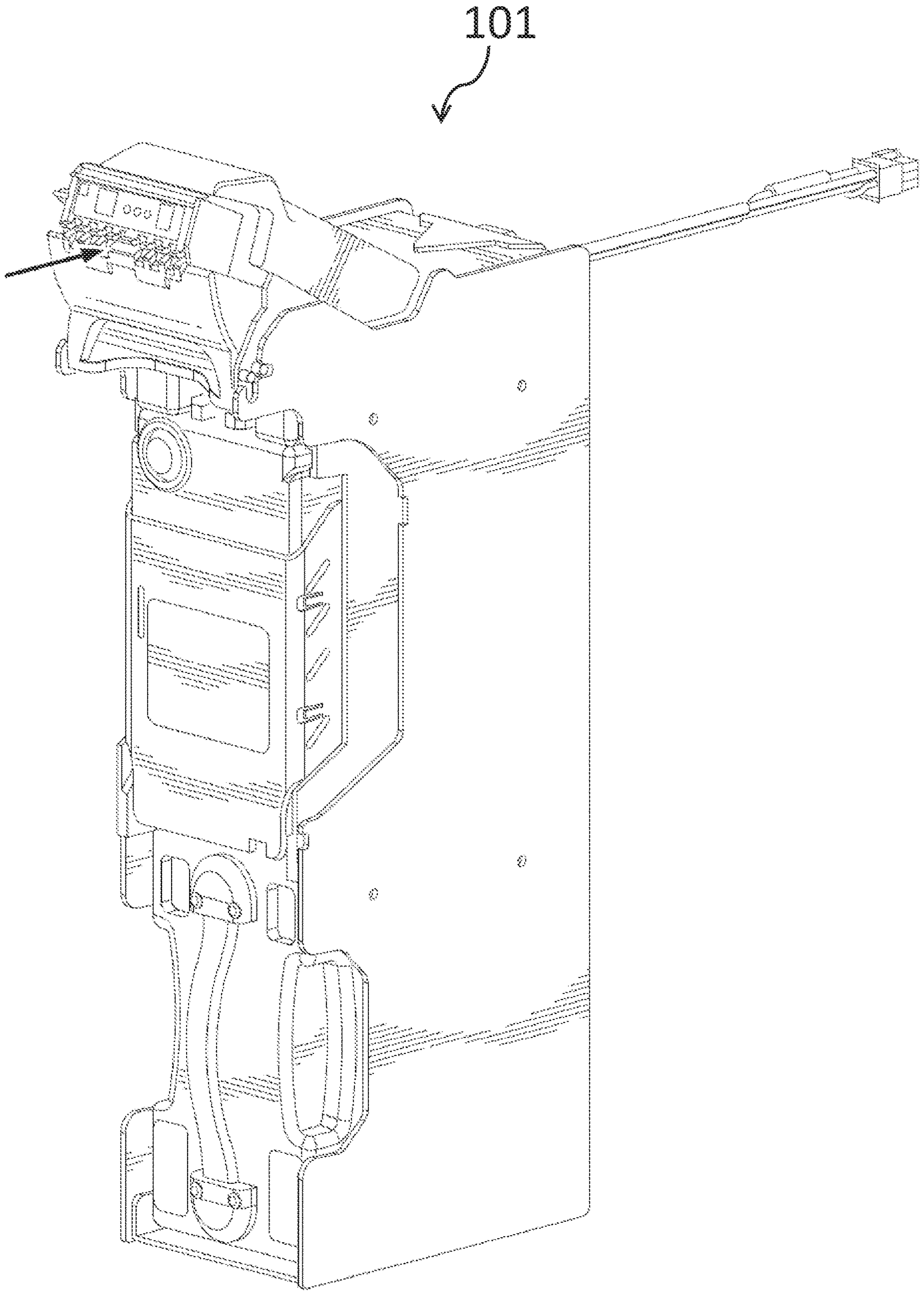
FIG. 1B illustrates an example of a banknote accepting apparatus in accordance with various embodiments of the present disclosure.
Figure 1C:
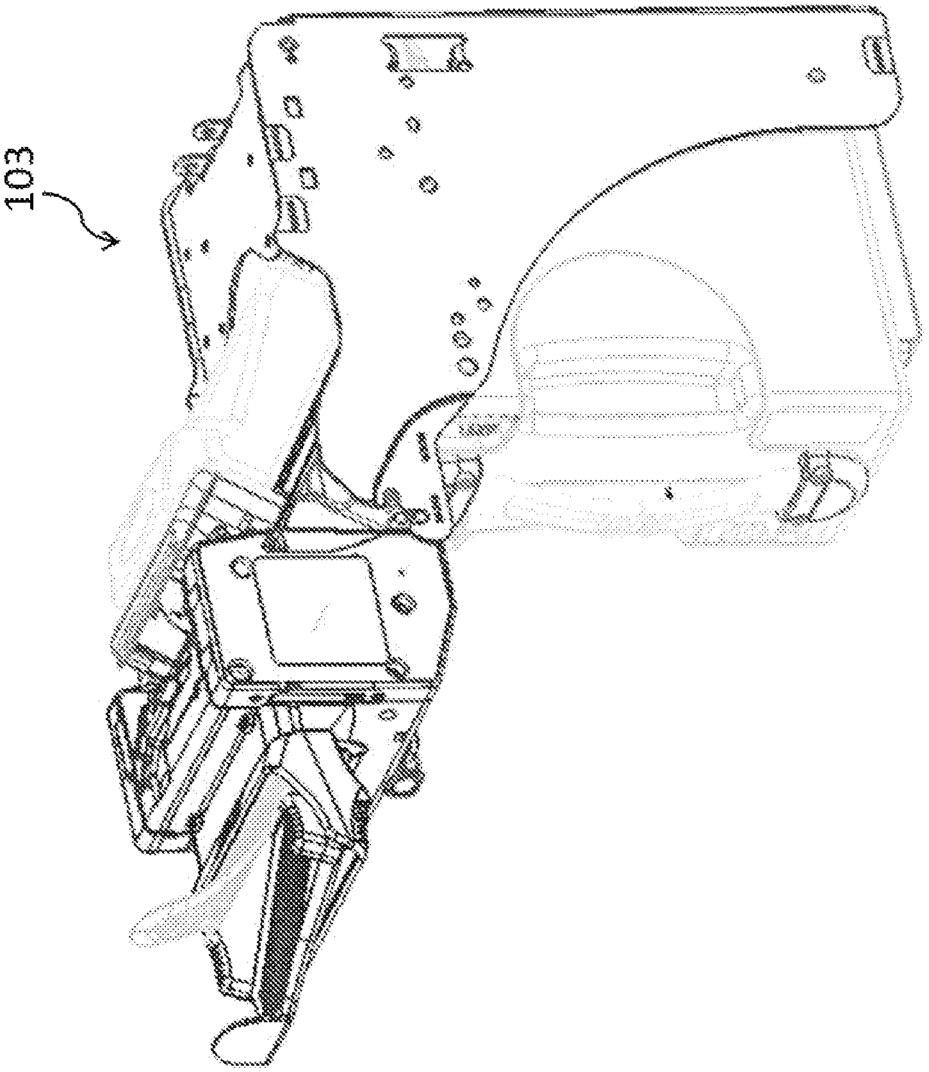
FIG. 1C illustrates an example of a banknote accepting apparatus in accordance with various embodiments of the present disclosure.
Figure 1D:
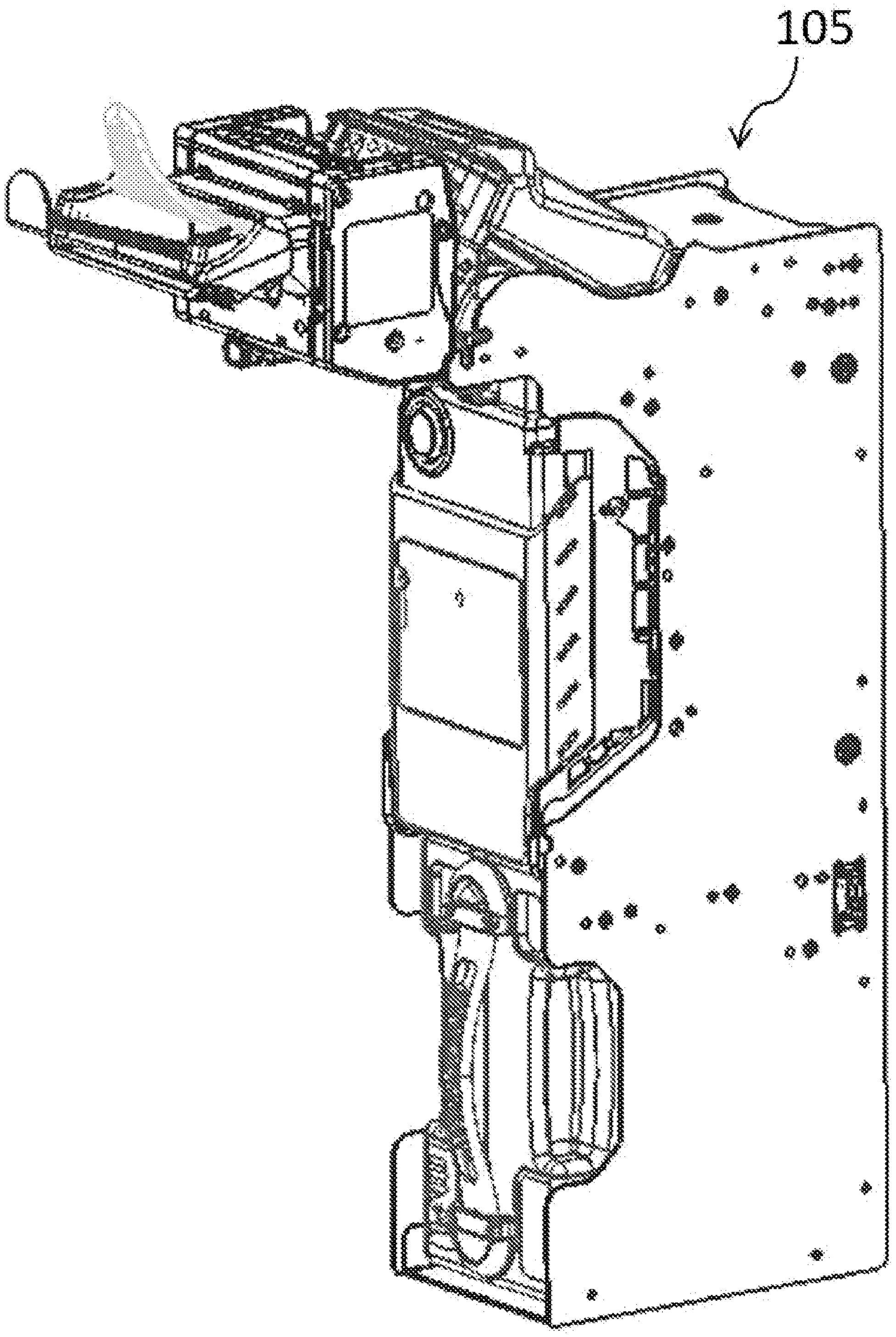
FIG. 1D illustrates an example of a banknote accepting apparatus in accordance with various embodiments of the present disclosure.
Figure 1E:
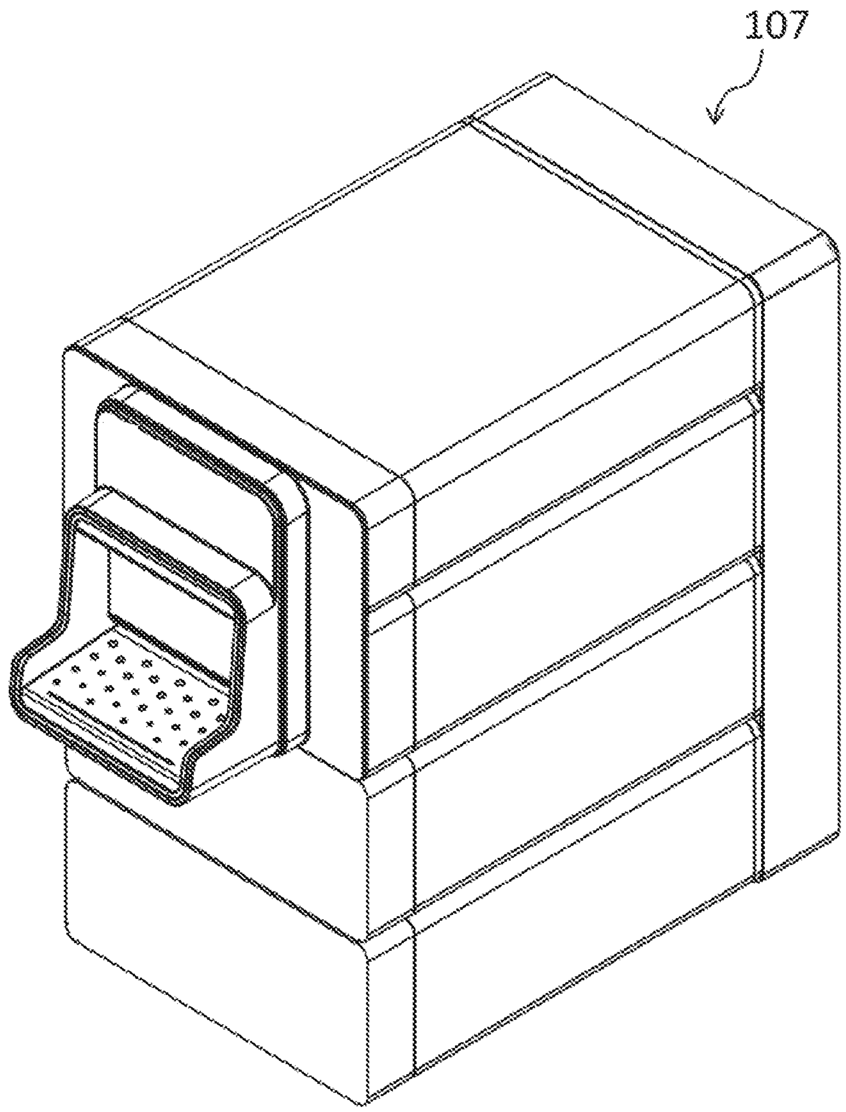
FIG. 1E illustrates an example of a banknote accepting apparatus in accordance with various embodiments of the present disclosure.
Figure 1F:
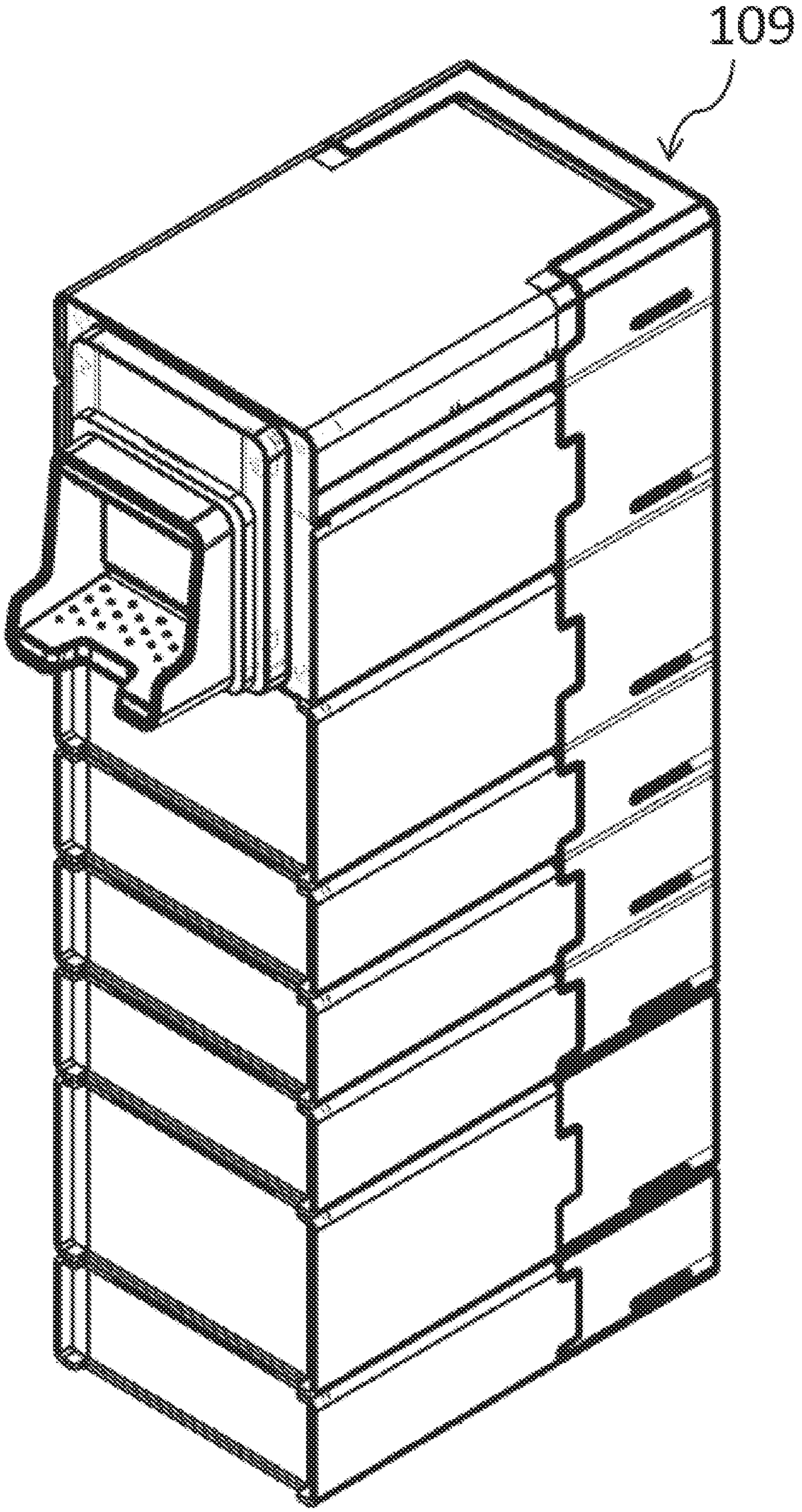
FIG. 1F illustrates an example of a banknote accepting apparatus in accordance with various embodiments of the present disclosure.

FIGS. 1A through 1F illustrate schematic views of banknote acceptor and banknote deposit-withdrawal systems in accordance with various embodiments of the present disclosure. FIG. 1A illustrates an example of a banknote acceptor system 100 in accordance with various embodiments of the present disclosure. FIG. 1B illustrates an example of a banknote deposit-withdrawal system 101 in accordance with various embodiments of the present disclosure. FIG. 1C illustrates an example of a banknote acceptor system 103 in accordance with various embodiments of the present disclosure. FIG. 1D illustrates an example of a banknote deposit-withdrawal system 105 in accordance with various embodiments of the present disclosure. FIG. 1E illustrates an example of a banknote deposit-withdrawal system 107 in accordance with various embodiments of the present disclosure. FIG. 1F illustrates an example of a banknote deposit-withdrawal system 109 in accordance with various embodiments of the present disclosure.

FIG. 1A shows a banknote acceptor system 100 configured to verify the authenticity of the inserted banknote. The banknote acceptor system 100 generally has an acceptor head or bulk banknote feeder, a banknote transport system, and a removable banknote storage unit. Inserted banknotes are generally authenticated in a banknote accepting module using various sensors, once the banknote is deemed authentic and deemed acceptable the banknote is transported further into the banknote acceptor using the banknote transport system into the removable banknote storage unit.

FIG. 1B illustrates a banknote deposit-withdrawal system 101 in accordance with various embodiments of the present disclosure. In addition to a banknote accepting module or bulk banknote feeder, a banknote transport system, and a removable banknote storage unit as shown in FIG. 1A, the banknote deposit-withdrawal system 101 illustrated in FIG. 1B comprises a banknote recycling module that allows the unit to provide banknotes back to the customer. For example, the banknote deposit-withdrawal system 101 could be used in an automated payment system where a customer presents a high denomination banknote to purchase goods or services that are valued more than the value of purchased goods or services and the unit provides lower denomination banknotes to provide change to the customer to assist in completing the transaction. The recycling module may act as an escrow unit that holds the accepted document until the transaction is completed.

FIG. 1C illustrates a banknote acceptor system 103 in accordance with various embodiments of the present disclosure. FIG. 1C shows a banknote acceptor system or bulk banknote feeder configured to receive multiple banknotes in bulk to verify the authenticity of the inserted banknotes in bulk. The banknote acceptor includes an adapter to accept banknotes in bulk, and has a banknote accepting module, a banknote transport system, and a removable banknote storage unit. Inserted banknotes are separated serially and sent to be authenticated in the banknote accepting module using various sensors. Once the banknote is deemed authentic and deemed acceptable, the banknote is transported further into the banknote acceptor using the banknote transport system and into the removable banknote storage unit.

FIG. 1D illustrates a banknote deposit-withdrawal system 105 in accordance with various embodiments of the present disclosure. In addition to a banknote accepting module or bulk banknote feeder, a banknote transport system, and a removable banknote storage unit as shown in FIG. 1C, the banknote deposit-withdrawal system 105 illustrated in FIG. 1D comprises a banknote recycling module that allows the unit to provide banknotes back to the customer. For example, the banknote deposit-withdrawal system 105 could be used in an automated payment system where a customer presents a high denomination banknote to purchase goods or services that are valued more than the value of purchased goods or services and the unit provides lower denomination banknotes to provide change to the customer to assist in completing the transaction. The recycling module may act as an escrow unit that holds the accepted document until the transaction is completed.

FIG. 1E illustrates a banknote deposit-withdrawal system 107 in accordance with various embodiments of the present disclosure. The banknote deposit-withdrawal system 107 includes a banknote accepting module or bulk banknote feeder, a banknote transport system, a removable banknote storage unit, and a banknote recycling module that allows the unit to provide banknotes back to the customer. For example, the banknote deposit-withdrawal system 107 can be used in an automated payment system where a customer presents a high denomination banknote to purchase goods or services that are valued more than the value of purchased goods or services; and the unit provides lower denomination banknotes to provide change to the customer to assist in completing the transaction. The recycling module may act as an escrow unit that holds the accepted document until the transaction is completed.

FIG. 1F illustrates a banknote deposit-withdrawal system 109 in accordance with various embodiments of the present disclosure. The banknote deposit-withdrawal system 109 includes a banknote accepting module or bulk banknote feeder, a banknote transport system and a removable banknote storage unit, an escrow module and multiple banknote recycling modules that allows the unit to provide banknotes back to the customer. For example, the banknote deposit-withdrawal system could be used in an automated payment system where a customer presents a high denomination banknote to purchase goods or services that are valued more than the value of purchased goods or services and the unit provides lower denomination banknotes to provide change to the customer to assist in completing the transaction. The escrow unit holds the accepted document until the transaction is completed.

Figure 2A:
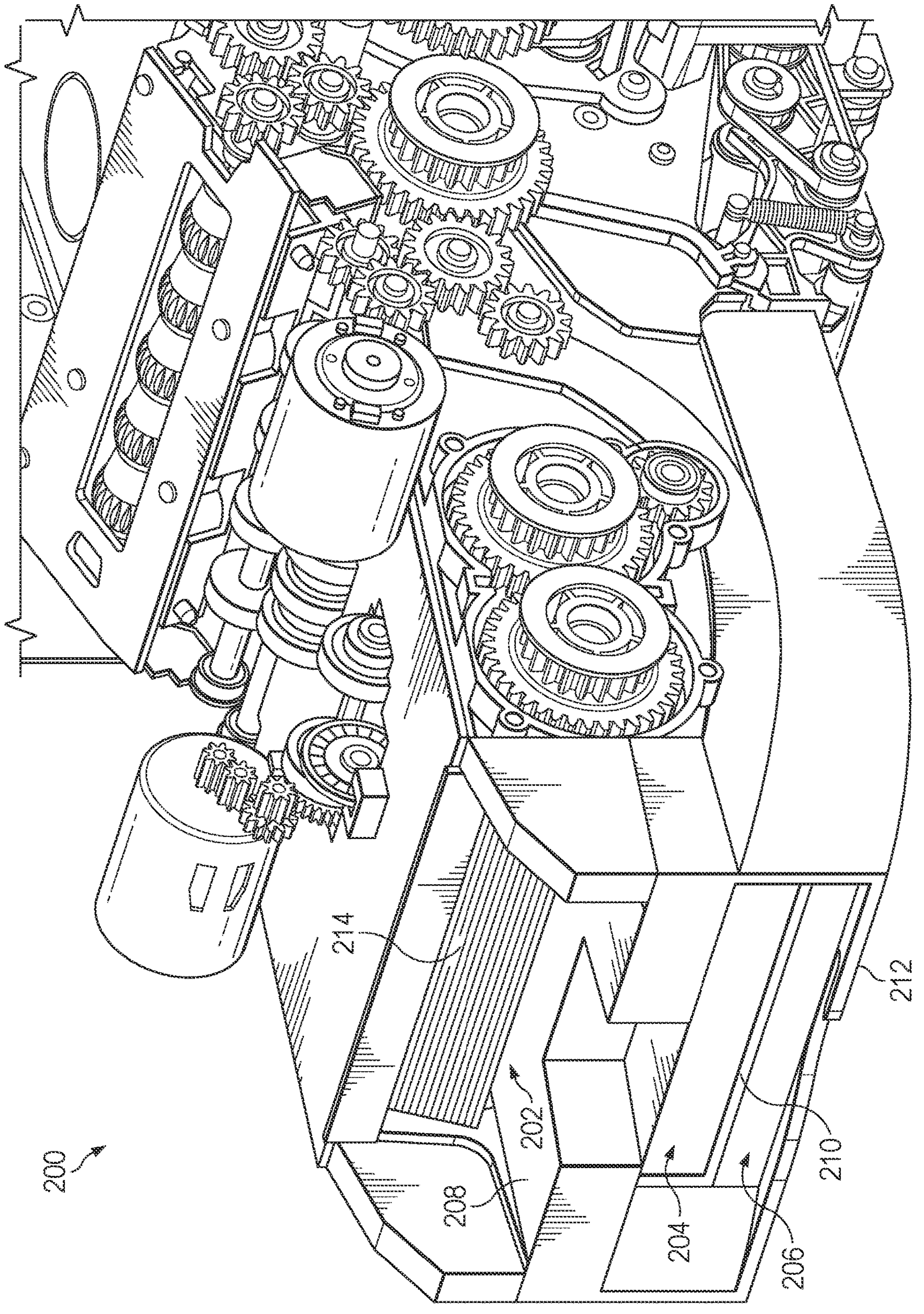
FIGS. 2A through 2F illustrate schematic views of proposed embodiments of a bulk banknote feeder in accordance with various embodiments of the present disclosure.
Figure 2B:
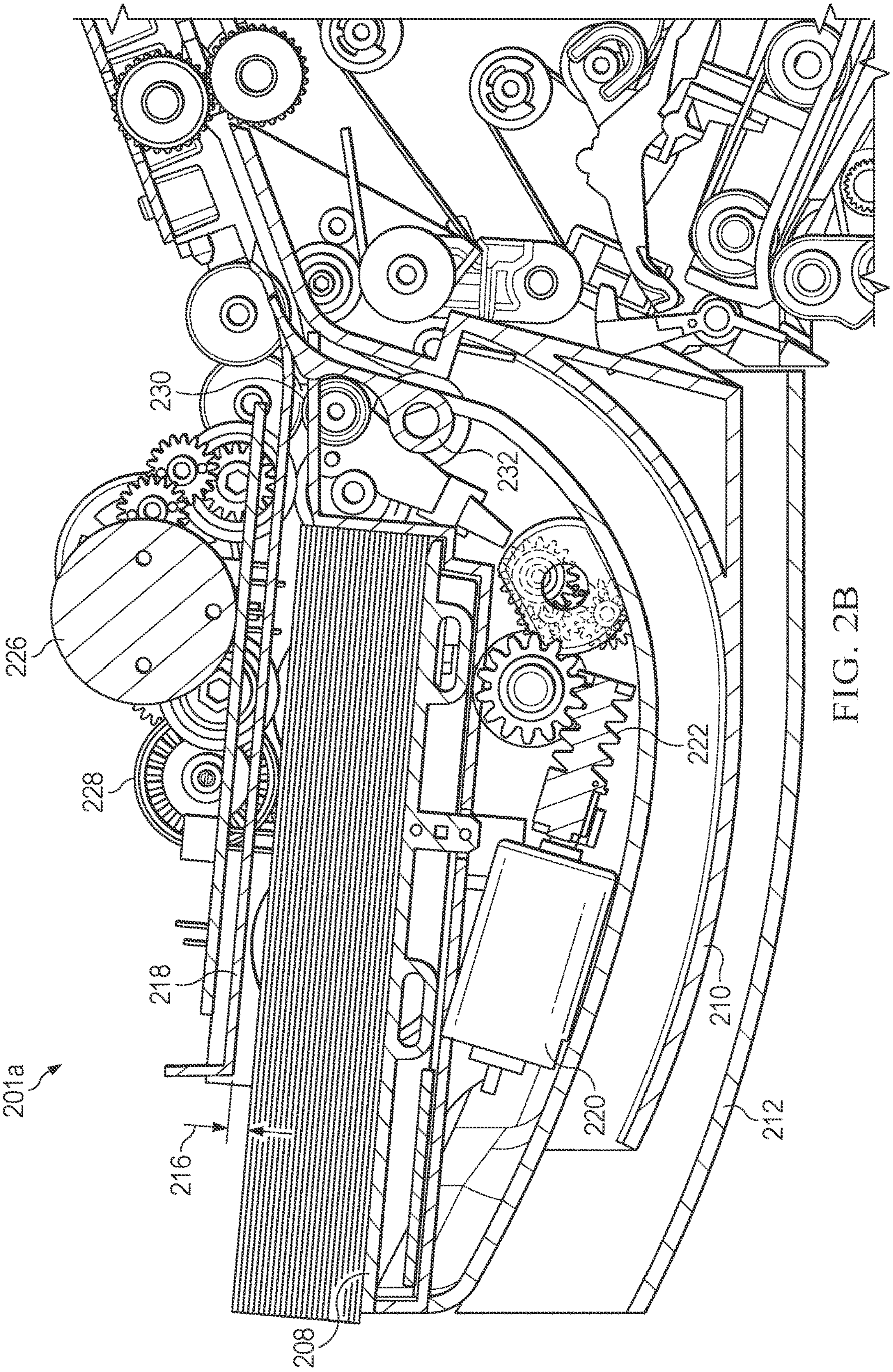
Figure 2C:
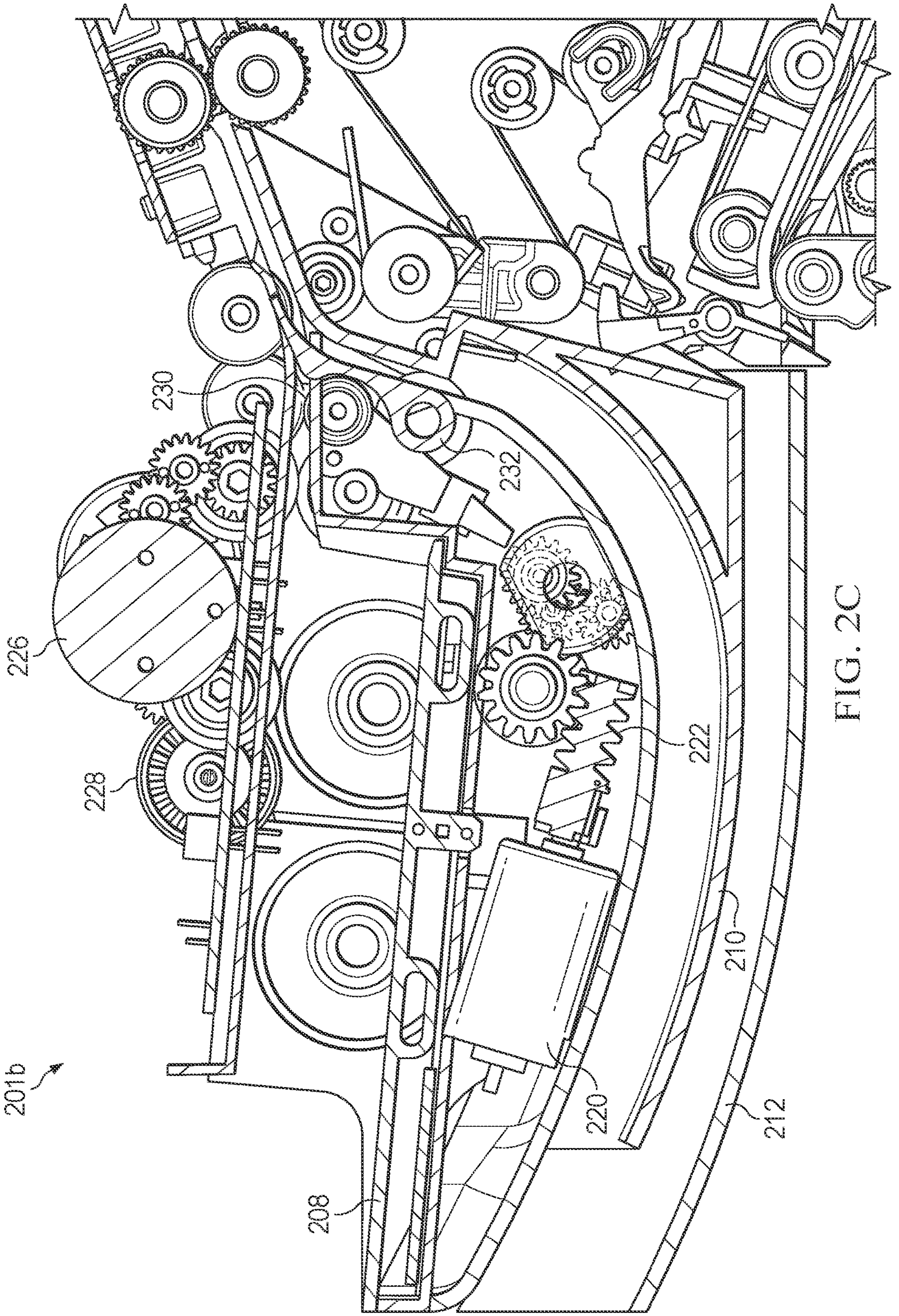
Figure 2D:
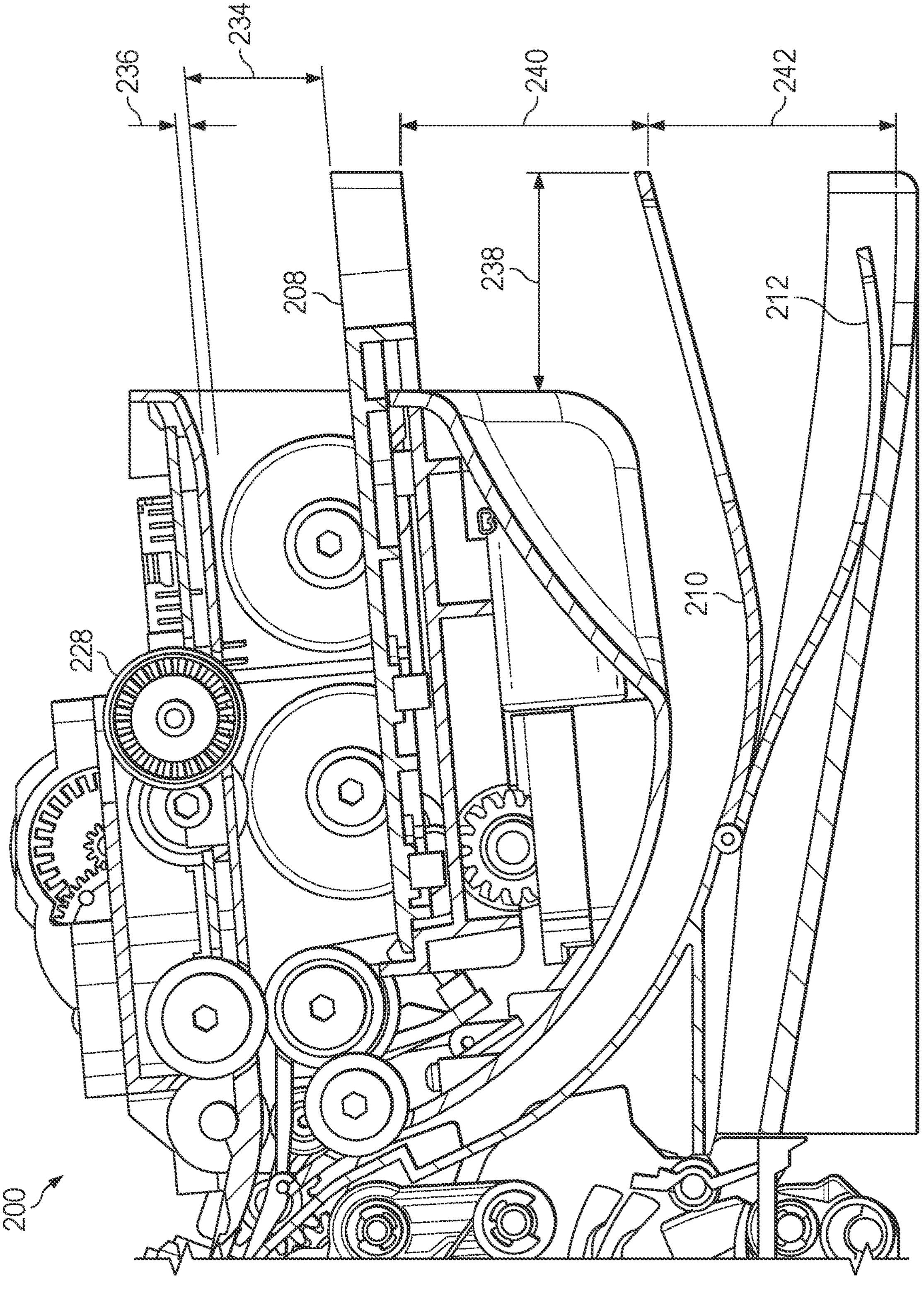
Figure 2E:
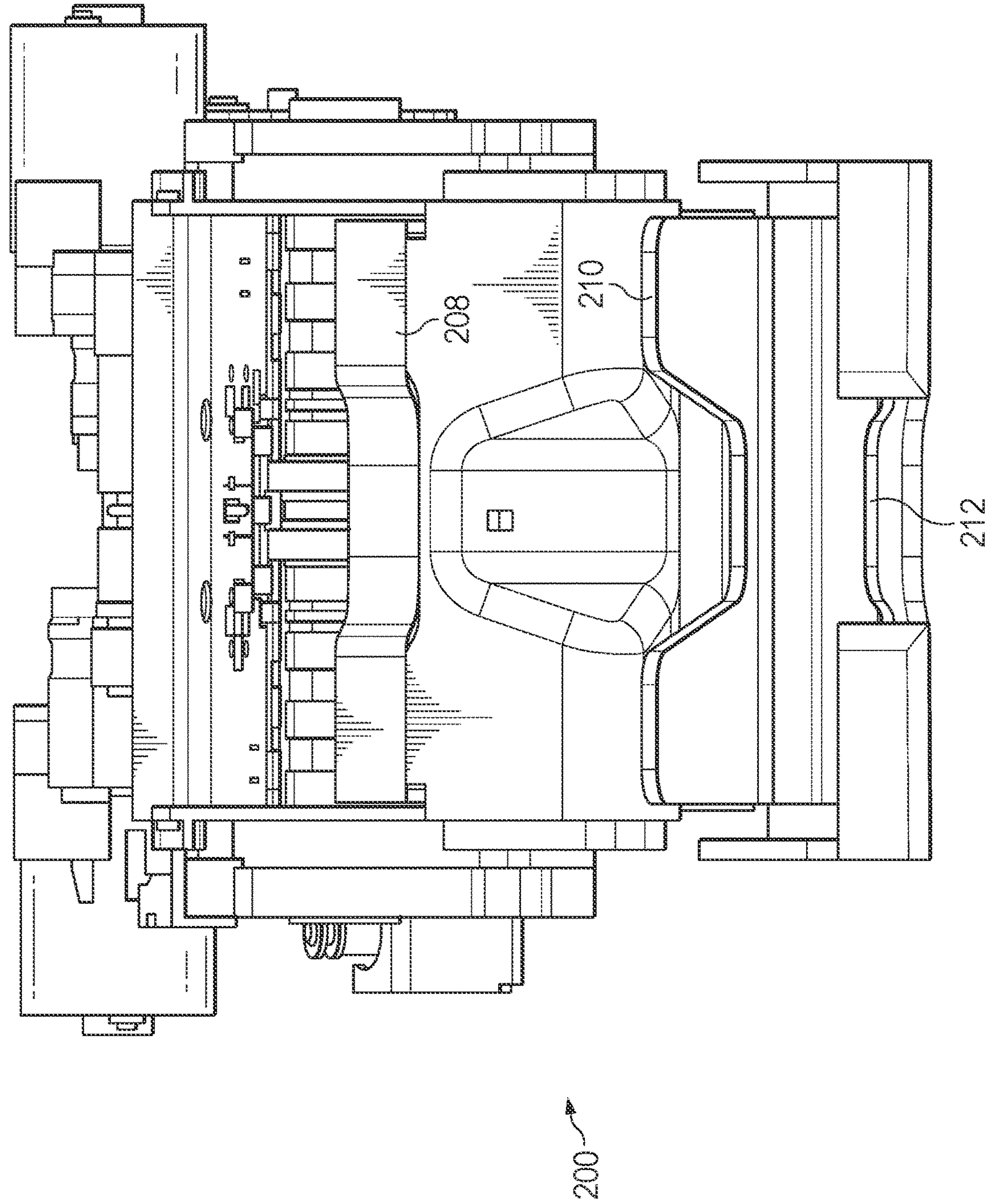
Figure 2F:
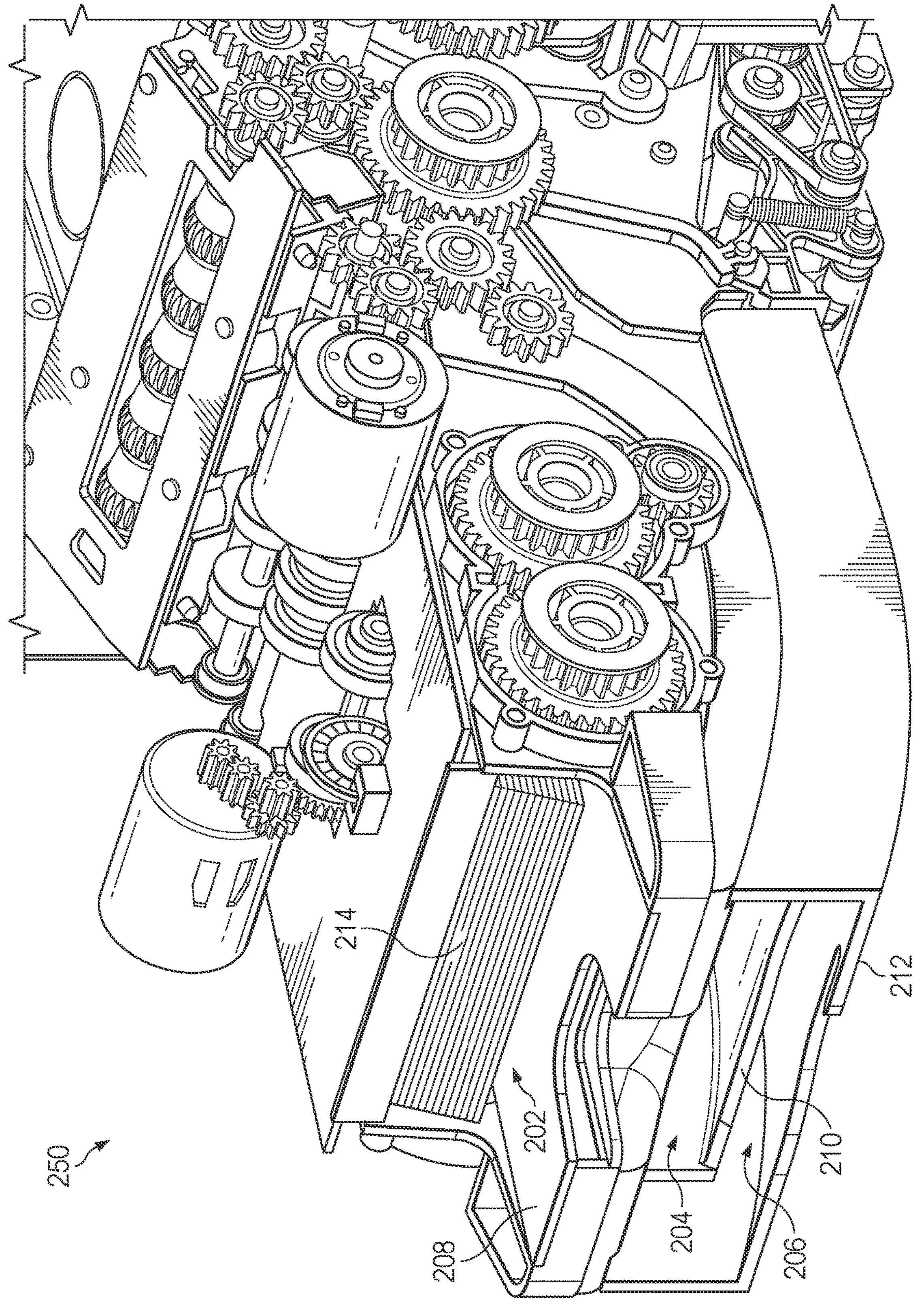

FIGS. 2A through 2F illustrate schematic views of proposed embodiments of a bulk banknote feeder 200 in accordance with various embodiments of the present disclosure. FIG. 2A illustrates an example of a bulk banknote feeder 200 in accordance with various embodiments of the present disclosure. FIG. 2B illustrates an example of a single banknote feeding mode 201*a* for a bulk banknote feeder 200 in accordance with various embodiments of the present disclosure. FIG. 2C illustrates an example of a bulk banknote feeding mode 201*b* for a bulk banknote feeder 200 in accordance with various embodiments of the present disclosure. FIG. 2D illustrates an example of a bulk banknote feeder 200 in accordance with various embodiments of the present disclosure. FIG. 2E illustrates an example of a bulk banknote feeder 200 in accordance with various embodiments of the present disclosure. FIG. 2F illustrates an example of a bulk banknote feeder 200 in accordance with various embodiments of the present disclosure.

As shown in FIG. 2A, a bulk banknote feeder 200 is a modification for an inlet to a banknote system for accepting a banknote bunch 214. The bulk banknote feeder 200 allows for processing of a banknote bunch 214 in a singular fashion by aligning a top or bottom banknote with a transport mechanism. As the top or bottom banknote is removed from the banknote bunch 214 into the banknote system, the bulk banknote feeder 200 can align a subsequent banknote with the transport mechanism for processing once the top or bottom banknote is fully transported from the bulk banknote feeder 200. The bulk banknote feeder 200 can be installed on a front of a banknote accepting apparatus. The bulk banknote feeder 200 can include a banknote accept inlet 202 including a landing platform 208, a refuse outlet 204 including a refuse tray 210, and a dispense outlet 206 including a dispense tray 212.

The banknote accept inlet 202 is provided as a horizontal opening for insertion of a banknote bunch 214 or a single banknote. The opening of the banknote accept inlet 202 is sized with a width at least equal to a largest width banknote and a height at least a size of a banknote bunch 214 meant to be inserted for each operation. For example, an opening of the accept inlet 202 can be at least a size of the compounded thickness of fifty banknotes. The size of the opening of the accept inlet 202 is not limited to two modes and can be adjustable to multiple levels. For example, the landing platform 208 can be adjusted in a manner that the opening can accept single banknotes, five banknotes, ten banknotes, fifty banknotes, etc.

The bulk banknote feeder 200 can include a banknote landing platform 208 that can operate in both a single banknote feeding mode 201*a* and a bulk banknote feeding mode 201*b*. The banknote landing platform 208 can be installed as a base for the banknote accept inlet 202. The banknote landing platform 208 is structured to accept a banknote bunch 214 in a bulk banknote feeding mode 201*b* or a single banknote in a single banknote feeding mode 201*a*. For example, the banknote landing platform 208 can be sized based on a specified type of banknote based on currency, denomination, etc.

The banknote landing platform 208 can be adjusted according to a mode set for accepting banknotes. The banknote landing platform 208 can operate in both a single banknote feeding mode 201*a* and a bulk banknote feeding mode 201*b*. For example, the banknote landing platform 208 could normally operate in the single banknote feeding mode 201*a* with a minimal clearance 216 between a top surface of the landing platform 208 and a top surface 218 of the accept inlet 202 for accepting a single banknote. When the bulk banknote feeder 200 is switched to a bulk banknote feeding mode 201*b*, the landing platform 208 can be adjustable according to a size of a banknote bunch 214. For example, the banknote landing platform 208 can be adjusted for clearance 216 of a banknote bunch 214 of fifty banknotes.

The banknote landing platform 208 can be operated to adjust as banknotes are being processed or transported into the banknote system. As each banknote is being transported into banknote system, the landing platform 208 can be adjusted to maintain alignment of the banknote bunch 214 with the transport mechanism. In certain embodiments, the landing platform 208 can adjust periodically, such as a time to process a specific amount of banknotes or for a specific amount of banknotes.

The banknote landing platform 208 can partially extend from a front surface of the bulk banknote feeder 200. The banknote landing platform 208 can extend further than a top or opposing surface of the banknote accept inlet 202.

The bulk banknote feeder 200 can also include a motor 220, a geartrain 222, and a spring 224 (shown in FIG. 3A) for adjusting the banknote landing platform 208. The motor 220 and geartrain 222 can be arranged with the spring 224 to provide opposing forces. The spring 224 is implemented to apply a force or bias to the landing platform 208 in a manner that a banknote bunch are pressed against an opposing surface of the accept inlet 202. As each banknote of the banknote bunch is individually removed from the accept inlet 202 to be processed, the bias of the spring 224 continuously applies an amount of force that allows the remaining banknotes to be separated from the bunch.

The motor 220 and geartrain 222 are operated in combination to "activate" or "reset" the spring 224. For instance, the motor 220 can apply a force to the landing platform 208 that opposes a force of the spring 224 in order for the landing platform 208 to remain in a position that the landing platform 208 does not interfere with an initial insertion of a banknote bunch. The bulk banknote feeder 200 can detect (through a sensor, trip mechanism, etc.) that the banknote bunch 214 has been inserted into the accept inlet 202. The motor 220 can "release" the landing platform 208 or reduce the force opposing the bias of the spring 224. The reduction of force allows the bias of the spring 224 to force the banknote landing platform 208 to adjust towards the opposing surface of the accept inlet 202. The force of the spring 224 adjusts the banknote landing platform 208 until the banknote bunch 214 contacts the opposing surface of the accept inlet 202 or a banknote separating mechanism. As the bulk banknote feeder 200 separates individual banknotes from the banknote bunch 214, a size of the banknote bunch is reduced. The force of the spring 224 continuously adjusts the banknote landing platform 208 until the banknote landing platform 208 is empty or has reached a maximum height. A maximum adjustment level can be determined based on the geartrain 222, a length of the spring 224, a protrusion inside of the accept inlet 202, etc.

In certain embodiments, the spring 224 can be applied on an opposite side of the banknote bunch 214 from the landing platform 208, which would mean that the spring 224 has an expansion bias. The motor 220 and geartrain 222 can compress the spring 224 to reset the banknote landing platform 208 and energize the spring 224. The spring 224 can be implemented as a single spring 224 or multiple springs 224.

In certain embodiments, one or more springs 224 can be located on a portion of the landing platform 208 that is on the same side as the banknote bunch 214, which would mean that the spring 224 has a compressive bias. The motor 220 and gear train 222 can expand the spring 224 to reset the banknote landing platform 208 and energize the spring 224.

While the banknote accept inlet 202 is illustrated as an opening oriented in a horizontal manner above the refuse outlet 204 and the dispense outlet 206, the arrangement of these components is not limiting. For example, in certain embodiments, the accept inlet 202 can be arranged in vertical manner to a side of the refuse outlet 204 and the dispense outlet 206. In certain embodiments, the refuse outlet 204 is adjacently located to the dispense outlet 206.

The refuse outlet 204 is configured for providing refused banknotes out of the bulk banknote feeder 200. The refuse outlet 204 is positioned adjacent to the dispense outlet 206. In certain embodiments, the refuse outlet 204 and the dispense outlet 206 can appear merged from an outside of the bulk banknote feeder 200. The refuse outlet 204 is generally used when a banknote has been detected to have issues prior to authentication sensor of the movement path. For example, a sensor can be positioned early in the movement path to identify a banknote that has been folded or a partial banknote. The bulk banknote feeder 200 can determine that the banknote does not need to be authenticated before being rejected and divert the banknote to the refuse outlet 204.

The dispense outlet 206 is meant for rejecting non-genuine banknotes and dispensing banknotes out of the bulk banknote feeder 200. The dispense outlet 206 can be positioned adjacent to the refuse outlet 204 in the bulk banknote feeder 200. The dispense outlet 206 can extend further than the refuse outlet 204 to combine the returned or dispensed banknotes to a single outlet in an exterior cover of the banknote feeder 200.

As shown in FIG. 2B, the bulk banknote feeder 200 can operate in a single banknote feeding mode 201*a*. In the single banknote feeding mode 201*a*, the banknote landing platform 208 is adjusted to a maximum height. The bulk banknote feeder 200 operates the motor 220 to adjust the banknote landing platform 208 to its maximum height. In certain embodiments, the bulk banknote feeder 200 reduces a force applied to the banknote landing platform 208 in order for the force of the spring 224 to adjust the banknote landing platform 208 to the maximum height. In the single banknote feeding mode 201*a* or for the maximum distance of the banknote landing platform 208, the opening of the accept inlet 202 has a minimum height for inserting a banknote.

Once the banknote has been inserted, a transportation mechanism 226 can move a single banknote through the bulk banknote feeder 200 to a currency acceptor. The transport mechanism 226 can contact an outside banknote in a banknote bunch 214 and separate the outside banknote from the banknote bunch 214. The transport mechanism 226 can move each banknote from the accept inlet 202 to any of the refuse outlet 210, the dispense outlet 206, and a banknote storage.

Along the movement path, the bulk banknote feeder 200 can include a trailing edge sensor 228. The trailing edge sensor 228 is a sensor that can detect a trailing edge of a banknote or that the entire banknote has been received in the bulk banknote feeder 200. The trailing edge of a banknote can be determined in different ways. The trailing edge sensor 228 can be an optical sensor that can determine a trailing edge of a banknote by analyzing optical captures. The trailing edge sensor 228 can be a mechanical sensor that can detect a trailing edge of a banknote by losing contact between successive banknotes. The trailing edge sensor 228 can detect a change in depth of the clearance 216 while the outside banknote has not been fully removed from the accept inlet 202 and the landing platform 208 has not yet been adjusted. The difference in distance between the top banknote and the subsequent banknote can determine that the trailing edge has passed the trailing edge sensor 228.

A stacked banknotes sensor 230 can also be located along the movement path. The stacked banknotes sensor 230 can be located along the movement path subsequently to the trailing edge sensor 228. The stacked banknotes sensor 230 can identify when more than one banknote is stacked or overlaid. When stacked or overlaid banknotes are detected, the bulk banknote feeder 200 can stop and reverse the transport mechanism 226. The bulk banknote feeder 200 can attempt to separate the banknotes and resubmit the banknotes to the stacked banknotes sensor 230. If the banknotes have been separated, the stacked banknotes sensor 230 does not interrupt the transportation mechanism 226. If the banknotes do not separate, the stacked banknotes sensor 230 can interrupt the transportation mechanism and return the stacked or overlaid banknotes back towards the accept inlet 202 for a separating mechanism of the bulk banknote feeder 200 to reattempt separating the stacked or overlaid banknotes. The bulk banknote feeder 200 can be programmed to limit an amount of interruptions for the transportation mechanism 226 before rerouting and returning the stacked banknotes through the refuse outlet 204.

On the movement path after the stacked banknotes sensor 230, the bulk banknote feeder 200 can include a diverter gate 232. The diverter gate 232 can be a one-way gate that ensures rejected banknotes are not returned through the accept inlet 202. The diverter gate 232 can be spring-loaded to remain in the return position. When a banknote is routed through the movement path, the diverter gate 232 is moved into an accept position. As the banknote is passing by the diverter gate 232, a restoring force of a spring for the diverter gate 232 is exceeded. Once the banknote has completely passed the diverter gate 232, the restoring force of the spring is no longer exceeded, and the diverter gate resets to the return position. In the return position, banknotes are routed from the movement path to the refuse outlet 204.

In some embodiments, the diverter gate 232 can be an active gate that is controlled by a motor 220 or solenoid. In some embodiments, active gates may include a spring. In some embodiments, the diverter gate 232 can be a passive gate that is opened by a banknote that pushes open the diverter gate 232. In some embodiments, a passive gate may include a spring 224.

As shown in FIG. 2C, the bulk banknote feeder 200 is operating in the bulk banknote feeding mode 201*b*. In the bulk banknote feeding mode 201*b*, the motor 220 has moved the gear train 222 in a manner that the banknote landing platform 208 is adjusted to the "reset" position or the position where the accept inlet 202 has a greatest distance from the opposing surface of the accept inlet 202. The movement of the motor 220 moves the spring 224 into a loaded or energized condition for the next bulk banknote feeder operation.

As shown in FIG. 2D, the bulk banknote feeder 200 can operate in both a bulk banknote feeding mode 201*b* and a single banknote feeding mode 201*a*. The landing platform 208 can be adjusted for each of the modes. For the bulk banknote feeding mode 201*b*, the landing platform 208 is adjusted to a bulk banknote opening distance 234. For the single banknote feeding mode 201*a*, the landing platform 208 is adjusted to a single banknote opening distance 236. The landing platform 208, refuse tray 210, and dispense tray 212 can extend an extension distance 238 from an outer surface of the bulk banknote feeder 200. The refuse tray 210 can have a vertical distance 240 from the landing platform 208*s*. The dispense tray 212 can have a vertical distance 242 from the refuse outlet 204.

As shown in FIG. 2E, the bulk banknote feeder 200 can operate in both a bulk banknote feeding mode 201*b* and a single banknote feeding mode 201*a*. The bulk banknote feeder 200 can include an accept inlet 202 with a landing platform 208 installed, a refuse outlet 204, and a reject outlet. The refuse outlet 204 and the reject outlet can be adjacently arranged on the bulk banknote feeder 200. Typically, the refuse outlet 204 is arranged between the accept inlet 202 and the reject outlet. The accept inlet 202 is designed to accept a banknote bunch in the bulk banknote feeding mode 201*b* and a single banknote in a single banknote feeding mode 201*a*.

As shown in FIG. 2F, a bulk banknote feeder 250 is a modification for an inlet to a banknote system for accepting a banknote bunch 214. The bulk banknote feeder 250 allows for processing of a banknote bunch 214 in a singular fashion by aligning a top or bottom banknote with a transport mechanism. As the top or bottom banknote is removed from the banknote bunch 214 into the banknote system, the bulk banknote feeder 250 can align a subsequent banknote with the transport mechanism for processing once the top or bottom banknote is fully transported from the bulk banknote feeder 250. The bulk banknote feeder 250 can be installed on a front of a banknote accepting apparatus. The bulk banknote feeder 250 can include a banknote accept inlet 202 including a landing platform 208, a refuse outlet 204 including a refuse tray 210, and a dispense outlet 206 including a dispense tray 212.

The banknote accept inlet 202 is provided as a horizontal opening for insertion of a banknote bunch 214 or a single banknote. The opening of the banknote accept inlet 202 is sized with a width at least equal to a largest width banknote and a height at least a size of a banknote bunch 214 meant to be inserted for each operation. For example, an opening of the accept inlet 202 can be at least a size of the compounded thickness of fifty banknotes. The size of the opening of the accept inlet 202 is not limited to two modes and can be adjustable to multiple levels. For example, the landing platform 208 can be adjusted in a manner that the opening can accept single banknotes, five banknotes, ten banknotes, fifty banknotes, etc.

The bulk banknote feeder 250 can include a banknote landing platform 208 that can operate in both a single banknote feeding mode 201*a* and a bulk banknote feeding mode 201*b*. The banknote landing platform 208 can be installed as a base for the banknote accept inlet 202. The banknote landing platform 208 is structured to accept a banknote bunch 214 in a bulk banknote feeding mode 201*b* or a single banknote in a single banknote feeding mode 201*a*. For example, the banknote landing platform 208 can be sized based on a specified type of banknote based on currency, denomination, etc.

The banknote landing platform 208 can be adjusted according to a mode set for accepting banknotes. The banknote landing platform 208 can operate in both a single banknote feeding mode 201*a* and a bulk banknote feeding mode 201*b*. For example, the banknote landing platform 208 could normally operate in the single banknote feeding mode 201*a* with a minimal clearance 216 between a top surface of the landing platform 208 and a top surface 218 of the accept inlet 202 for accepting a single banknote. When the bulk banknote feeder 250 is switched to a bulk banknote feeding mode 201*b*, the landing platform 208 can be adjustable according to a size of a banknote bunch 214. For example, the banknote landing platform 208 can be adjusted for clearance 216 of a banknote bunch 214 of fifty banknotes.

The banknote landing platform 208 can be operated to adjust as banknotes are being processed or transported into the banknote system. As each banknote is being transported into banknote system, the landing platform 208 can be adjusted to maintain alignment of the banknote bunch 214 with the transport mechanism. In certain embodiments, the landing platform 208 can adjust periodically, such as a time to process a specific amount of banknotes or for a specific amount of banknotes.

The banknote landing platform 208 can partially extend from a front surface of the bulk banknote feeder 250. The banknote landing platform 208 can extend further than a top or opposing surface of the banknote accept inlet 202.

The bulk banknote feeder 250 can also include a motor 220, a geartrain 222, and a spring 224 (shown in FIG. 3A) for adjusting the banknote landing platform 208. The motor 220 and geartrain 222 can be arranged with the spring 224 to provide opposing forces. The spring 224 is implemented to apply a force or bias to the landing platform 208 in a manner that a banknote bunch are pressed against an opposing surface of the accept inlet 202. As each banknote of the banknote bunch is individually removed from the accept inlet 202 to be processed, the bias of the spring 224 continuously applies an amount of force that allows the remaining banknotes to be separated from the bunch.

The motor 220 and geartrain 222 are operated in combination to "activate" or "reset" the spring 224. For instance, the motor 220 can apply a force to the landing platform 208 that opposes a force of the spring 224 in order for the landing platform 208 to remain in a position that the landing platform 208 does not interfere with an initial insertion of a banknote bunch. The bulk banknote feeder 250 can detect (through a sensor, trip mechanism, etc.) that the banknote bunch 214 has been inserted into the accept inlet 202. The motor 220 can "release" the landing platform 208 or reduce the force opposing the bias of the spring 224. The reduction of force allows the bias of the spring 224 to force the banknote landing platform 208 to adjust towards the opposing surface of the accept inlet 202. The force of the spring 224 adjusts the banknote landing platform 208 until the banknote bunch 214 contacts the opposing surface of the accept inlet 202 or a banknote separating mechanism. As the bulk banknote feeder 250 separates individual banknotes from the banknote bunch 214, a size of the banknote bunch is reduced. The force of the spring 224 continuously adjusts the banknote landing platform 208 until the banknote landing platform 208 is empty or has reached a maximum height. A maximum adjustment level can be determined based on the geartrain 222, a length of the spring 224, a protrusion inside of the accept inlet 202, etc.

In certain embodiments, the spring 224 can be applied on an opposite side of the banknote bunch 214 from the landing platform 208, which would mean that the spring 224 has an expansion bias. The motor 220 and geartrain 222 can compress the spring 224 to reset the banknote landing platform 208 and energize the spring 224. The spring 224 can be implemented as a single spring 224 or multiple springs 224.

In certain embodiments, one or more springs 224 can be located on a portion of the landing platform 208 that is on the same side as the banknote bunch 214, which would mean that the spring 224 has a compressive bias. The motor 220 and gear train 222 can expand the spring 224 to reset the banknote landing platform 208 and energize the spring 224.

While the banknote accept inlet 202 is illustrated as an opening oriented in a horizontal manner above the refuse outlet 204 and the dispense outlet 206, the arrangement of these components is not limiting. For example, in certain embodiments, the accept inlet 202 can be arranged in vertical manner to a side of the refuse outlet 204 and the dispense outlet 206. In certain embodiments, the refuse outlet 204 is adjacently located to the dispense outlet 206.

The refuse outlet 204 is configured for providing refused banknotes out of the bulk banknote feeder 250. The refuse outlet 204 is positioned adjacent to the dispense outlet 206. In certain embodiments, the refuse outlet 204 and the dispense outlet 206 can appear merged from an outside of the bulk banknote feeder 250. The refuse outlet 204 is generally used when a banknote has been detected to have issues prior to authentication sensor of the movement path. For example, a sensor can be positioned early in the movement path to identify a banknote that has been folded or a partial banknote. The bulk banknote feeder 250 can determine that the banknote does not need to be authenticated before being rejected and divert the banknote to the refuse outlet 204.

The dispense outlet 206 is meant for rejecting non-genuine banknotes and dispensing banknotes out of the bulk banknote feeder 250. The dispense outlet 206 can be positioned adjacent to the refuse outlet 204 in the bulk banknote feeder 250. The dispense outlet 206 can extend further than the refuse outlet 204 to combine the returned or dispensed banknotes to a single outlet in an exterior cover of the banknote feeder 250.

Figure 3A:
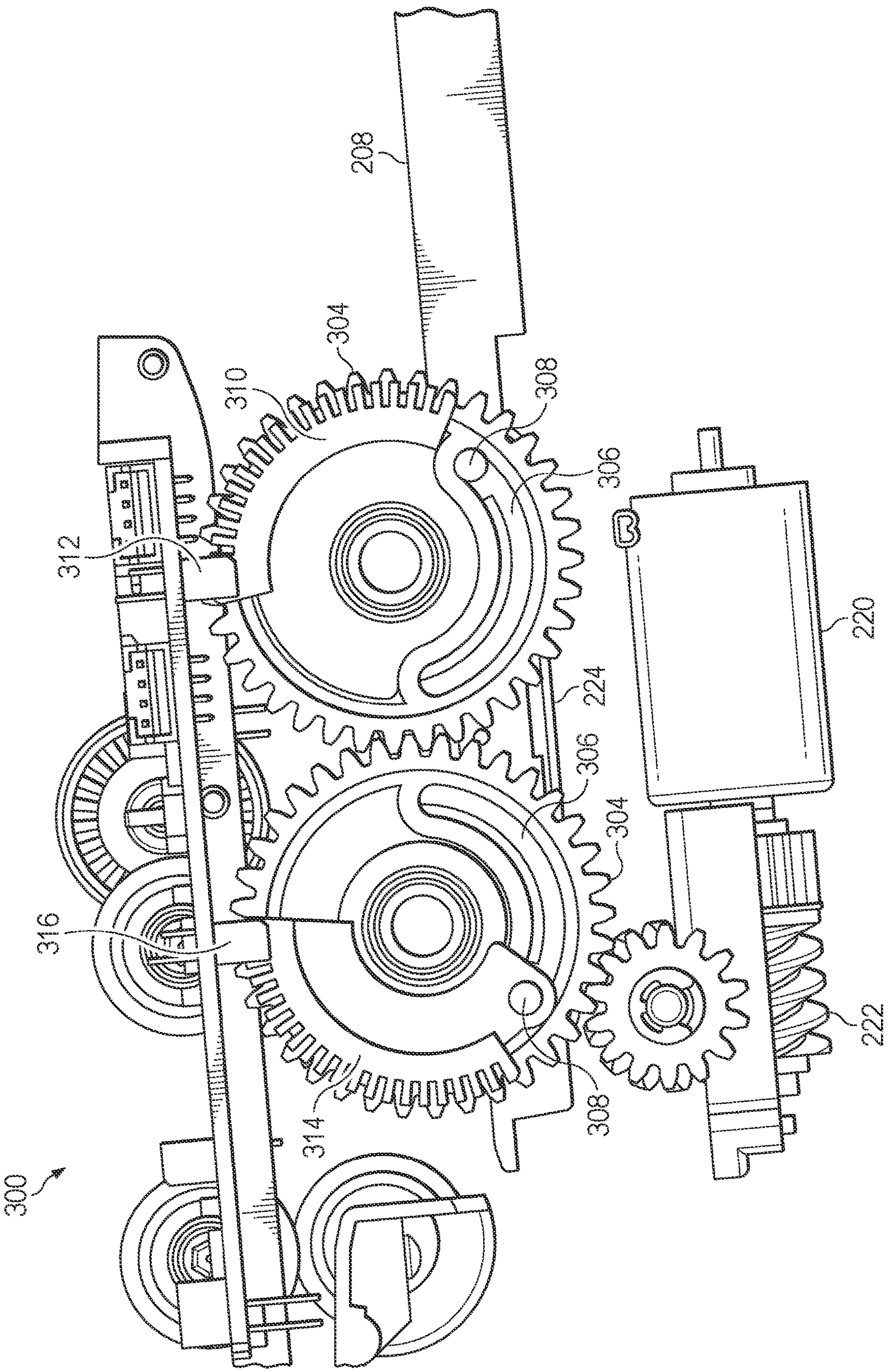
FIGS. 3A through 3S illustrate an example landing platform in accordance with various embodiments of the present disclosure.
Figure 3B:
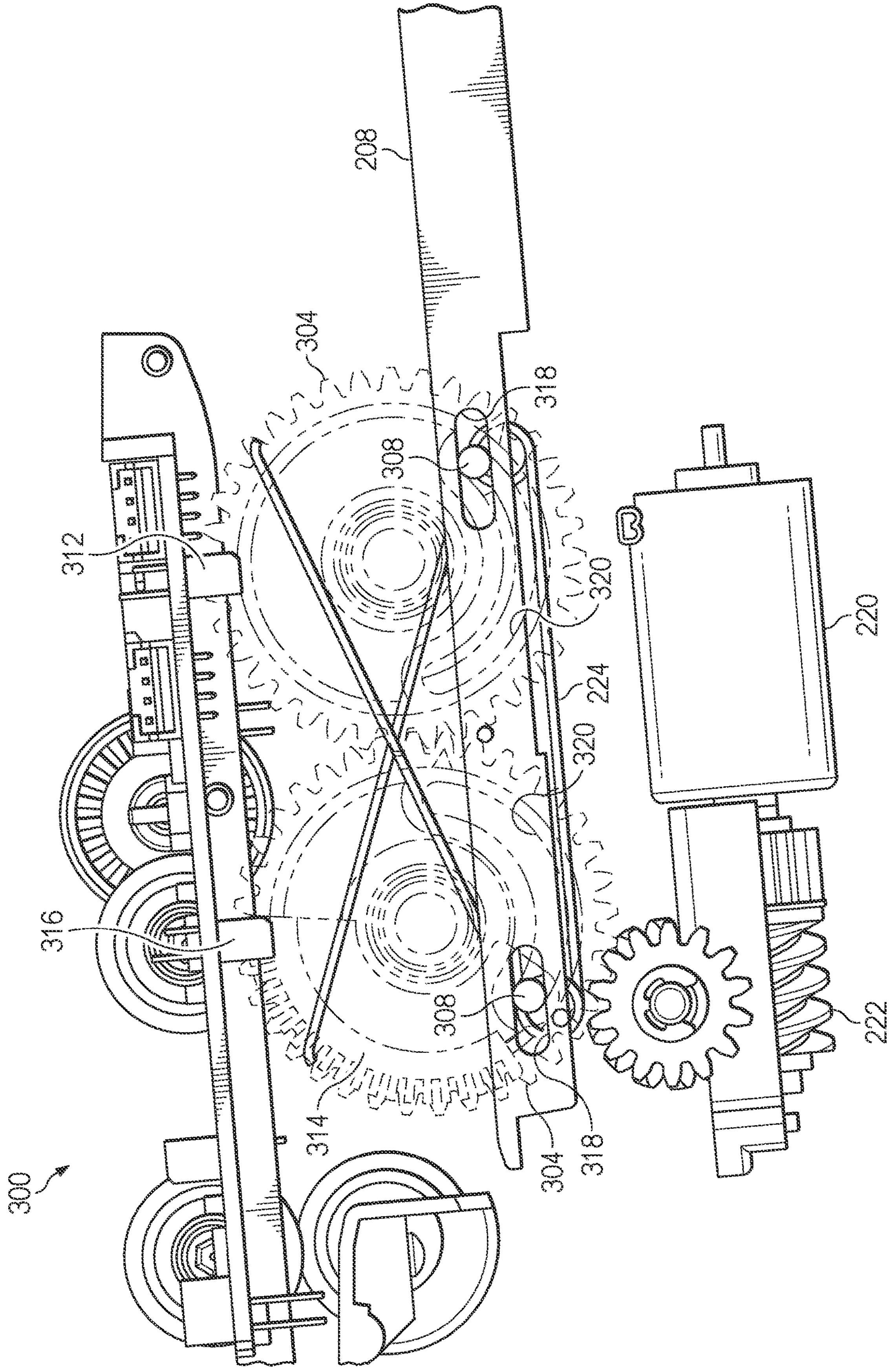
Figure 3C:
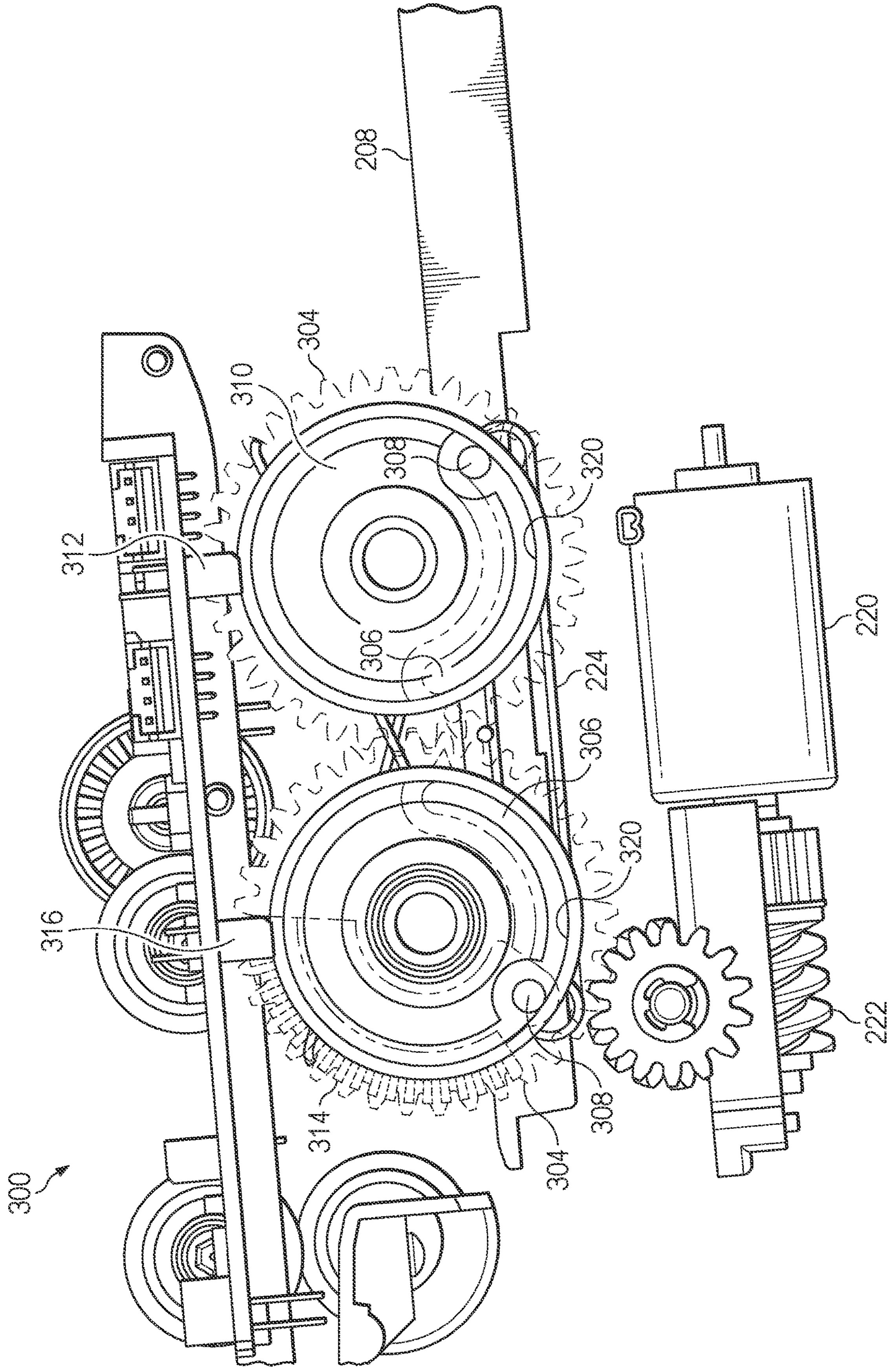
Figure 3D:
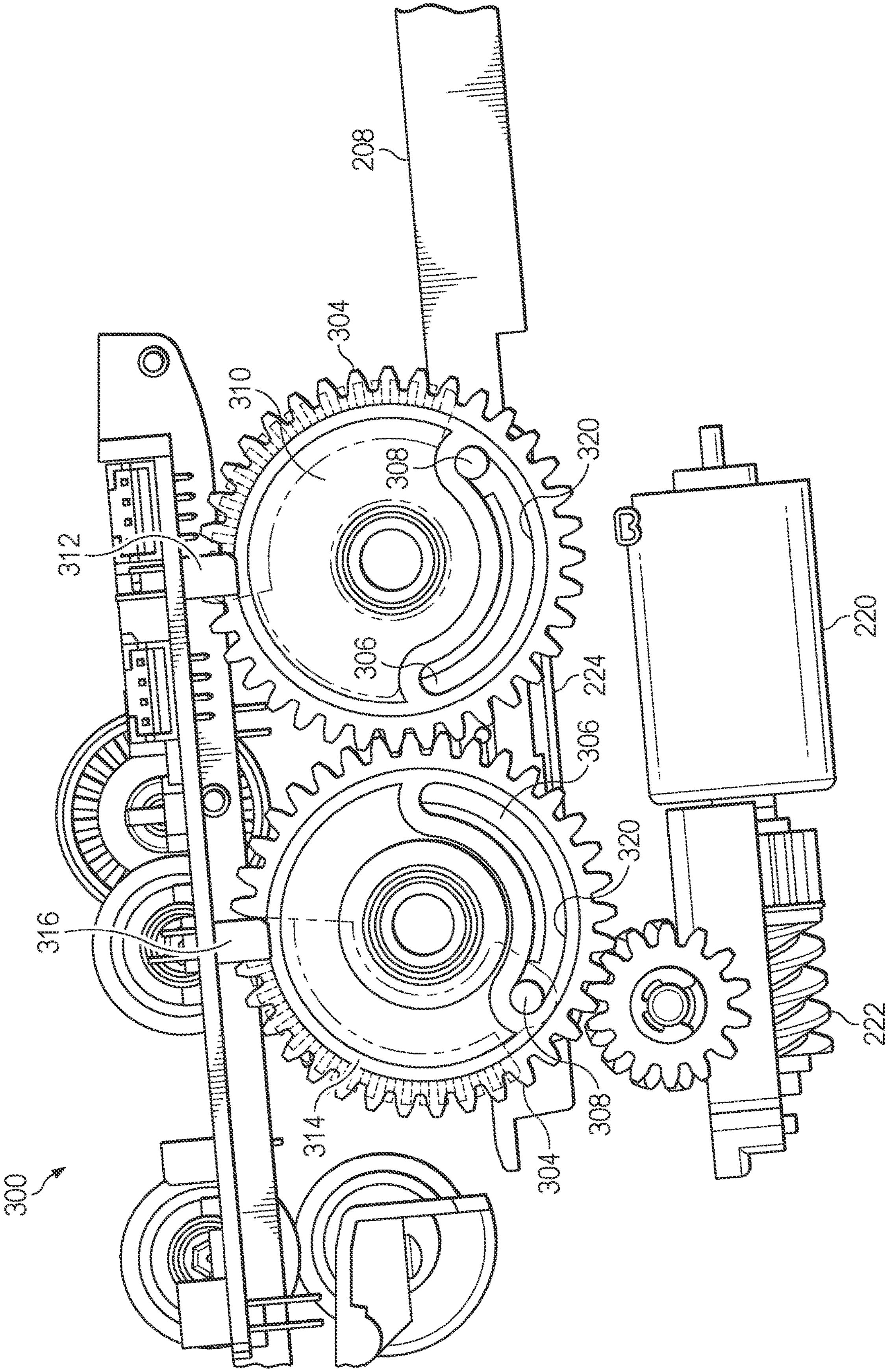
Figure 3E:
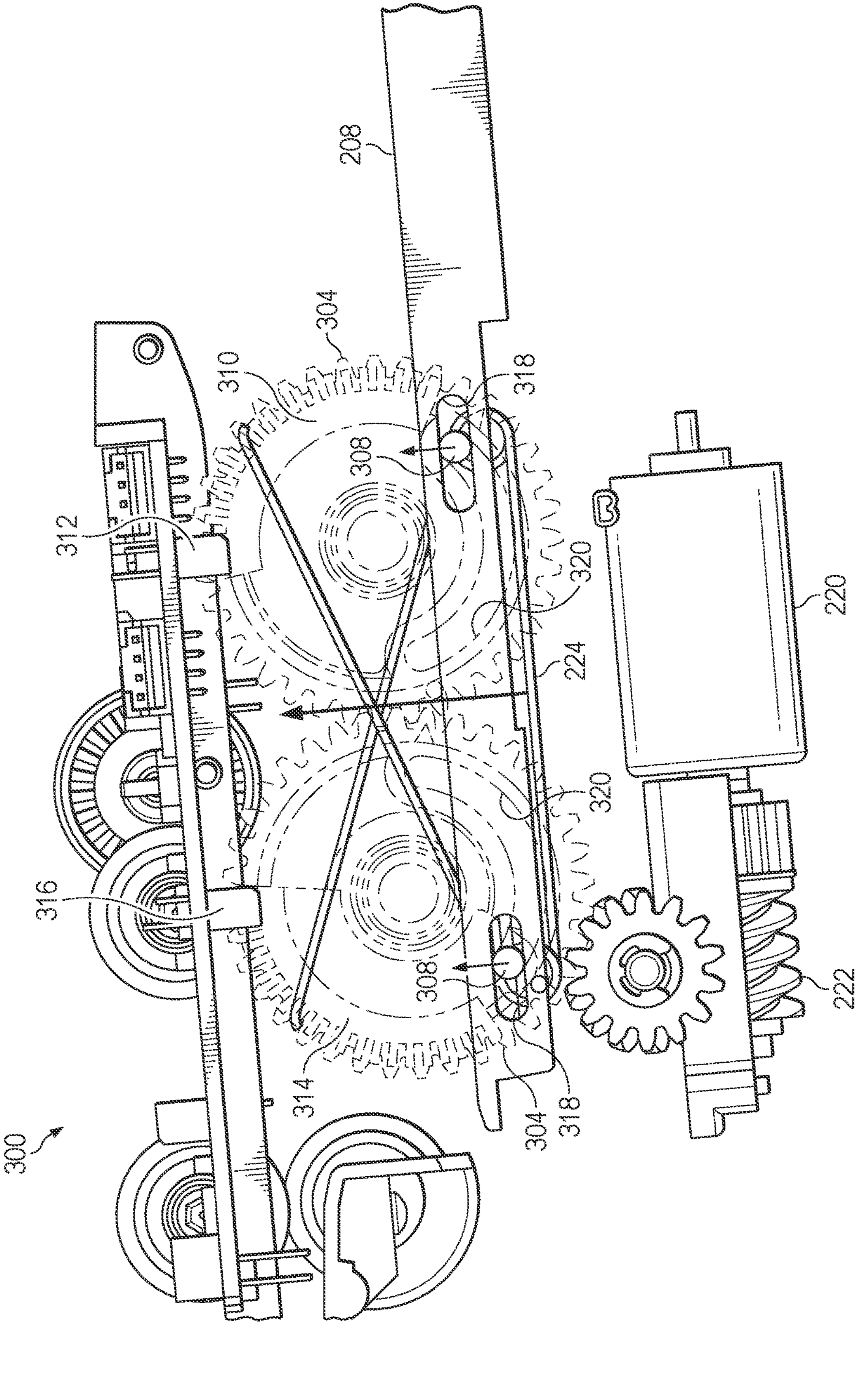
Figure 3F:
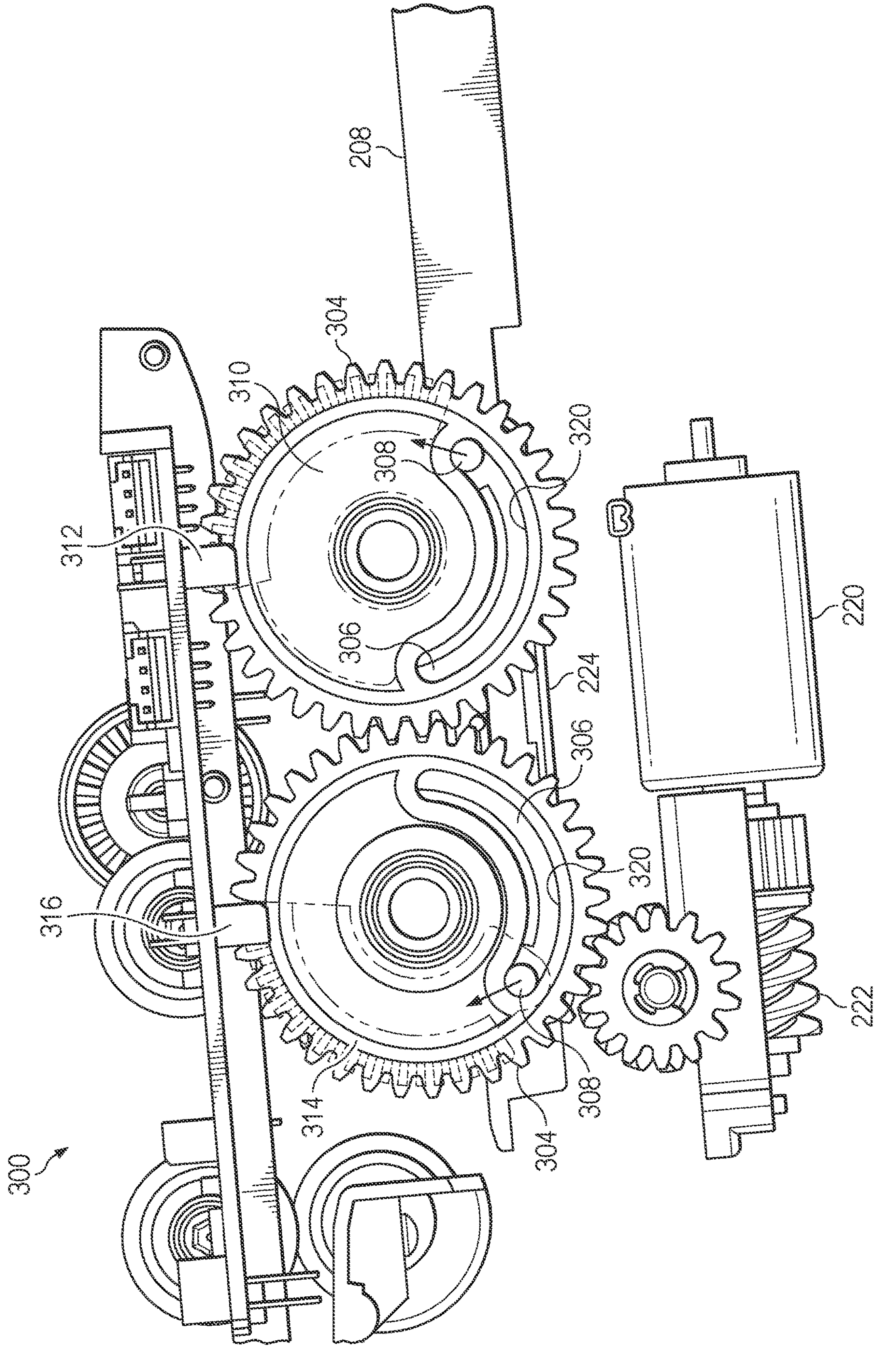
Figure 3G:
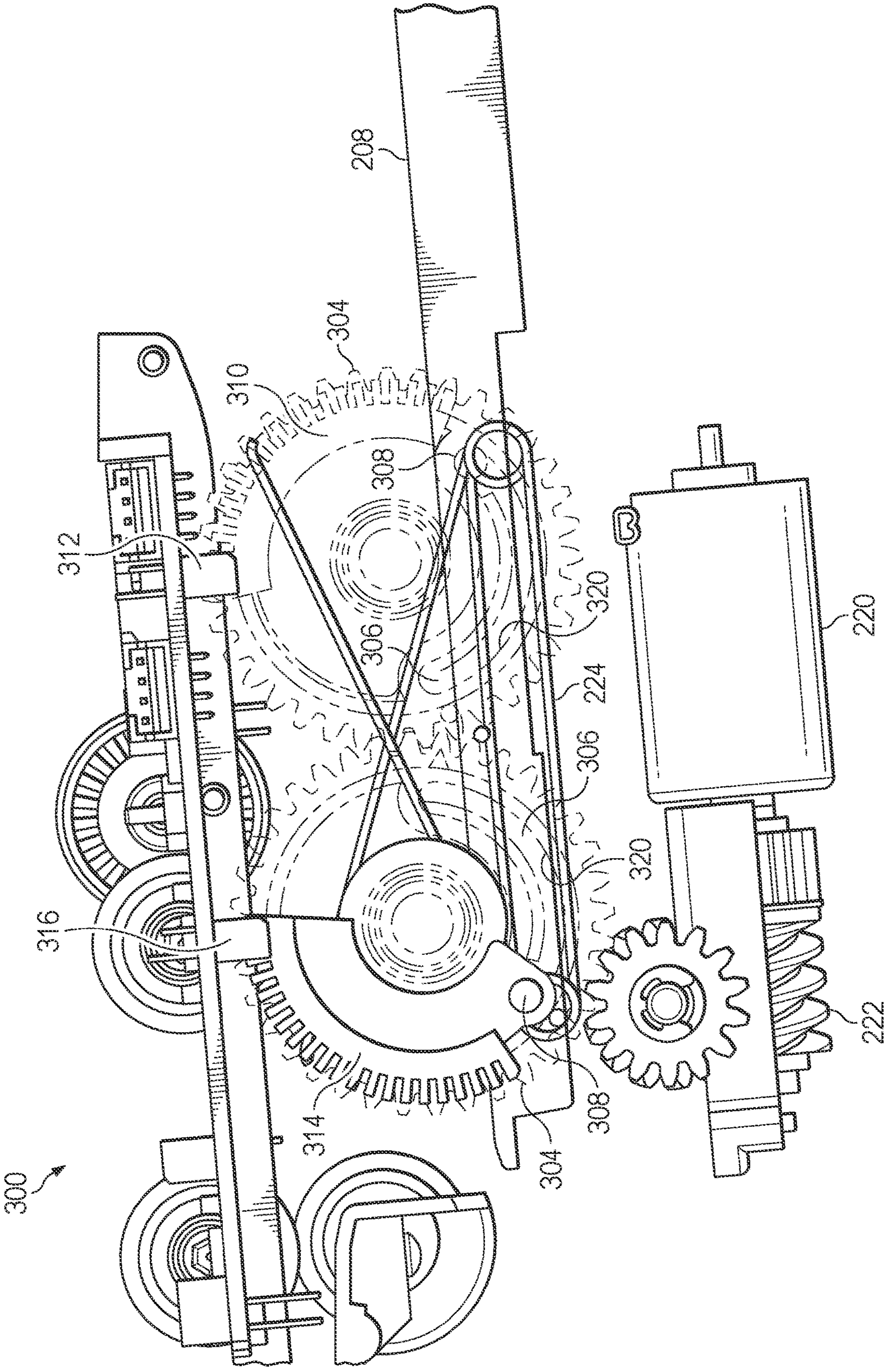
Figure 3H:
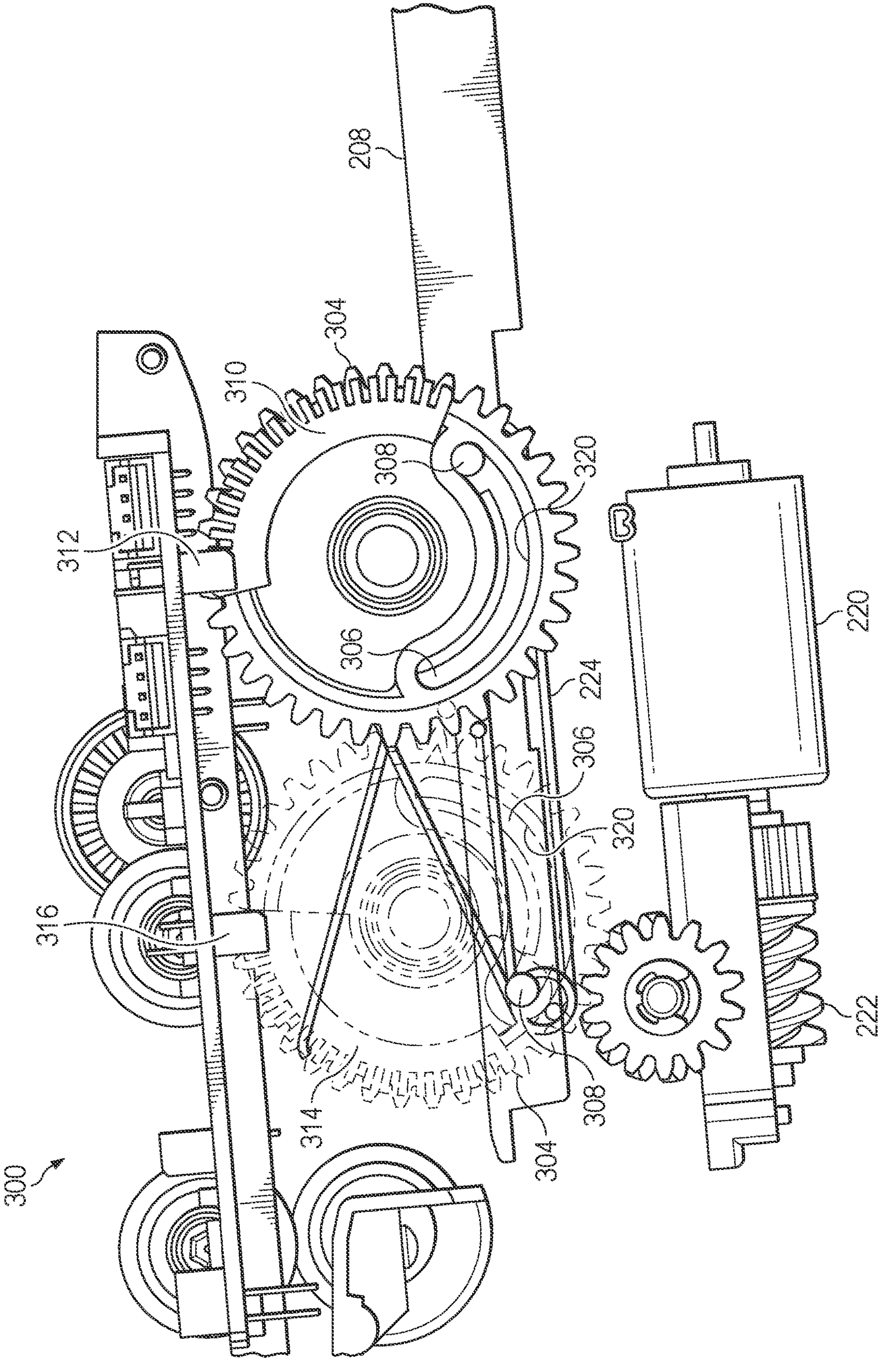
Figure 3I:
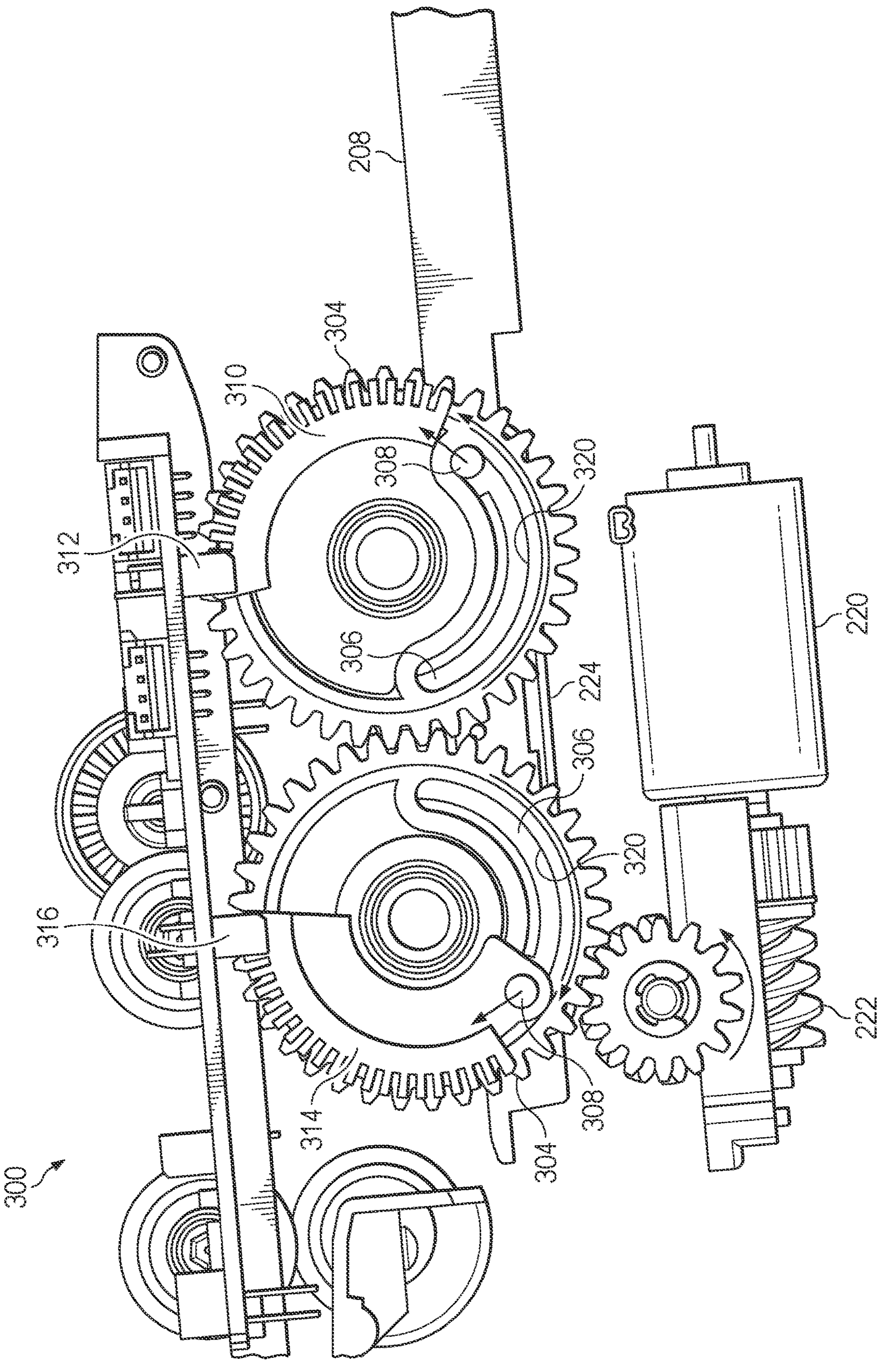
Figure 3J:
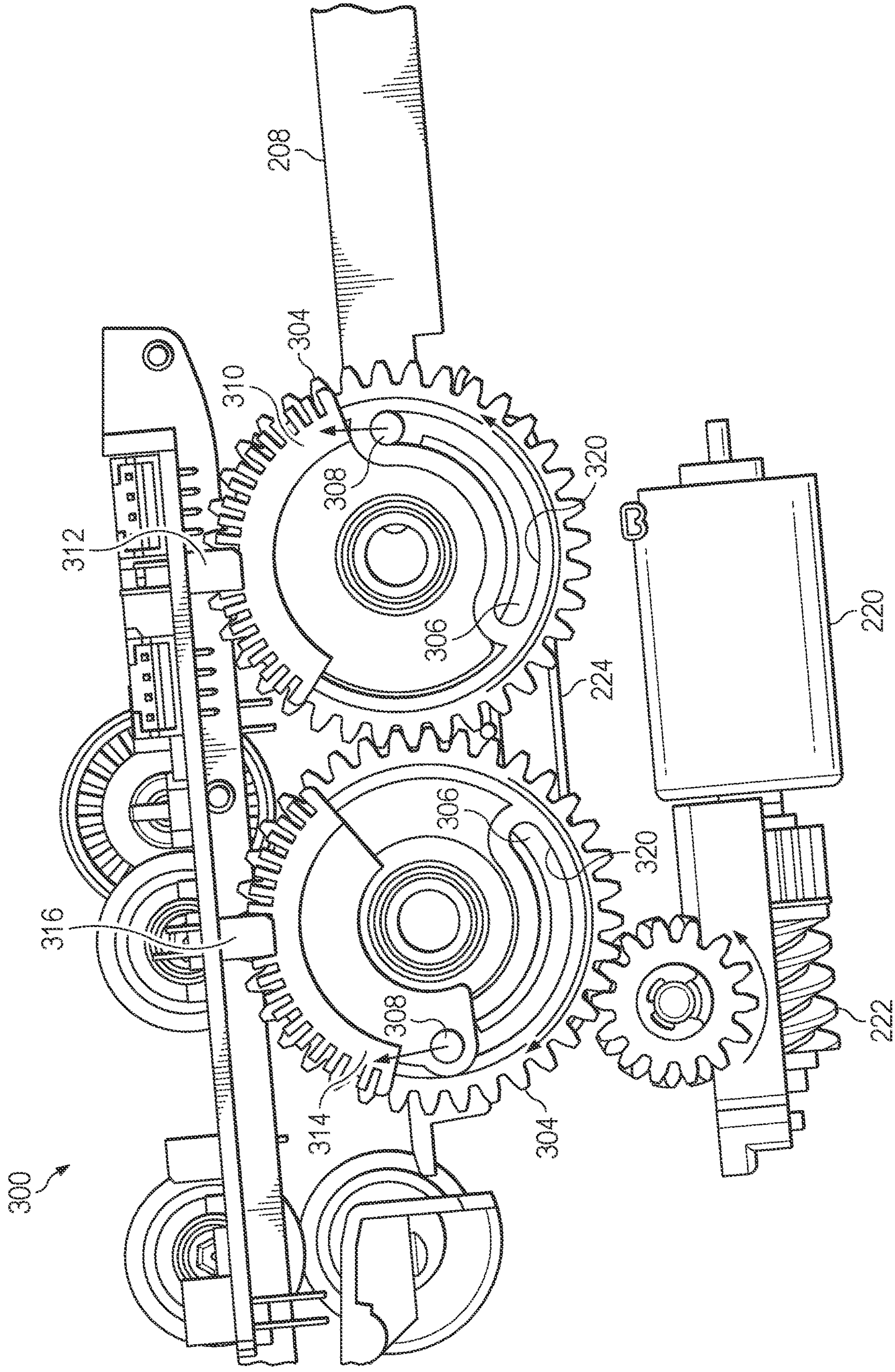
Figure 3K:
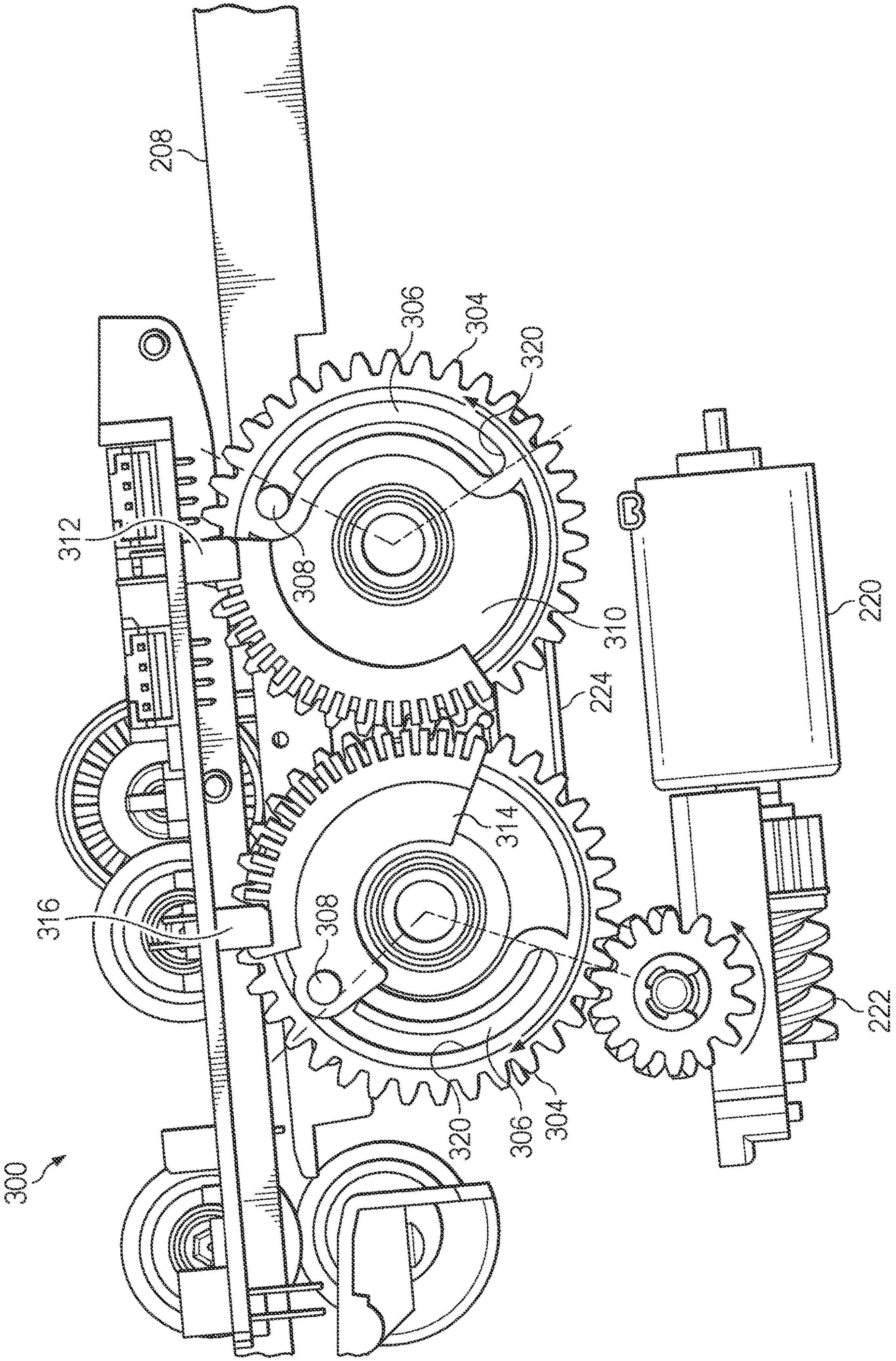
Figure 3L:
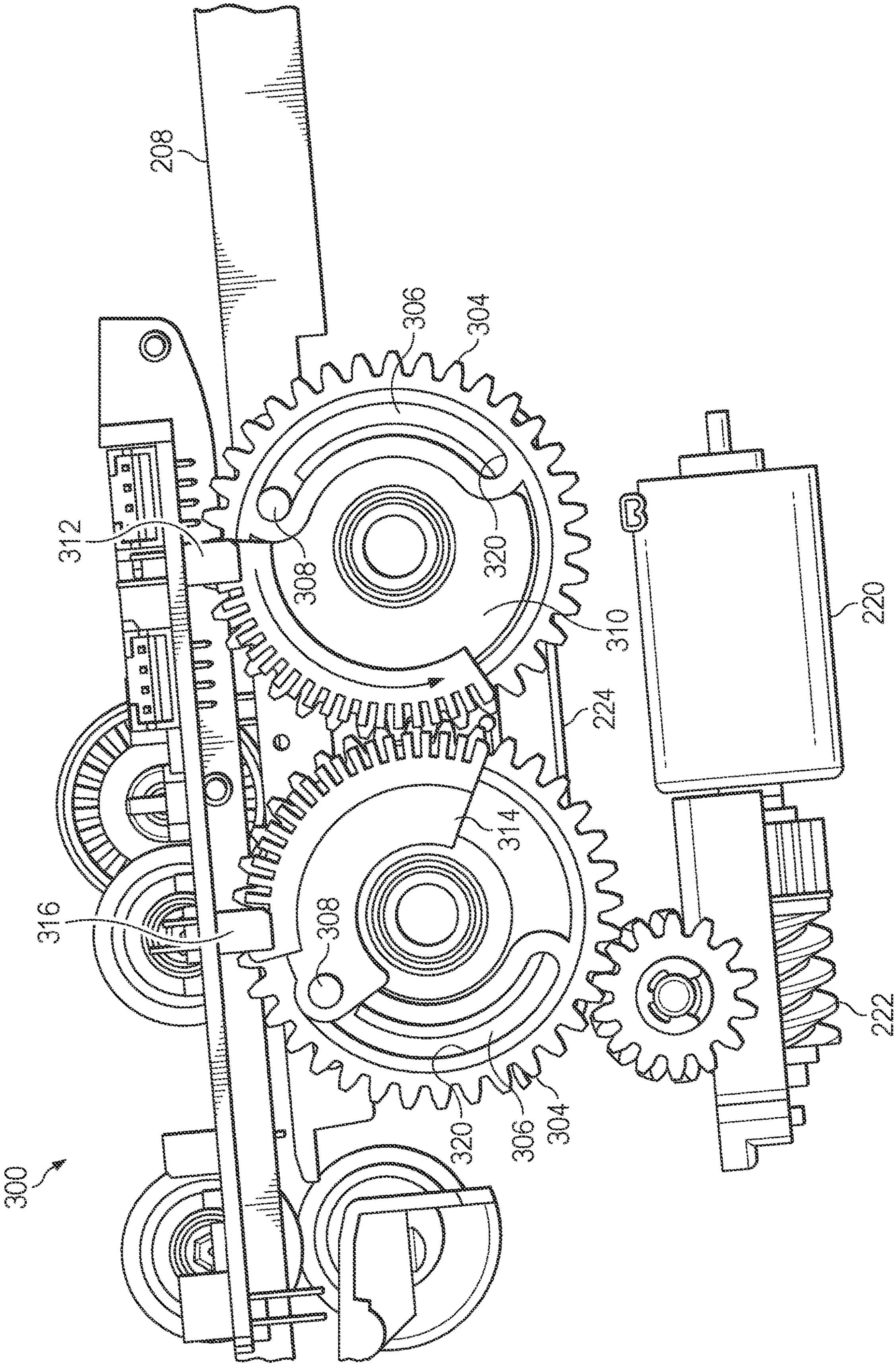
Figure 3M:
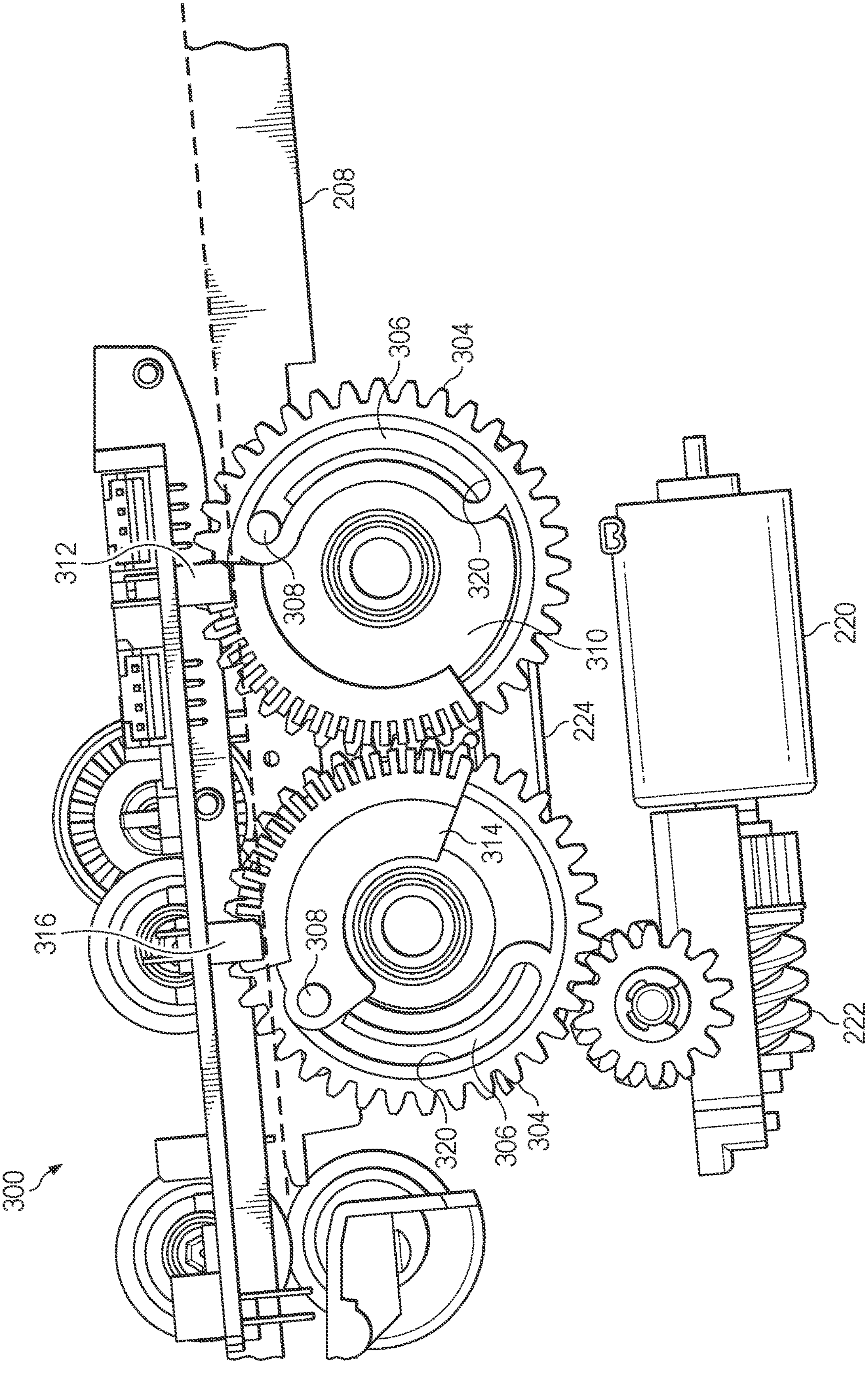
Figure 3N:
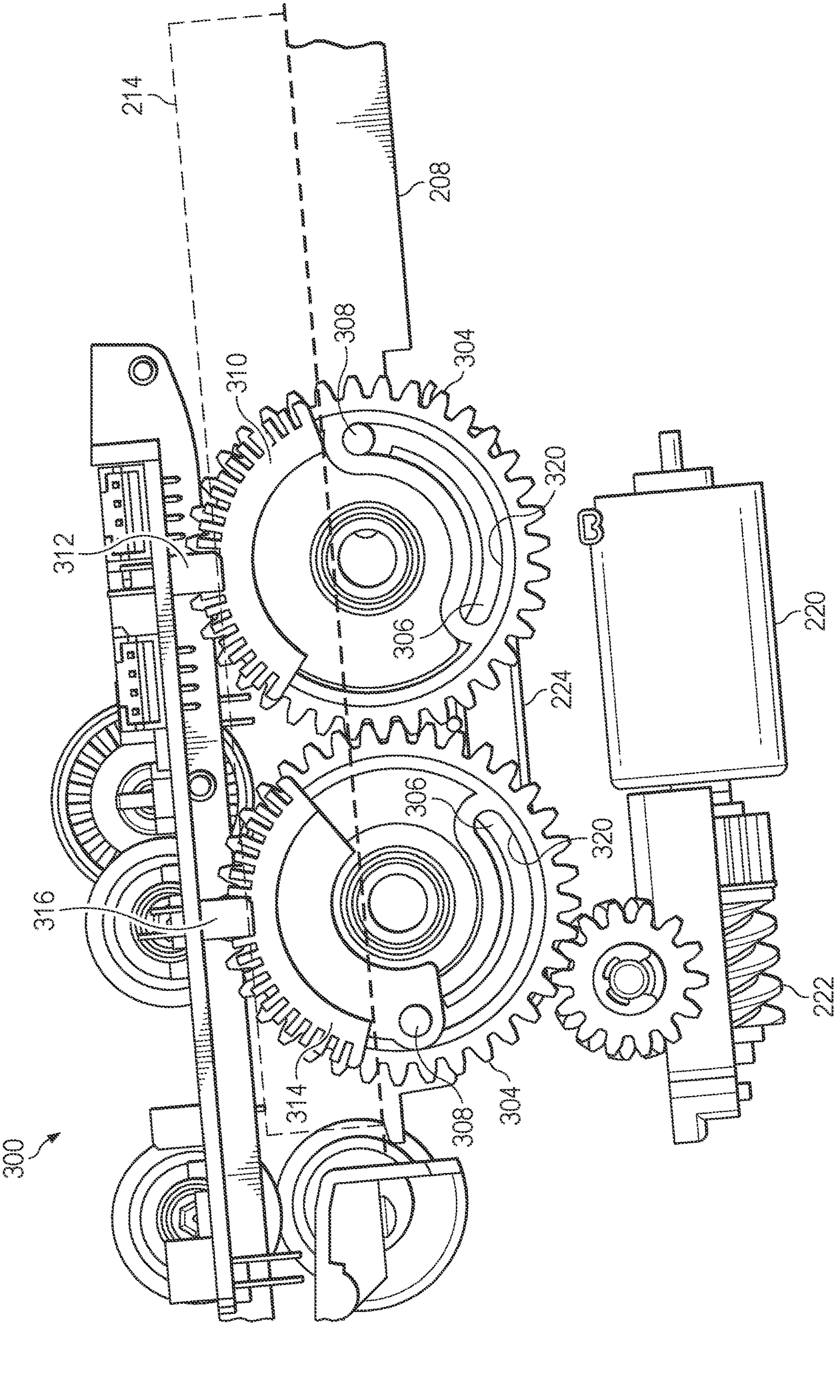
Figure 3O:
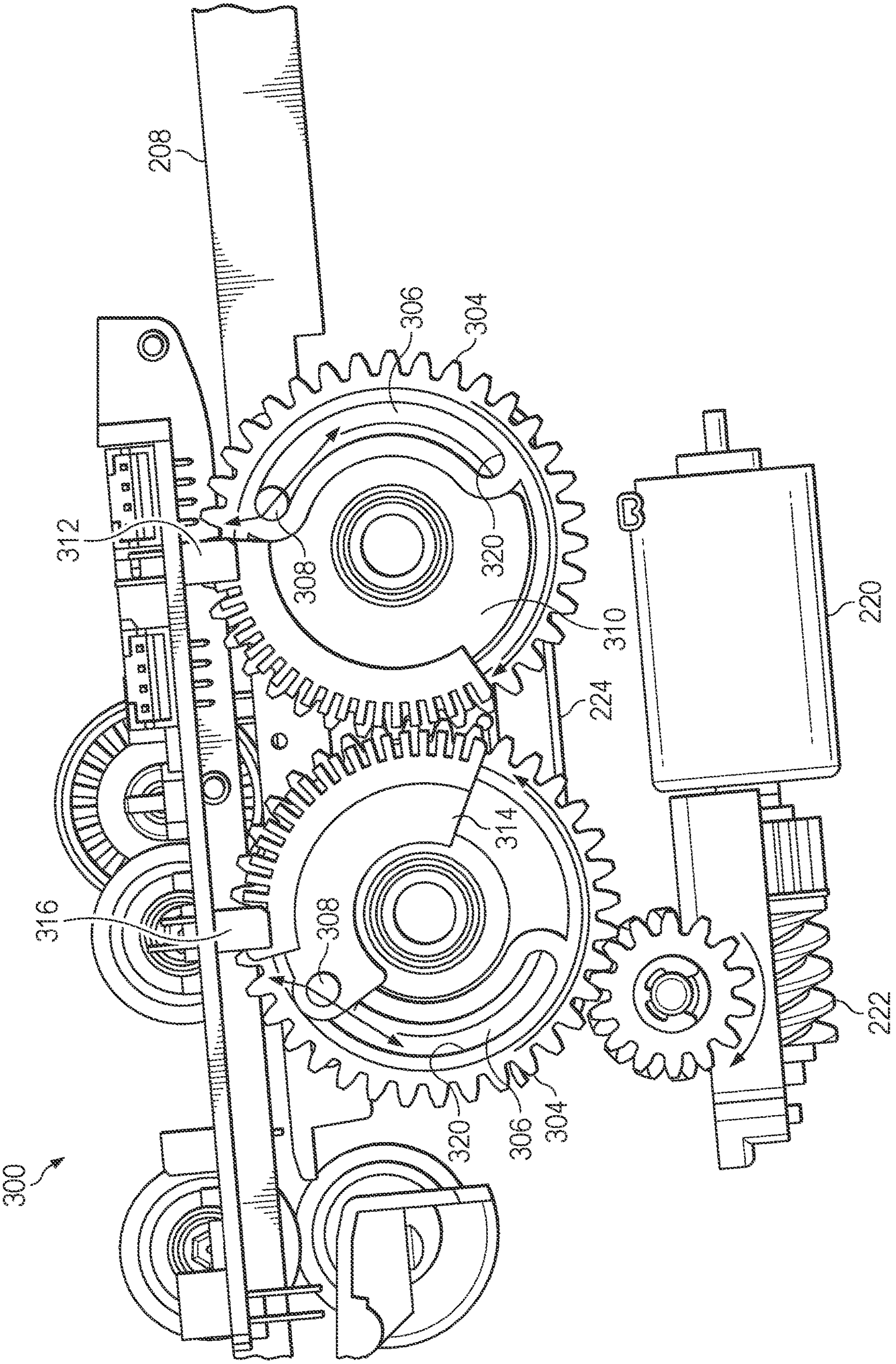
Figure 3P:
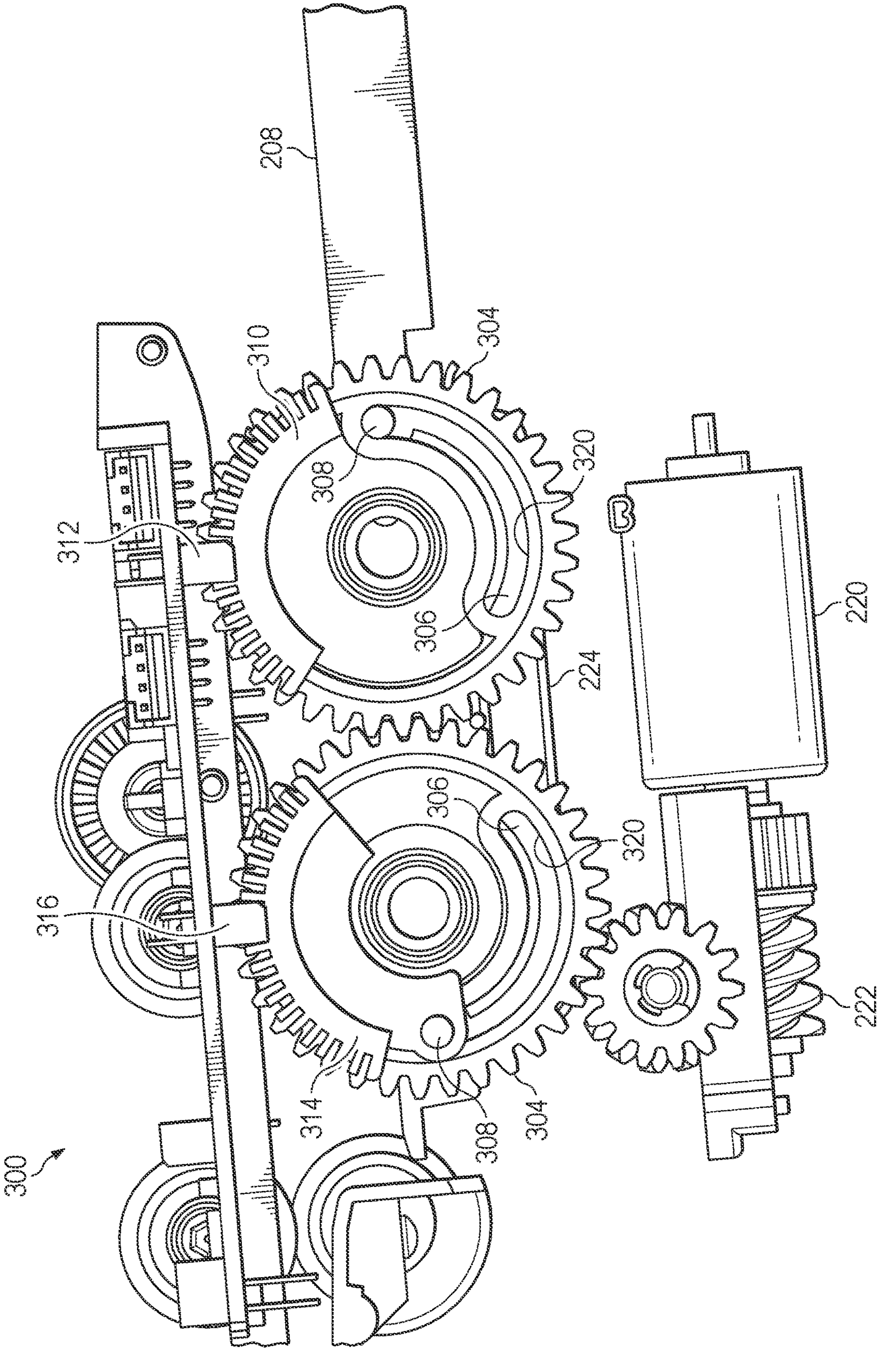
Figure 3Q:
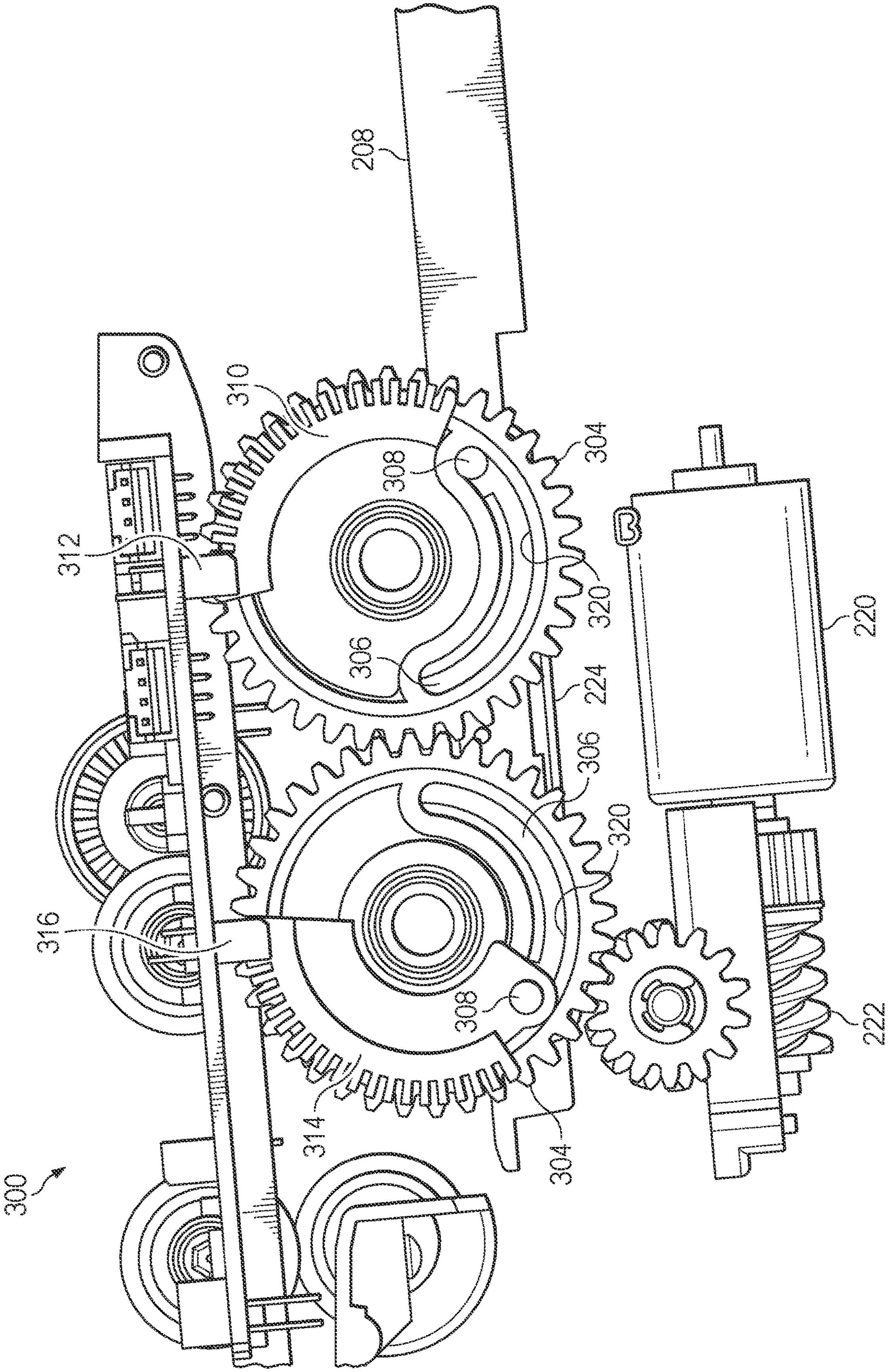
Figure 3R:
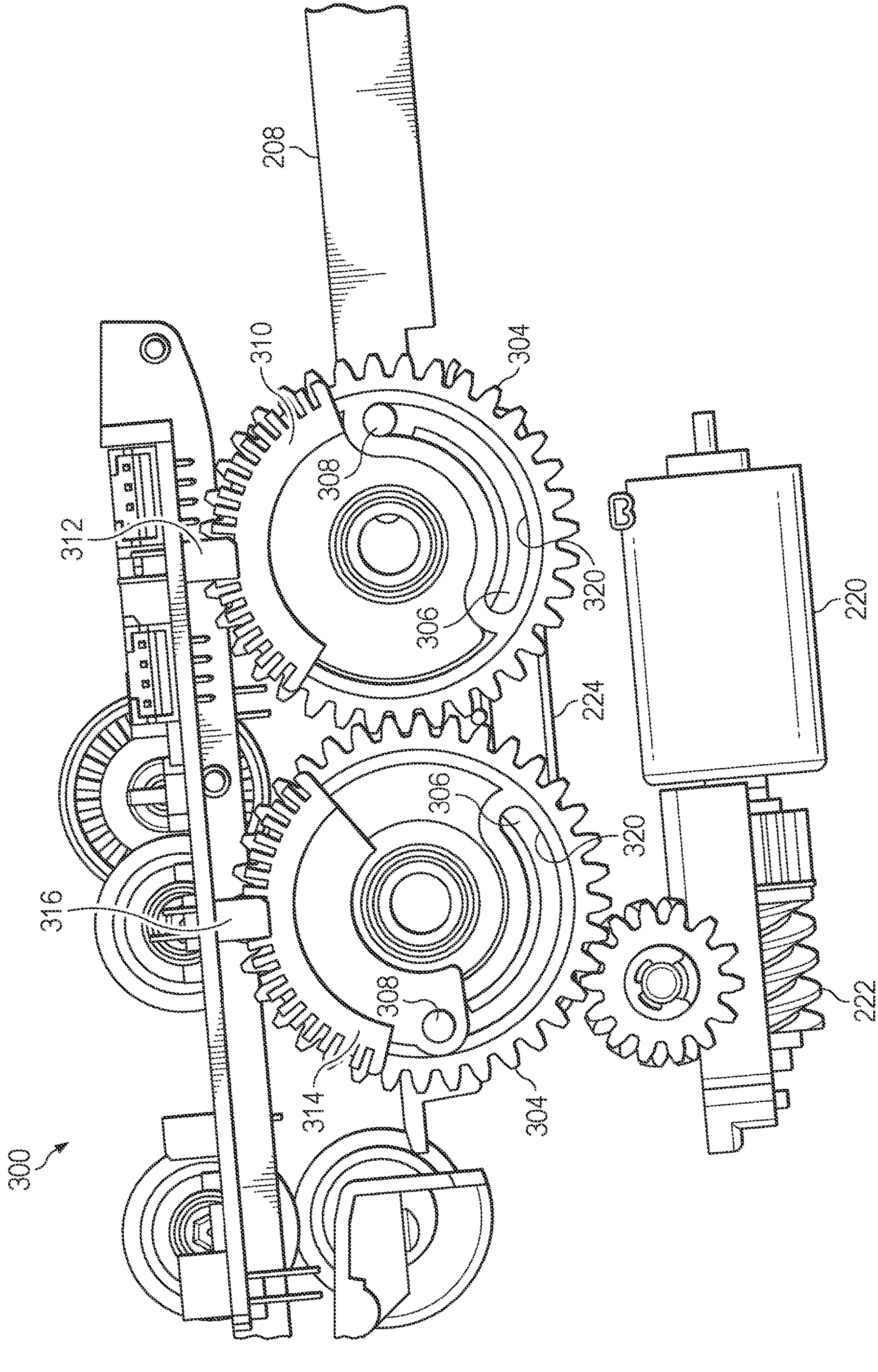
Figure 3S:
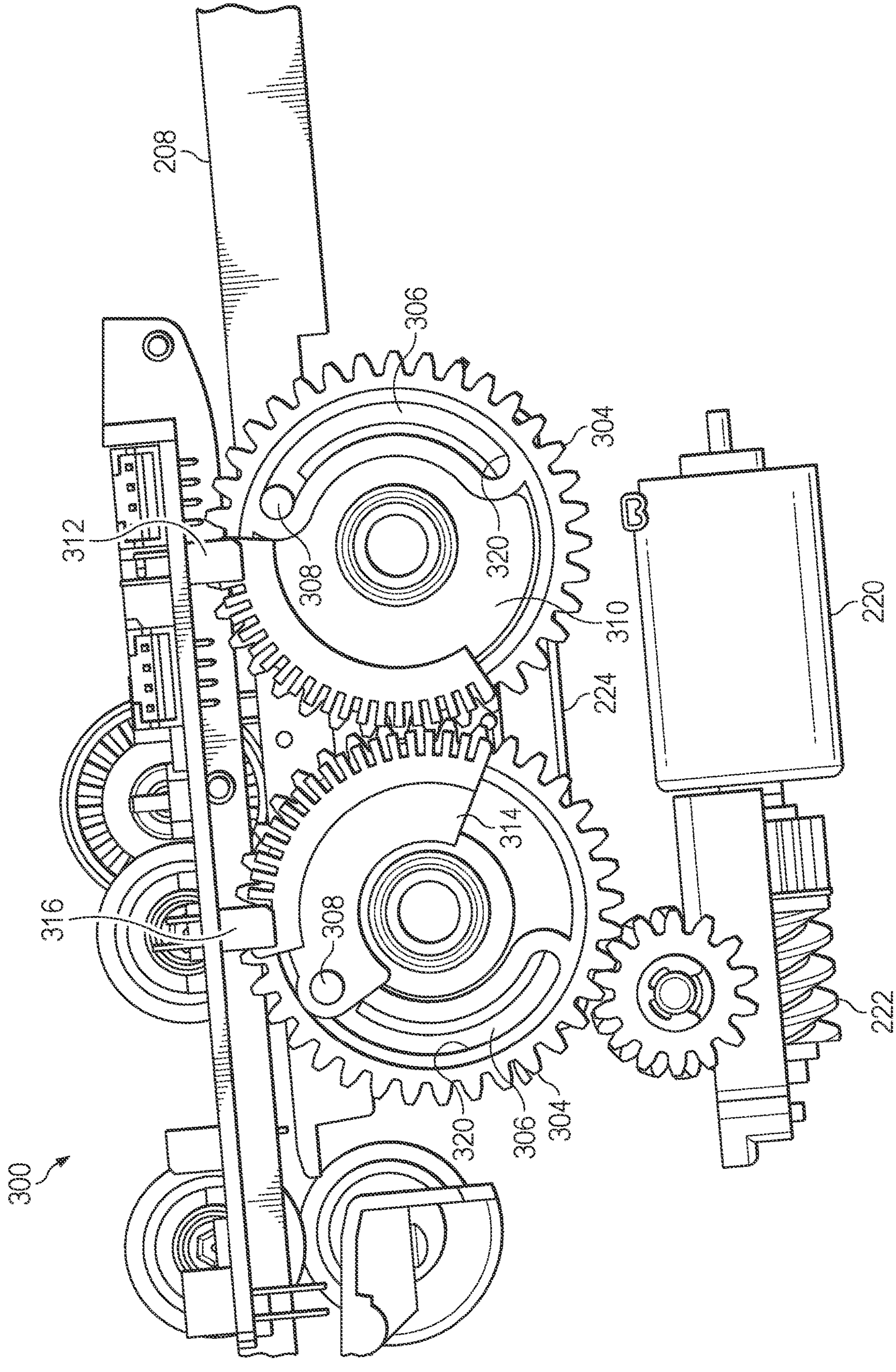

FIGS. 3A through 3S illustrates an example movement mechanism 300 for a landing platform 208 in accordance with various embodiments of the present disclosure. In particular, FIG. 3A illustrates components for adjusting a landing platform 208; FIG. 3B illustrates components for adjusting a landing platform 208; FIG. 3C illustrates components for adjusting a landing platform 208; FIG. 3D illustrates components for adjusting a landing platform 208; FIG. 3E illustrates components for adjusting a landing platform 208; FIG. 3F illustrates components for adjusting a landing platform 208; FIG. 3G illustrates components for adjusting a landing platform 208; FIG. 3H illustrates components for adjusting a landing platform 208; FIG. 3I illustrates an operation of the landing platform 208; FIG. 3J illustrates an operation of the landing platform 208; FIG. 3K illustrates an operation of the landing platform 208; FIG. 3L illustrates an operation of the landing platform 208; FIG. 3M illustrates an operation of the landing platform 208; FIG. 3N illustrates an operation of the landing platform 208; FIG. 3O illustrates an operation of the landing platform 208; FIG. 3P illustrates an operation of the landing platform 208; FIG. 3Q illustrates a position of a landing platform 208; FIG. 3R illustrates a position of a landing platform 208; FIG. 3S illustrates a position of a landing platform 208. In FIGS. 3A through 3S, the landing platform 208 can be referred to as a pressure plate.

As shown in FIG. 3A, the bulk banknote feeder 200 can include a number of components of a movement mechanism 300 for adjusting the landing platform 208. For example, the movement mechanism 300 for adjusting the landing platform 208 include a motor encoder 302, multiple position gears 304, landing platform cranks 306, landing platform pins 308, a motor 220, a gear train 222, springs 224, a motor tach segment 310, motor encoder 312, landing platform tach segment 314, landing platform encoder 316, etc.

As shown in FIG. 3B, the landing platform 208 is connected to a plurality of landing platform pins 308. The landing platform pins 308 are formed in a cylinder shape and extend from the landing platform 208. The landing platform pins 308 can interface with the landing platform 208 via slots 318 in the landing platform 208. The landing platform slots 318 are located on the landing platform 208 in a plane to be perpendicular to the motion of the landing platform 208.

As shown in FIG. 3C, the landing platform pins 308 are also inserted into landing platform cranks 306 and slots 320 in the position gears 304. The platform cranks 306 can rotate the landing platform pins 308 within the position gear slots 320 in order to move the landing platform 208. As shown in FIG. 3D, the landing platform pins 308 can travel within the slots 320 of the position gears 304.

As shown in FIG. 3E, an upward force can be transferred to the landing platform 208 through the landing platform pins 308. The upward force on the landing pins 308 can be generated through forces from the motor 220 and the spring 224. When the spring 224 is extended through movement of the landing platform 208, the motor 220 can increase force to rotate the landing platform pins 308 to raise the landing platform 208 and can reduce force to allow the landing platform pins 308 to rotate in an opposite direction to lower the landing platform 208. When the spring 224 is compressed through the movement of the landing platform 208, the motor 220 can reduce force on the landing platform pins 308 to allow the springs 224 to raise the landing platform 208 and can increase force on the landing platform pins 308 to lower the landing platform 208. In both examples, the force applied by the motor 220 is relative to the force applied by the spring 224. When the motor 220 is described as reducing force, the motor 220 could be a bi-directional motor or a motor that is capable of rotating both directions. When the force of the motor 220 is described as being reduced, the force could be applied in the opposite direction. However, the spring 224 is used to move the position gears in an opposite direction from the movement of the motor 220.

As shown in FIG. 3F, the landing platform pins can translate rotational forces from the motor 220 and linear forces from the spring 224 to raise or lower the landing platform 208. The motor 220 can rotate the gear train 222, which can change the rotational direction of the force. The gear train 222 is connected to the landing platform crank 306, which is used to rotate the landing platform pins 308 within the slots 318. The rotational force of the landing platform pins 308 at an edge of the slots 318 rotates the position gears 304.

As shown in FIG. 3G, the motor tach segment 310 is directly connected to a landing platform pin 308 and a landing platform tach segment 314 is directly connected to another landing platform pin 308. As shown in FIG. 3H, the motor tach segment 310 is rotatably attached to one of the position gears 304 and a landing platform tach segment 314 is attached to another of the position gears 304. As shown in FIG. 3I, the motor 220 rotates causing the position gears to rotate in the directions shown, while the spring force of the landing platform 208 lifts the landing platform 208 and pressure pins within the rotating slots of the position gears. The tach segments rotate in sync. As the motor tach segment 310 rotates, a motor encoder 312 can track and register the rotation of the corresponding position gear 304. As the landing platform tach segment 314 rotates, a landing platform encoder 316 can track and register the rotation of the corresponding position gear 304.

As shown in FIG. 3J, the landing platform 208 is adjusted to a mid-height. As shown in FIG. 3K, once the landing platform 208 reaches a stop, the landing platform pins 308 can no longer move while the position gears can continue to rotate. As shown in FIG. 3L, the landing platform pins 308 stops rotating and the motor tach segment can continue rotating.

As shown in FIG. 3M, the landing platform 208 can be stopped at a level based on design components. For instance, the landing platform can stop adjusting once reaching a size of a single note opening 236. As shown in FIG. 3N, the landing platform 208 can be stopped on a banknote bunch 214. The position gears 304 can continue to rotate through a length of the slot 318, 320.

As shown in FIG. 3O, the motor 220 rotates in the directions shown to lower the landing platform 208. Once the slots 318, 320 contact the pins 308, the rotational force overcomes the spring force and lowers the pins 308, which in turn lowers the landing platform 208. As shown in FIG. 3P, by counting tach pulses, the landing platform 208 can be positioned at any height. The bulk banknote feeder 200 can use the tach pulses to determine a level of the landing platform 208. FIGS. 3Q, 3R, and 3S illustrate the landing platform 208 in a bottom position, a middle position, and a top position, respectively.

Figure 4A:
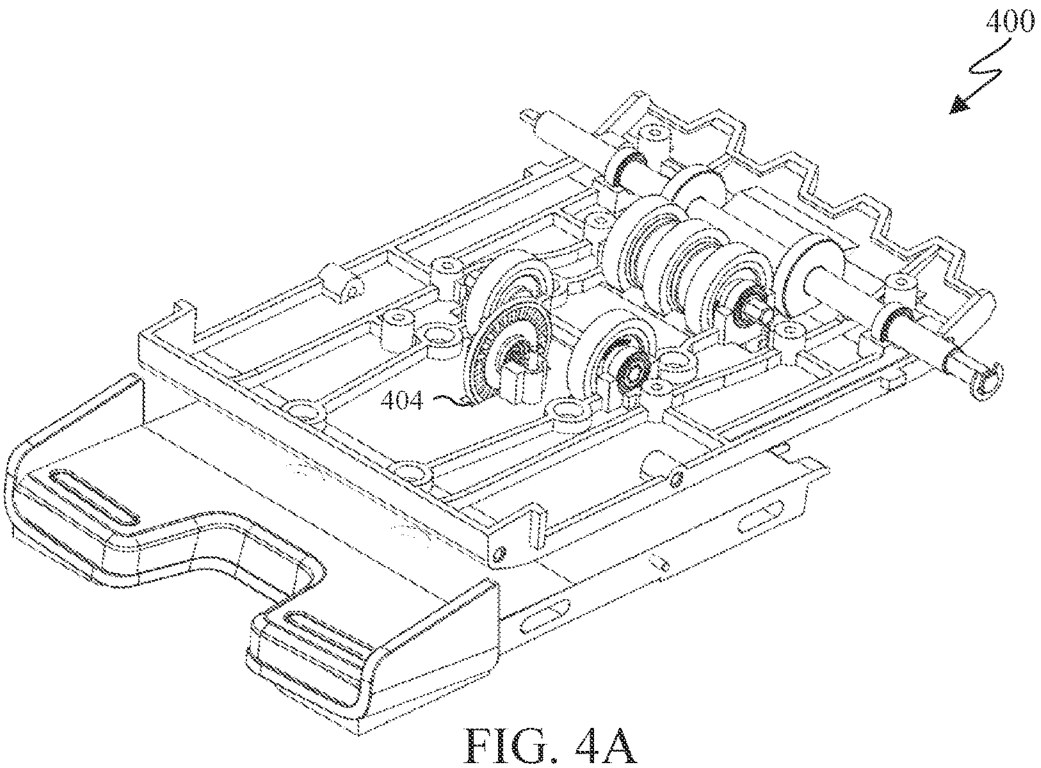
FIGS. 4A through 4L illustrate an example trailing edge sensor in accordance with various embodiments of the present disclosure.
Figure 4B:
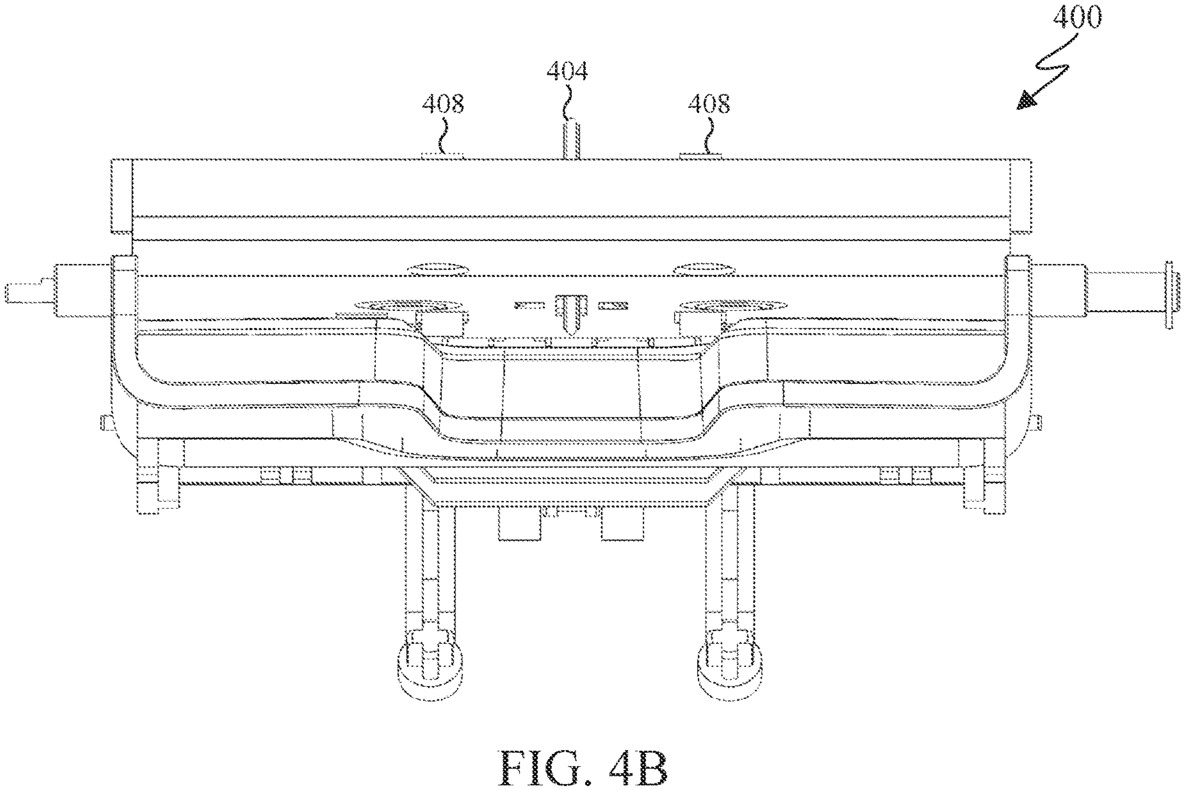
Figure 4C:
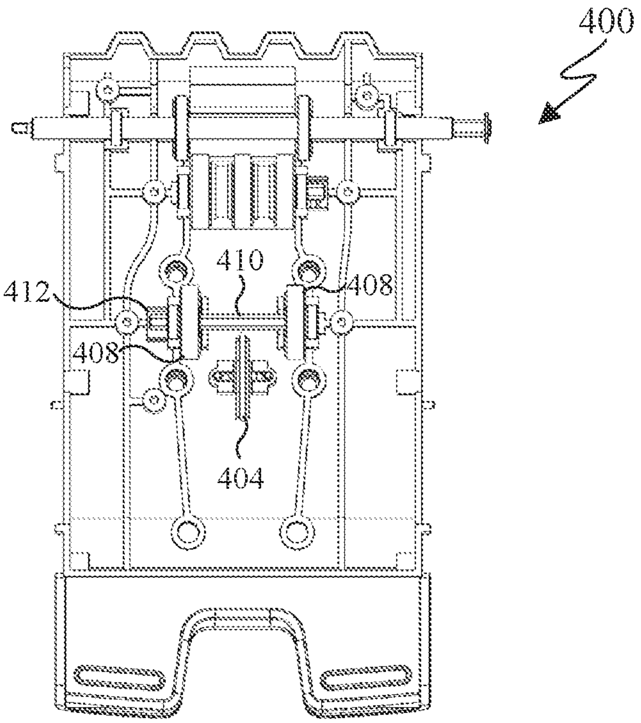
Figure 4D:
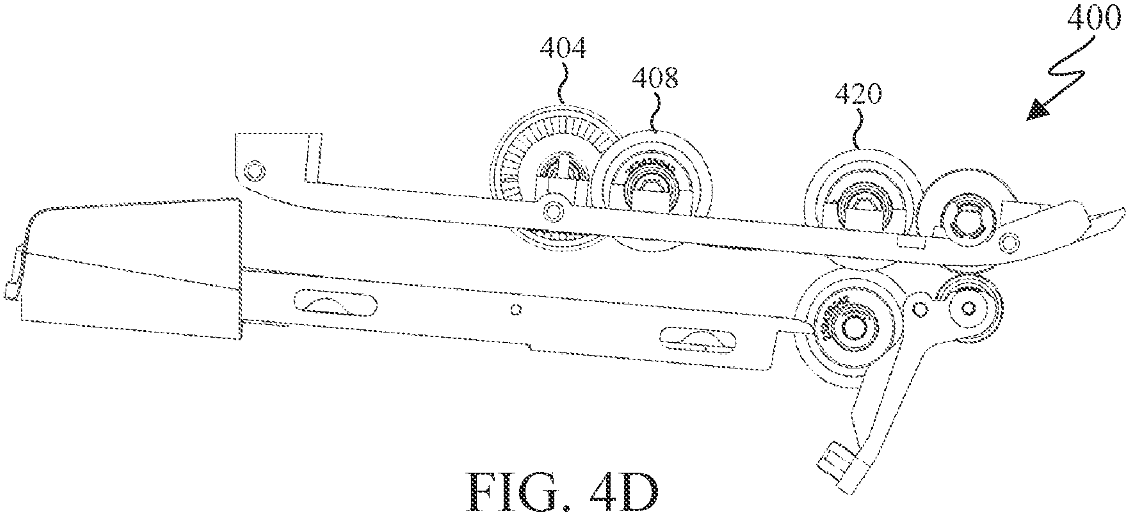
Figure 4E:
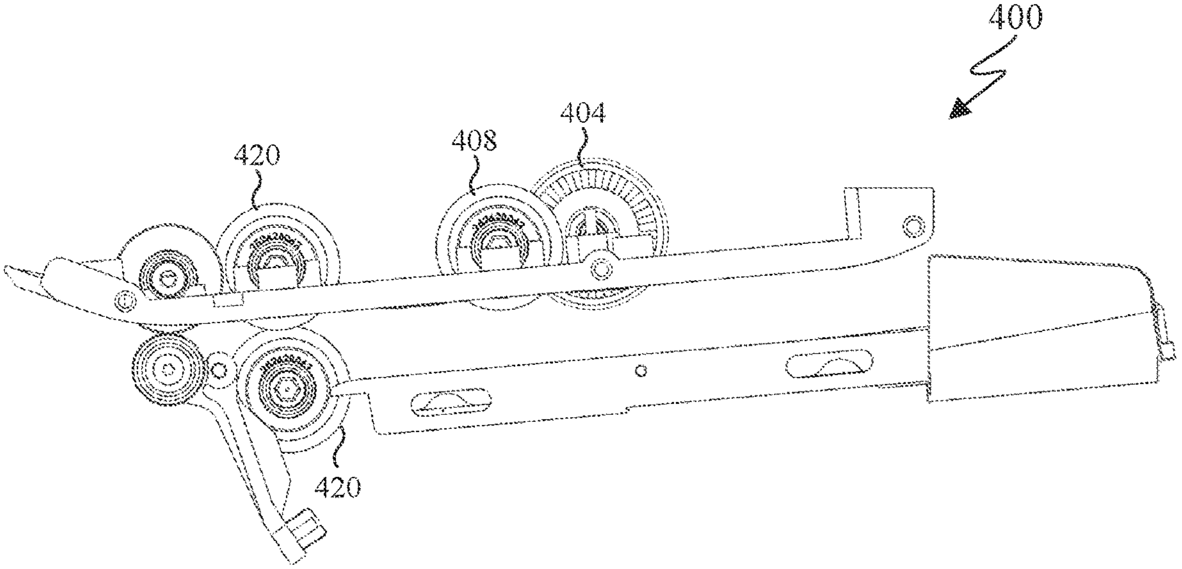
Figure 4F:
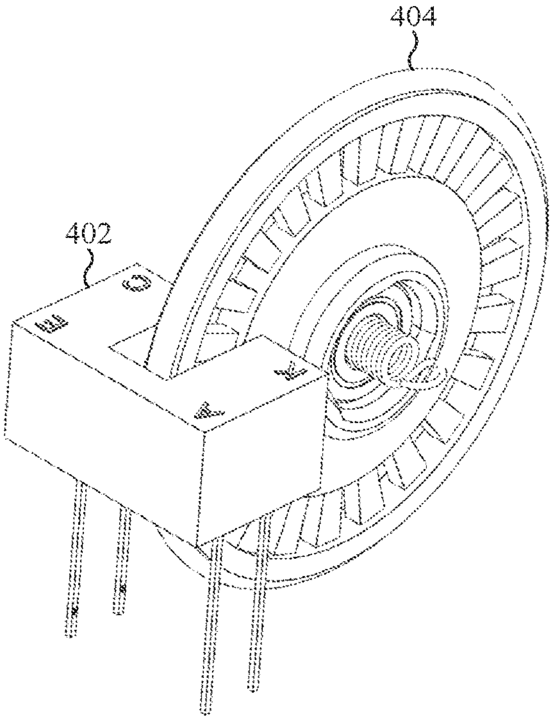
Figure 4G:
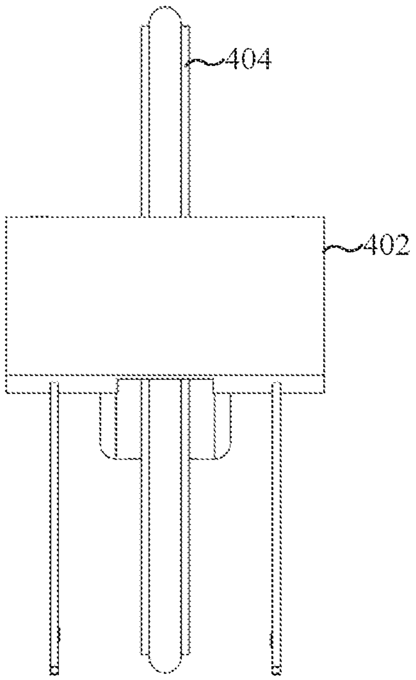
Figure 4H:
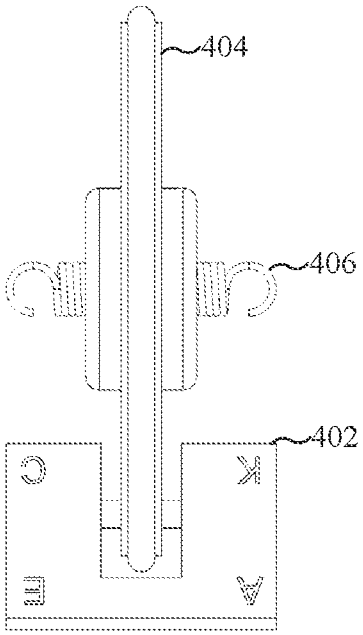
Figure 4I:
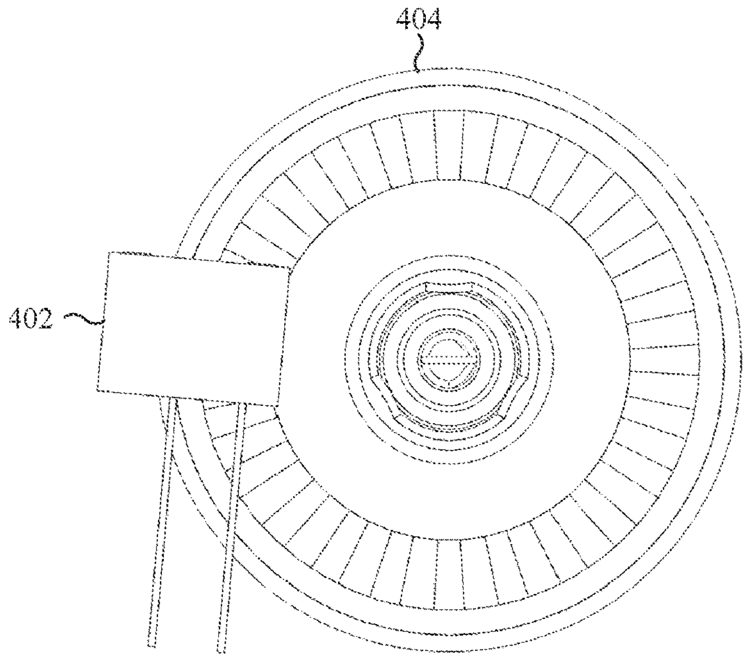
Figure 4J:
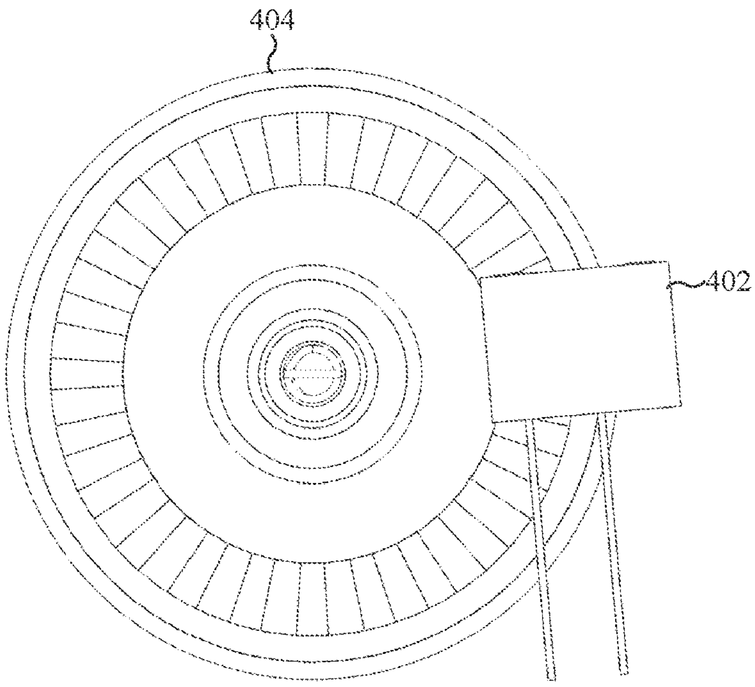
Figure 4K:
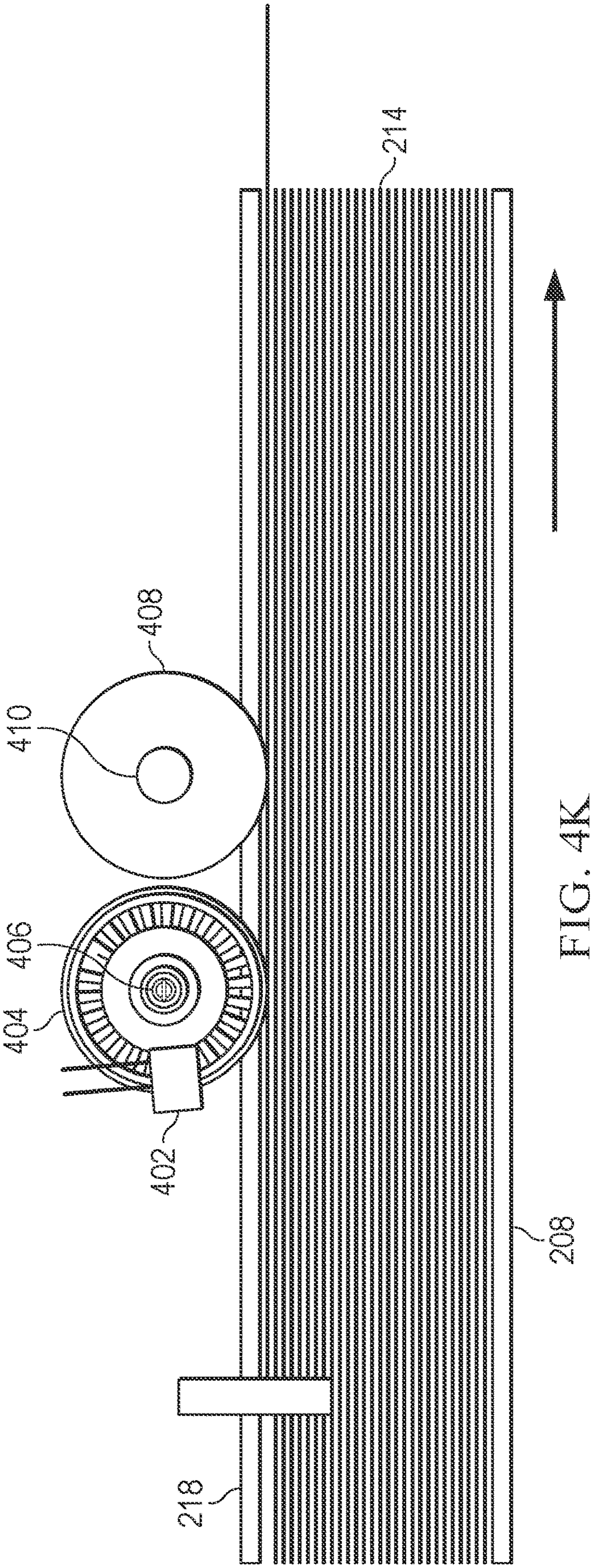

FIGS. 4A through 4L illustrate an example trailing edge sensor arrangement 400 in accordance with various embodiments of the present disclosure. In particular, FIG. 4A illustrates a trailing edge sensor 228 on a top surface 218 of an accept inlet 202, FIG. 4B illustrates a front view of a trailing edge sensor arrangement 400, FIG. 4C illustrates a top view of a trailing edge sensor arrangement 400, FIG. 4D illustrates a side view of a trailing edge sensor arrangement 400, FIG. 4E illustrates a side view of a trailing edge sensor arrangement 400, FIG. 4F illustrates a tach sensor 402, FIG. 4G illustrates a front view of a tach sensor 402, FIG. 4H illustrates a top view of a tach sensor 402, FIG. 4I illustrates a side view of a tach sensor 402, FIG. 4J illustrates a side view of a tach sensor 402, and FIG. 4K illustrates a trailing edge sensor 228 processing a banknote bunch 214.

As shown in FIGS. 4A through 4K, the bulk banknote feeder 200 can include a trailing edge sensor 228. The trailing edge sensor 228 can include a tach sensor 402 attached to an idle wheel 404 and at least one spring 406, and at least one driving wheel 408 attached to a shaft 410. The trailing edge sensor 228 can be applied to a top surface 218 of the accept inlet 202 where the landing platform 208 a lower or bottom surface of the accept inlet 202.

A banknote bunch 214 can be inserted into the accept inlet 202 of the bulk banknote feeder 200. The banknote bunch 214 can be detected in the accept inlet 202 and the motor 220 for the landing platform 208 can be activated to raise the landing platform 208. Once the landing platform 208 is in position for processing, the banknote bunch 214 contacts the trailing edge sensor 228.

Once the banknote bunch 214 is in position for processing, a motor 412 for the driving wheels 408 is activated. The motor 412 causes the shaft 410 to rotate the driving wheels 408. In certain embodiments, one or more motors 412 can be utilized for driving one or more shafts 410. Driving wheels 408 can be applied to separate shafts 410 and separate motors 412. Multiple driving wheels 408 can be applied to a singular shaft 410 with one or more motors 412. Driving wheels 408 can be applied to a combination of separate or grouped shafts 410 each with one or more motors 412.

In certain embodiments, a mechanism to move the idle wheel 404 is configured to introduce contact between the idle wheel 404 and the first banknote. The platform 208 is configured to actively move the idle wheel 404. In certain embodiments, the mechanism to move the idle wheel 404 can be a passive system lifted by a banknote.

The driving wheels 408 can apply a rotational force to shift a top banknote in the banknote bunch 214 towards the transport mechanism into the bulk banknote feeder 200. The advancement of the top banknote in the banknote bunch 214 causes the idle wheel to rotate. The idle wheel 404 does not have an active rotation component but is rotated by the advancement of a top banknote in a banknote bunch 214. The idle wheel 404 can rotate on a spring 406 attached to the accept inlet 202. The spring 406 allows for the idle wheel 404 to float in the accept inlet 202 but also ensures that the idle wheel 404 can contact the top banknote of the banknote bunch 214. The spring 406 is attached in the accept inlet 202 in a manner that the idle wheel 404 extends slightly further from the top surface 218 of the accept inlet 202 towards the banknote bunch 214. In other words, a distance between idle wheel 404 and the landing platform 208 is less than a distance between the driving wheel 408 and the landing platform 208. For example, the idle wheel 404 can extend a millimeter past the driving wheel 408 from the top surface 218 of the accept inlet 202. In certain embodiments, the idle wheel 404 can rotate on a shaft instead of spring 406. The shaft could be supported by springs to keep the idle wheel 404 in contact with a banknote in the banknote bunch 214. In certain embodiments, a braking element is configured to stop the idle wheel 404 when the banknote is not pulling the idle wheel 404. In certain embodiments, a start sensor is used to detect if the last banknote has left the platform 208. Once the signal that indicates a last banknote has left the platform 208 has been received from the start sensor, signals from the tach sensor 402 are disregarded.

The tach sensor 402 is positioned proximately to the idle wheel 404 to measure a rotation of the idle wheel 404. As the driving wheel 408 advances the banknote that rotates the idle wheel 404, the tach sensor 402 can detect the rotation. The tach sensor 402 can measure an amount of rotation of the idle wheel 404. In certain embodiments, the tach sensor 402 could be acoustic, magnetic, capacitive, or any other type of suitable tach sensor.

Figure 4L:
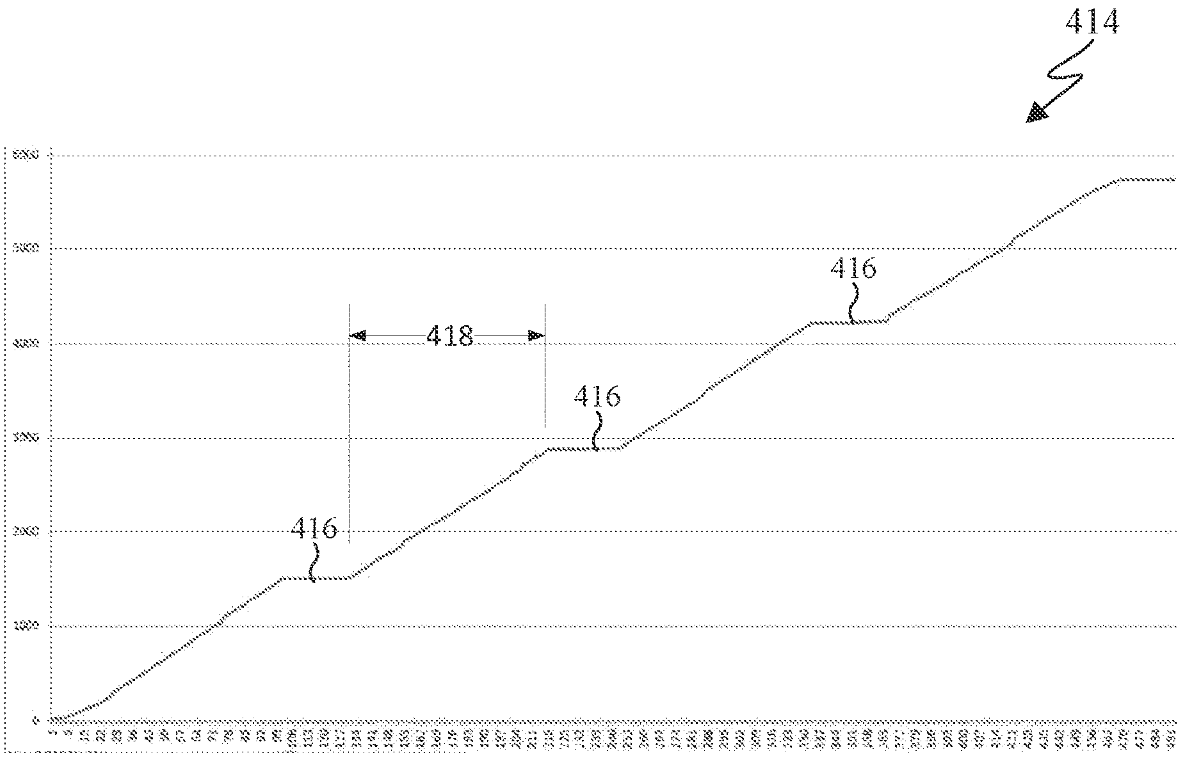

FIG. 4L shows a tach sensor reading 414 of a plurality of banknotes. The movement for each banknote rotates the idle wheel 404 until the trailing edge of each banknote is pulled past the idle wheel 404. Once the trailing edge of each banknote passes the idle wheel 404, the spring 406 causes the idle wheel 404 into contact with a second banknote from the top of the banknote bunch 214. While the top banknotes are advancing to the bulk banknote feeder 200, the second banknote should be stationary. The idle wheel 404 in turn stops rotating, which can be identified as the flat portions 416 of the tach sensor reading 414. The amount of rotation can be known based on the denominations of the banknotes that are accepted by the bulk feeder. When the bulk feeder system continues to detect movement of the idle wheel 404 past a banknote distance threshold 418, the bulk feeder system can determine that the top banknote and the second banknote are advancing as stacked banknotes. Distances or banknote lengths are based on a speed of the system and timing of the signal stopping. Using an optical sensor directly on the banknotes would be difficult for certain banknotes that are formed with plastics.

The bulk feeder system can stop the advancing of the stacked banknotes and reverse the direction to the driving wheels 408. The driving wheels 408 can be used in an attempt to separate the top banknote from the second banknote. When the banknotes are separated, the top banknote and the second banknote can be advanced separately. In order for the bulk banknote feeder 200 to detect a trailing edge of a banknote, the tach sensor 402 detects that the idle wheel 404 is not rotating for a specified period of time. After the specified period of time, the bulk banknote system determined that the banknote has passed the idle wheel 404 and turns off the motor 412 rotating the shaft 410 and driving wheels 408.

One or more separation wheels 420 can be located after the driving wheels 408. The separation wheels 420 can be used to separate banknotes that are determined to be stacked by the tach sensor 402. The top and bottom separation wheels 420 can rotate in a same direction to put opposite forces on the top banknote and the stacked second banknote. A dual detection magnetic sensor is located after the separation wheels and can provide a secondary stacked banknote decision before leaving the bulk banknote feeder 200. When the dual detection magnetic sensor detects that the banknote is no longer in the banknote bunch 214, the bulk feeder system operates the driving wheels 408 to begin advancing the second banknote of the banknote bunch 214. The tach sensor 402 can begin detecting rotation of the idle wheel 404.

Figure 5A:
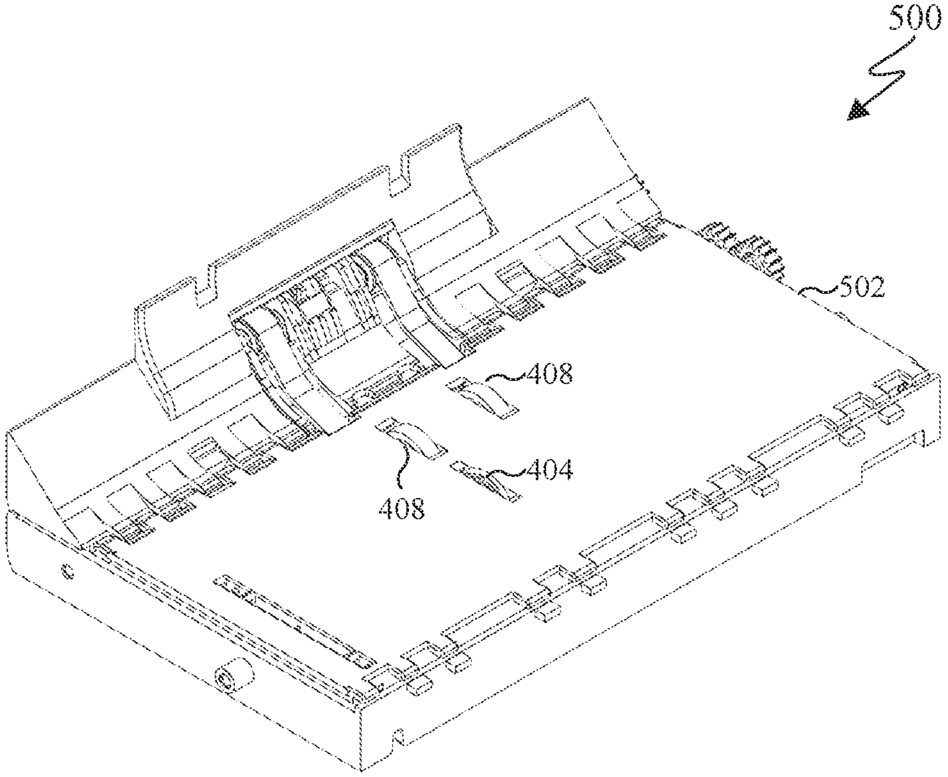
FIGS. 5A and 5B illustrate an example trailing edge sensor in accordance with various embodiments of the present disclosure.
Figure 5B:
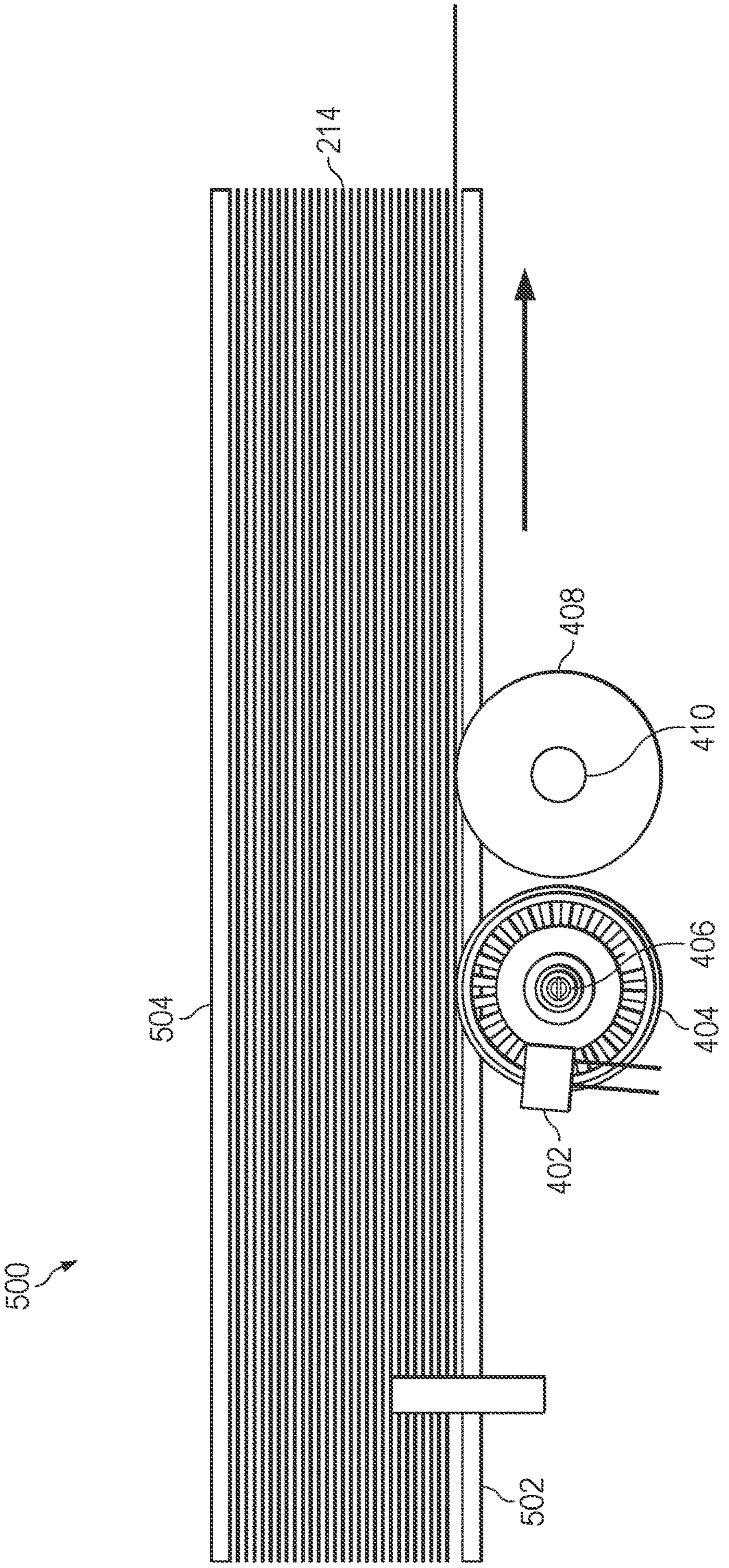

FIGS. 5A and 5B illustrate an example trailing edge sensor 228 on a bottom plate 502 of a banknote feeder 500 in accordance with various embodiments of the present disclosure. In particular, FIG. 5A illustrates a trailing edge system positioned on a bottom plate 502 of an accept inlet 202 of a banknote feeder 500, and FIG. 5B illustrates a trailing edge system removing banknotes from a bottom plate 502 of a banknote bunch 214.

As shown in FIGS. 5A and 5B, the bulk banknote feeder 500 can include a trailing edge sensor 228 on a bottom plate 502. The trailing edge sensor 228 can include a tach sensor 402 attached to an idle wheel 404 and at least one spring 406 and at least one driving wheel 408 attached to a shaft 410.

The trailing edge sensor 228 can be applied to a bottom plate 502 of the accept inlet 202. The bulk banknote feeder 500 can have an adjustable top plate 504. The adjustable top plate 504 can have similar components for adjusting as the landing platform 208.

A banknote bunch 214 can be inserted into the accept inlet 202 of the bulk banknote feeder 200. The banknote bunch 214 can be detected in the accept inlet 202 and the top plate 504 can be adjusted to apply pressure to the banknote bunch 214. Once the top plate 504 is in position for processing, pressure is applied to the banknote bunch 214 against the trailing edge sensor 228, including the idle wheel 404 and the driving wheels 408.

Once pressure is applied to the banknote bunch 214, a motor 412 for the driving wheels 408 is activated. The motor 412 causes the shaft 410 to rotate the driving wheels 408. In certain embodiments, one or more motors 412 can be utilized for driving one or more shafts 410. Driving wheels 408 can be applied to separate shafts 410 and separate motors 412. Multiple driving wheels 408 can be applied to a singular shaft 410 with one or more motors 412. Driving wheels 408 can be applied to a combination of separate or grouped shafts 410 each with one or more motors 412.

The driving wheels 408 can apply a rotational force to shift a bottom banknote in the banknote bunch 214 towards the transport mechanism into the bulk banknote feeder 200. The advancement of the bottom banknote in the banknote bunch 214 causes the idle wheel 404 to rotate. The idle wheel 404 does not have an active rotation component but is rotated by the advancement of a bottom banknote in a banknote bunch 214. The idle wheel 404 can rotate on a spring 406 attached to the accept inlet 202. The spring 406 allows for the idle wheel 404 to float in the accept inlet 202 but also ensures that the idle wheel 404 can contact the bottom banknote of the banknote bunch 214. The spring 406 is attached in the accept inlet 202 in a manner that the idle wheel 404 extends slightly further from the bottom plate 502 of the accept inlet 202 against the banknote bunch 214. In other words, a distance between idle wheel 404 and the top plate 504 is less than a distance between the driving wheel 408 and the top plate 504. For example, the idle wheel 404 can extend a millimeter past the driving wheel 408 from the bottom surface 502 of the accept inlet 202.

The tach sensor 402 is positioned proximately to the idle wheel 404 to measure a rotation of the idle wheel 404. As the driving wheel 408 advances the banknote that rotates the idle wheel 404, the tach sensor 402 can detect the rotation. The tach sensor 402 can measure an amount of rotation of the idle wheel 404.

The bulk feeder system can stop the advancing of the stacked banknotes and reverse the direction to the driving wheels 408. The driving wheels 408 can be used in an attempt to separate the bottom banknote from the second banknote. When the banknotes are separated, the bottom banknote and the second banknote can be advanced separately. In order for the bulk banknote feeder 200 to detect a trailing edge of a banknote, the tach sensor 402 detects that the idle wheel 404 is not rotating for a specified period of time. After the specified period of time, the bulk banknote system determined that the banknote has passed the idle wheel 404 and turns off the motor 412 rotating the shaft 410 and driving wheels 408.

One or more separation wheels 420 can be located after the driving wheels 408. The separation wheels 420 can be used to separate banknotes that are determined to be stacked by the tach sensor 402. The top and bottom separation wheels 420 can rotate in a same direction to put opposite forces on the bottom banknote and the stacked second banknote. A dual detection magnetic sensor is located after the separation wheels and can provide a secondary stacked banknote decision before leaving the bulk banknote feeder 200. When the dual detection magnetic sensor detects that the banknote is no longer in the banknote bunch 214, the bulk feeder system operates the driving wheels 408 to begin advancing the second banknote of the banknote bunch 214. The tach sensor 402 can begin detecting rotation of the idle wheel 404.

Figure 6A:
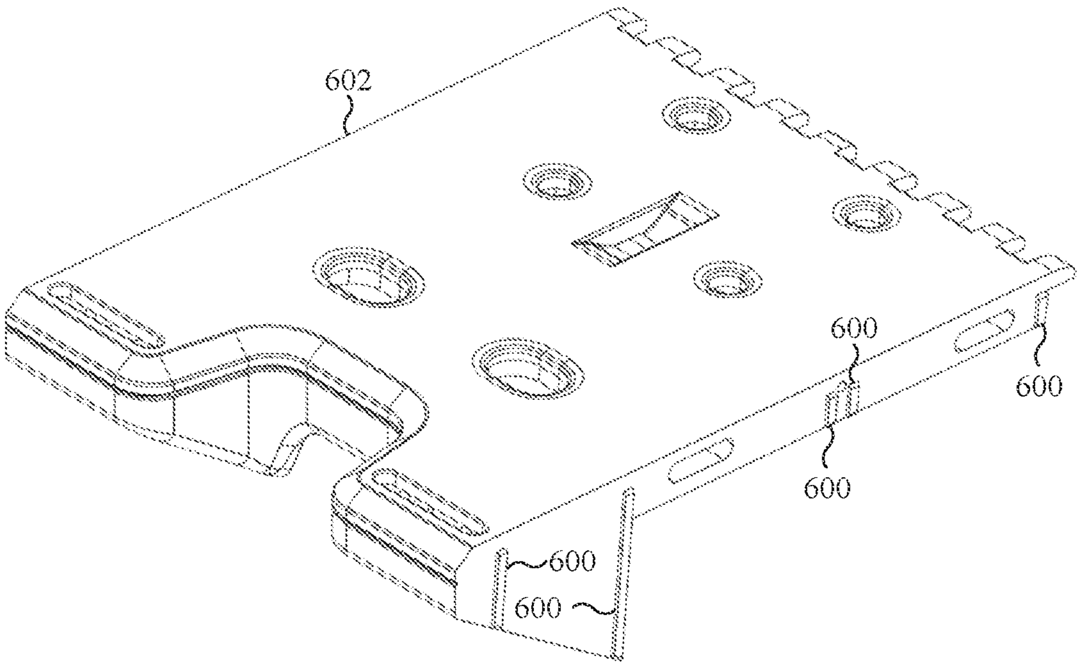
FIGS. 6A through 6O illustrate an example side reduction ribs implements on a platform and side walls in accordance with various embodiments of the present disclosure.
Figure 6B:
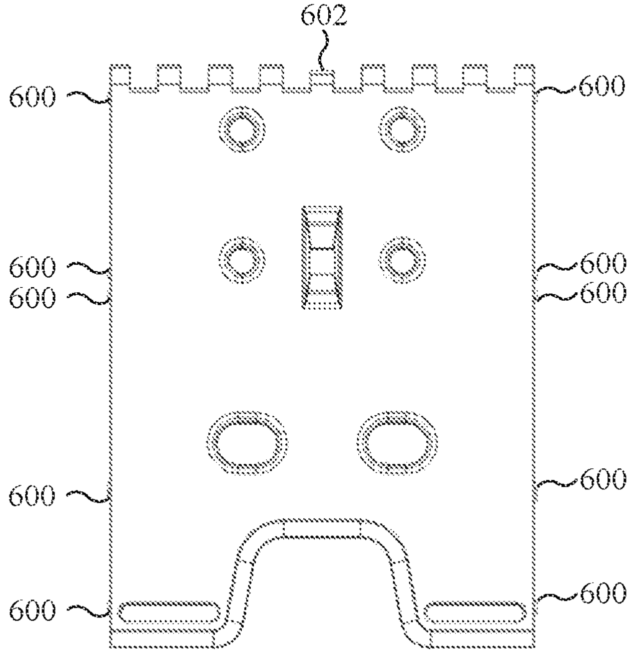
Figure 6C:
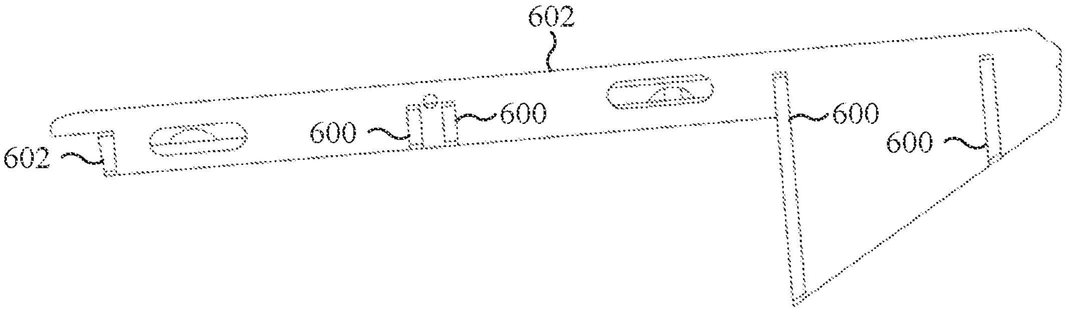
Figure 6D:
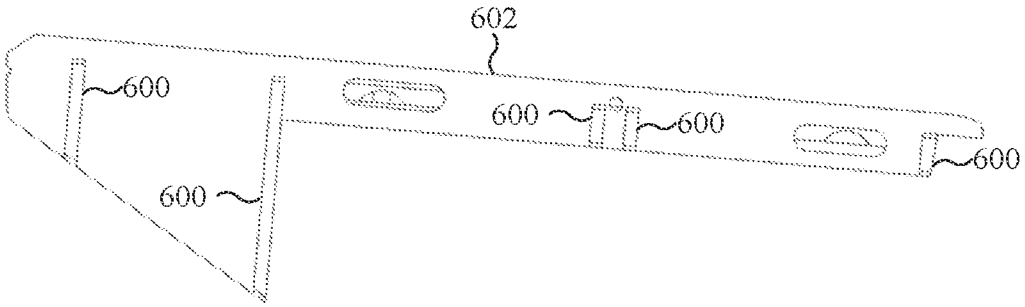
Figure 6E:
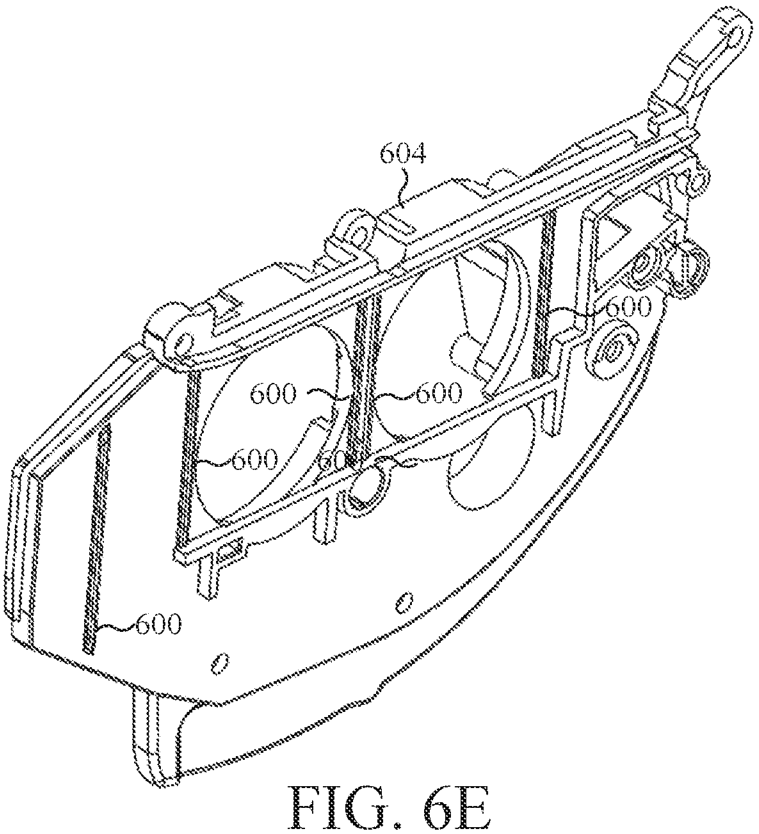
Figure 6F:
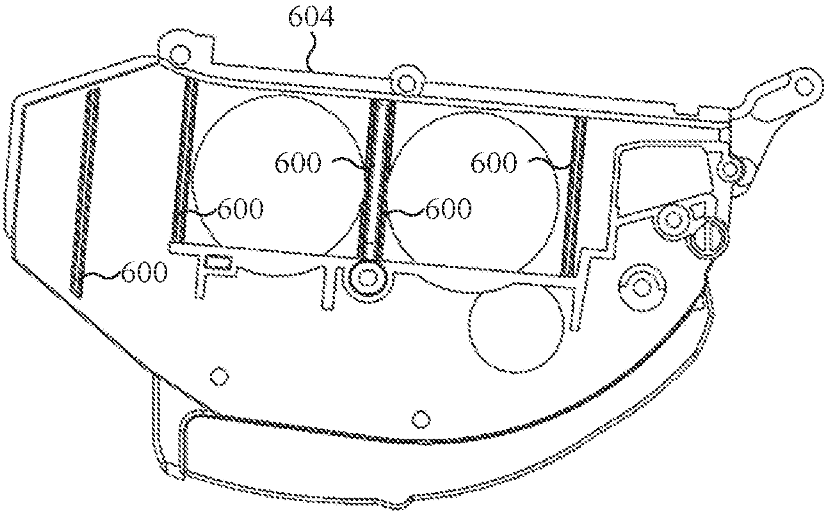
Figure 6G:
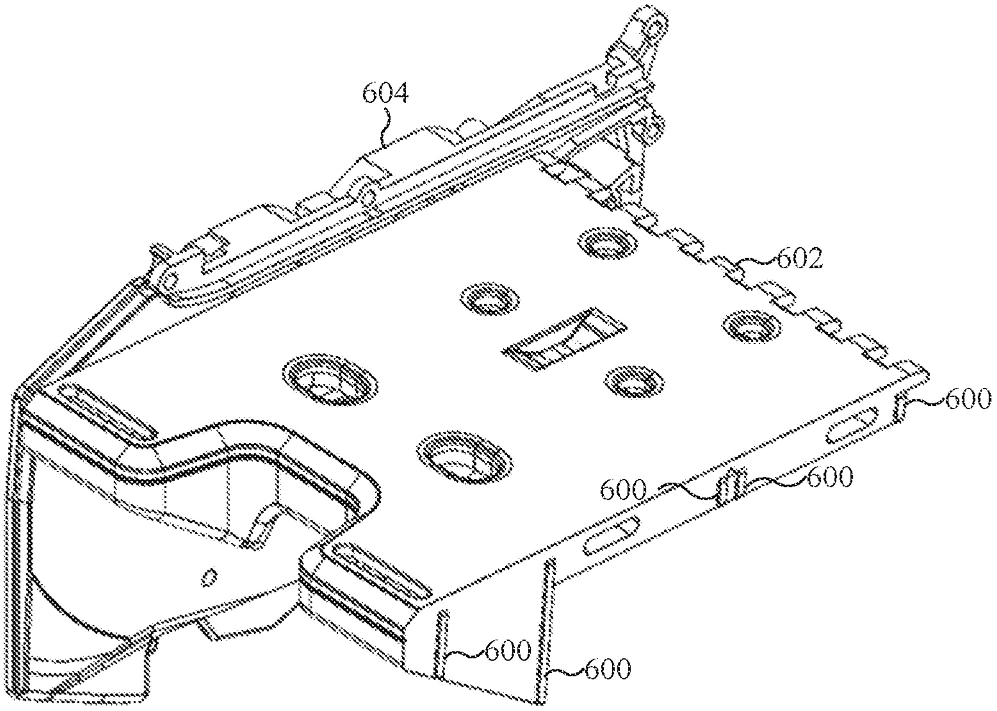
Figure 6H:
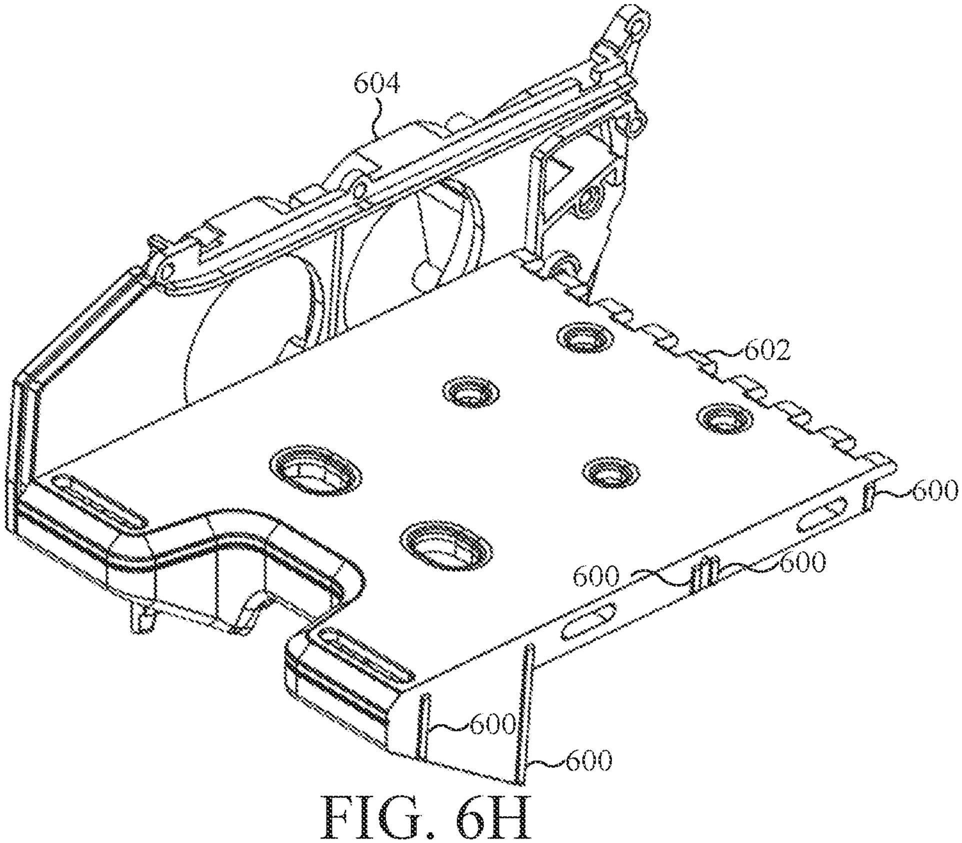
Figure 6I:
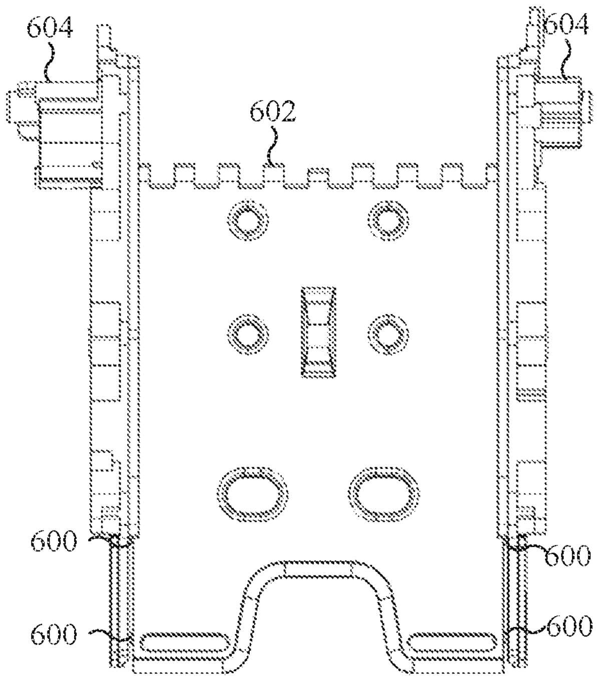
Figure 6J:
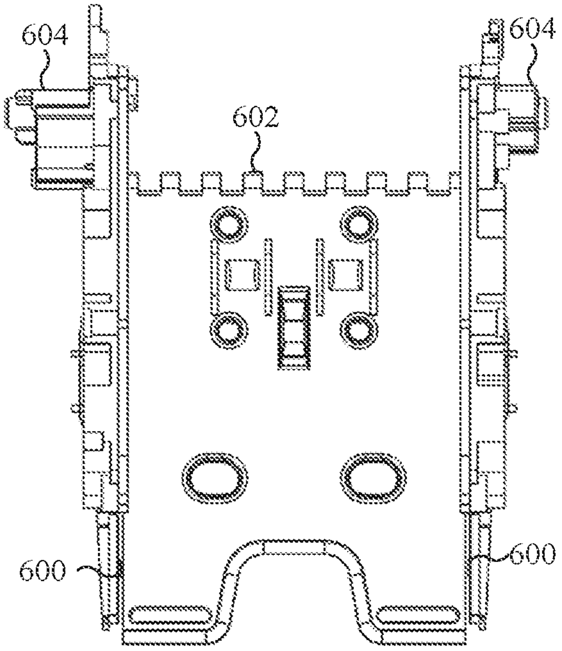
Figure 6K:
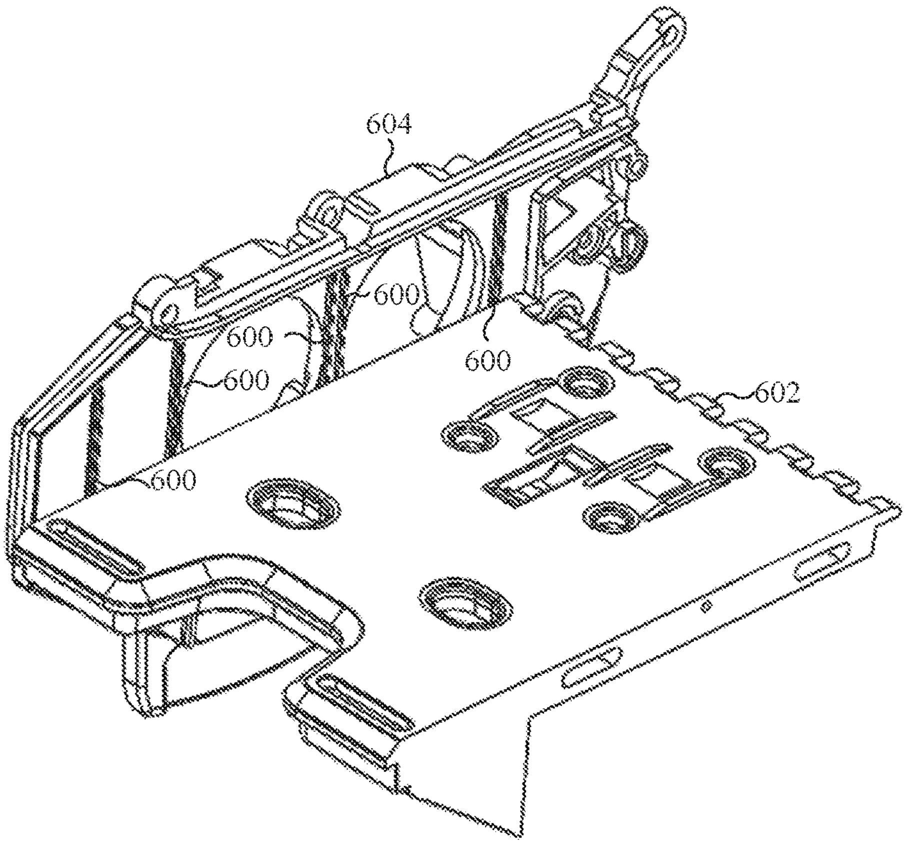
Figure 6L:
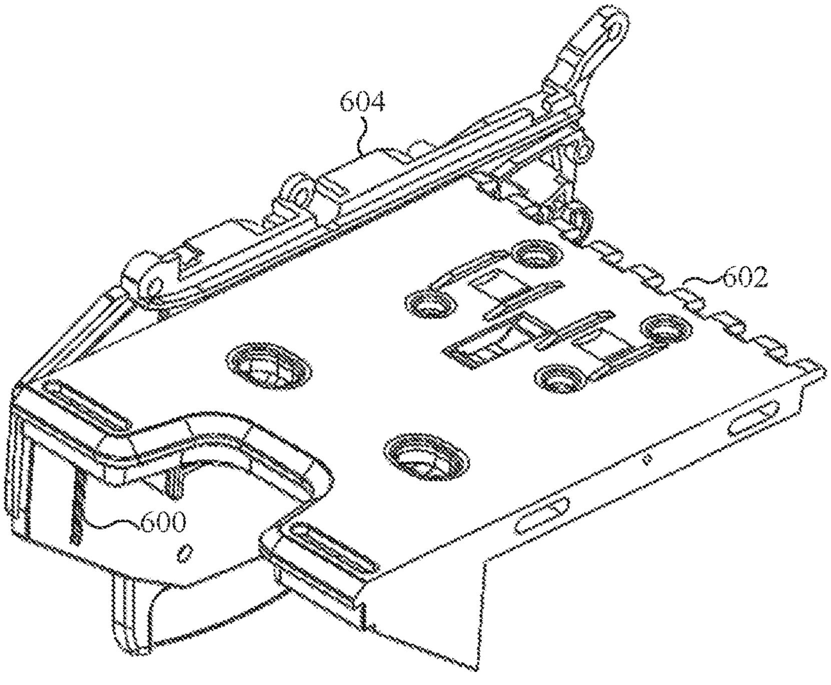
Figure 6M:
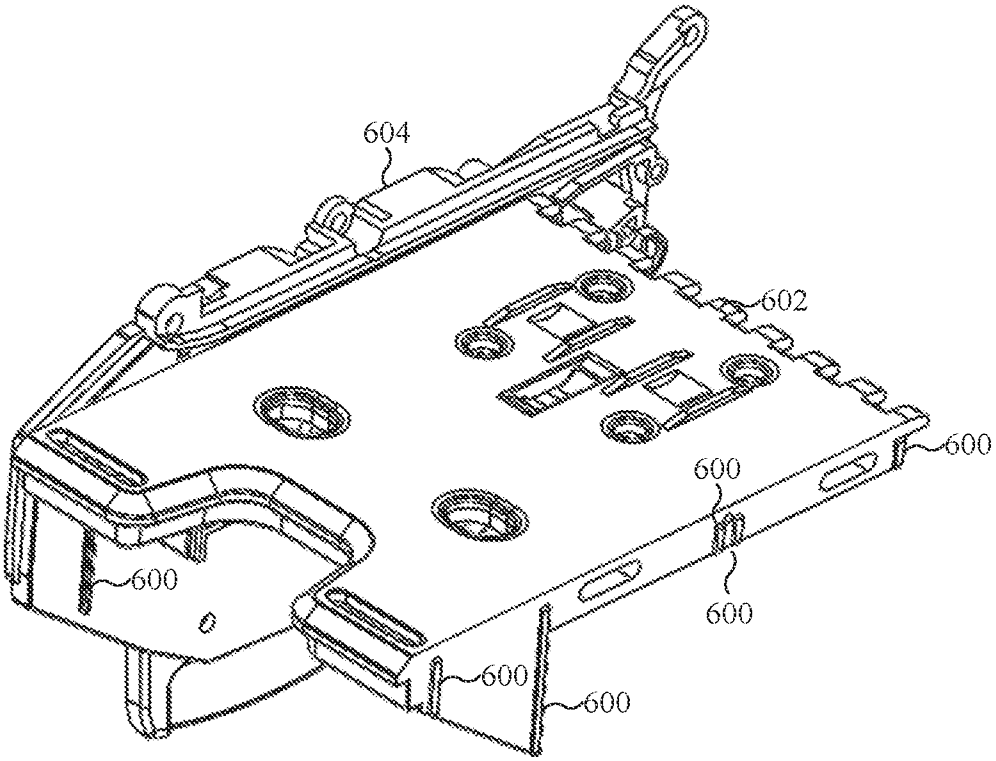
Figure 6N:
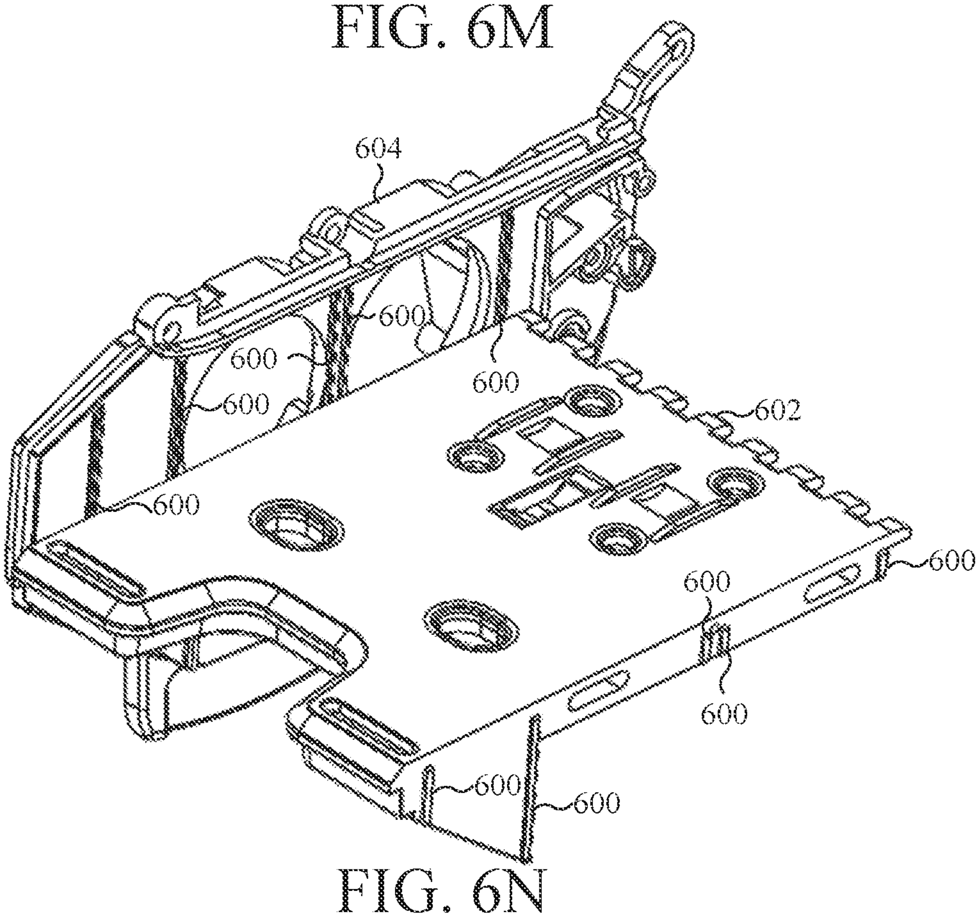
Figure 6O:
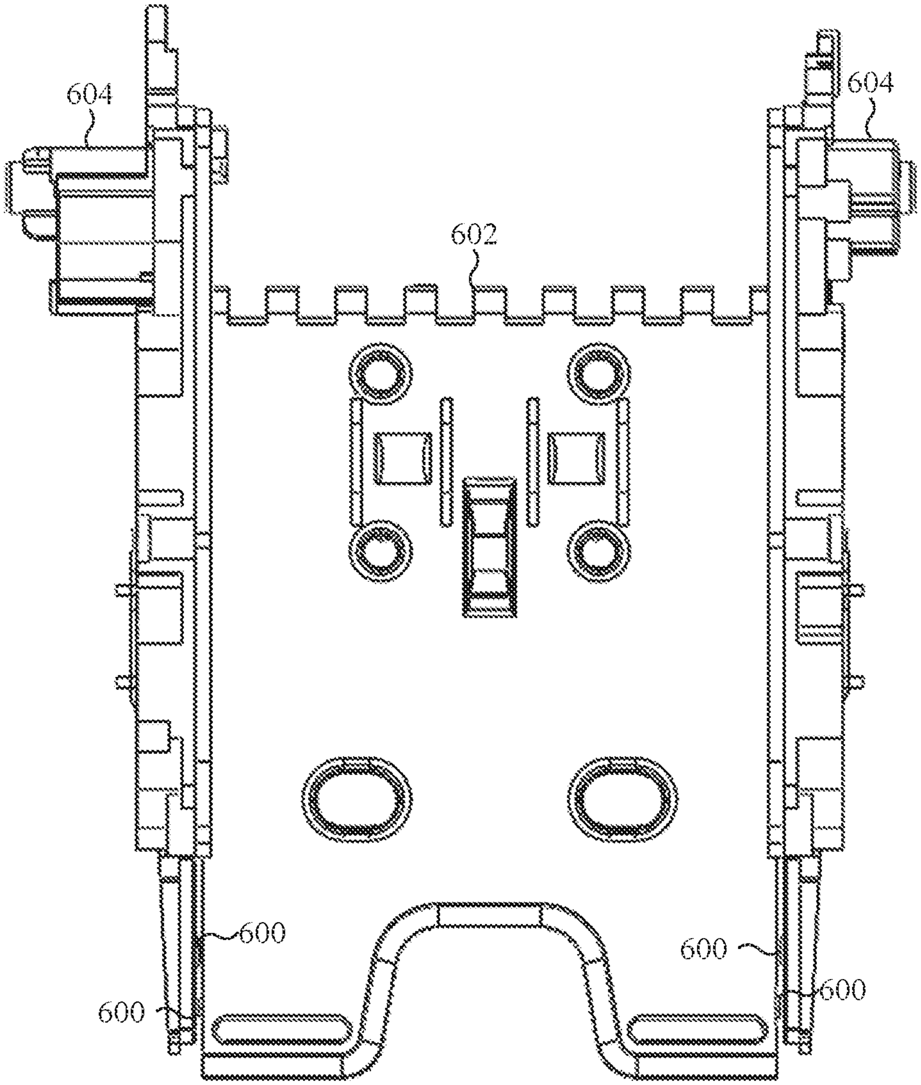

FIGS. 6A through 6O illustrate an example friction reduction ribs 600 implemented on a platform 602 and side walls 602 in accordance with various embodiments of the present disclosure. In particular, FIG. 6A illustrates an perspective view of friction reduction ribs 600 applied to platform 602, FIG. 6B illustrates an example top view of friction reduction ribs 600 applied to platform 602, FIG. 6C illustrates an example first side view of friction reduction ribs 600 applied to platform 602, FIG. 6D illustrates an example second side view of friction reduction ribs 600 applied to platform 602, FIG. 6E illustrates an example perspective view of friction reduction ribs 600 applied to sidewall 604, FIG. 6F illustrates an example side view of friction reduction ribs 600 applied to sidewall 604, FIG. 6G illustrates an example perspective view of friction reduction ribs 600 applied to platform 602 in a raised position, FIG. 6H illustrates an example perspective view of friction reduction ribs 600 applied to platform 602 in a lowered position, FIG. 6I illustrates an example top view of friction reduction ribs 600 applied to platform 602, FIG. 6J illustrates an example top view of friction reduction ribs 600 applied to platform 602, FIG. 6K illustrates an example perspective view of friction reduction ribs 600 applied to sidewall 604 with platform 602 in a raised position, FIG. 6L an example perspective view of friction reduction ribs 600 applied to sidewall 604 with platform 602 in a lowered position, FIG. 6M an example perspective view of friction reduction ribs 600 applied to platform 602 and sidewall 604 with the platform 602 in a raised position, FIG. 6N illustrates an example perspective view of friction reduction ribs 600 applied to platform 602 and sidewall 604 with the platform 602 in a lowered position, and FIG. 6O illustrates an example top view of friction reduction ribs 600 applied to platform 602 and sidewall 604.

As shown in FIGS. 6A through 6O, friction reduction ribs 600 can be applied to each of the platform 602 and sidewalls 604 to enhance stability for the movement of the platform 602. In certain embodiments, the friction reduction ribs 600 can be applied only to the platform 602 or only on the sidewalls 604. In certain embodiments, the friction reduction ribs 600 can be approximately sized for half the distance between the platform 602 and the sidewalls 604. For example, a gap between the platform 602 and the sidewalls 604 could be approximately 1 mm with a 50 micron tolerance which would make the friction reduction ribs 600 approximately 500 microns with a 25 micron tolerance. However, the friction reduction ribs 600 could be any thickness dimensions wall less than a distance between the platform 602 and the sidewalls 604. Where the distance between the platform 602 and the sidewalls 604 along a length of the platform varies, the friction reduction ribs 600 can be sized differently according to the gap between the platform 602 and the sidewalls 604.

Figure 7:
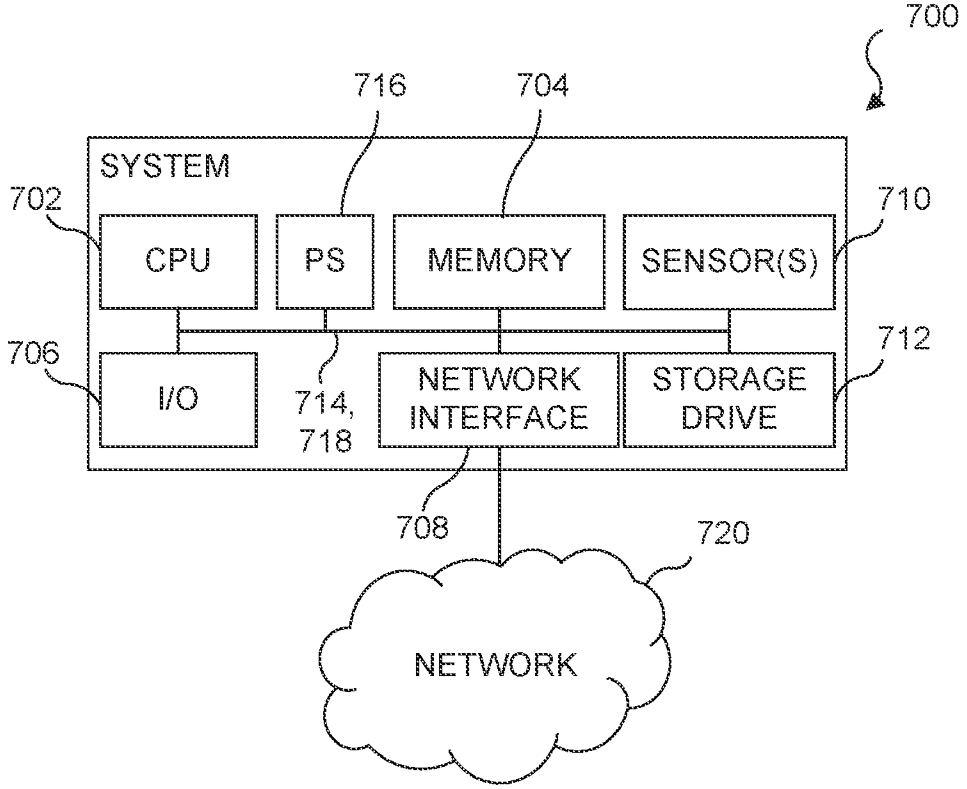
FIGS. 7 and 8 illustrate example electronic systems in accordance with various embodiments of this disclosure.

FIG. 7 illustrates an example electronic device 700 in accordance with various embodiments of this disclosure. The device 700 can be one example of a bulk banknote feeder 200. The system 700 can include a controller (e.g., a processor/central processing unit ("CPU")) 702, a memory unit 704, and an input/output ("I/O") device 706. The device 700 also includes at least one network interface 708, or network interface controllers (NICs). The device 700 further includes at least one capture device 710 for capturing media or inputs to the system through an I/O device. In some embodiments, the capture device is not included. The device 700 also includes a storage drive 712 used for storing content such as PIN inputs. The components 702, 704, 706, 708, 710, and 712 are interconnected by a data transport system (e.g., a bus) 714. A power supply unit (PSU) 716 provides power to components of the system 700 via a power transport system 718 (shown with data transport system 714, although the power and data transport systems may be separate).

It is understood that the system 700 may be differently configured and that each of the listed components may actually represent several different components. For example, the CPU 702 may actually represent a multi-processor or a distributed processing system; the memory unit 704 may include different levels of cache memory, and main memory; the I/O device 706 may include monitors, keyboards, touchscreens, and the like; the at least one network interface 708 may include one or more network cards providing one or more wired and/or wireless connections to a network 720; and the storage drive 712 may include hard disks and remote storage locations. Therefore, a wide range of flexibility is anticipated in the configuration of the system 700, which may range from a single physical platform configured primarily for a single user or autonomous operation to a distributed multi-user platform such as a cloud computing system.

The system 700 may use any operating system (or multiple operating systems), including various versions of operating systems provided by Microsoft (such as WINDOWS), Apple (such as Mac OS X), UNIX, RTOS, and LINUX, and may include operating systems specifically developed for handheld devices (e.g., iOS, Android, RTOS, Blackberry, and/or Windows Phone), personal computers, servers, and other computing platforms depending on the use of the system 700. In some embodiments, the system 700 can be a compact system such as a Raspberry Pi running a Linux-based operating system such as Debian. The operating system, as well as other instructions (e.g., for telecommunications and/or other functions provided by the device 700), may be stored in the memory unit 704 and executed by the processor 702. For example, if the system 700 is, or is part of, the device 700, the memory unit 704 may include instructions for performing some or all of the steps, process, and methods described herein.

The network 720 may be a single network or may represent multiple networks, including networks of different types, whether wireless or wired. For example, the device 700 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the device 700 with external devices.

Figure 8:
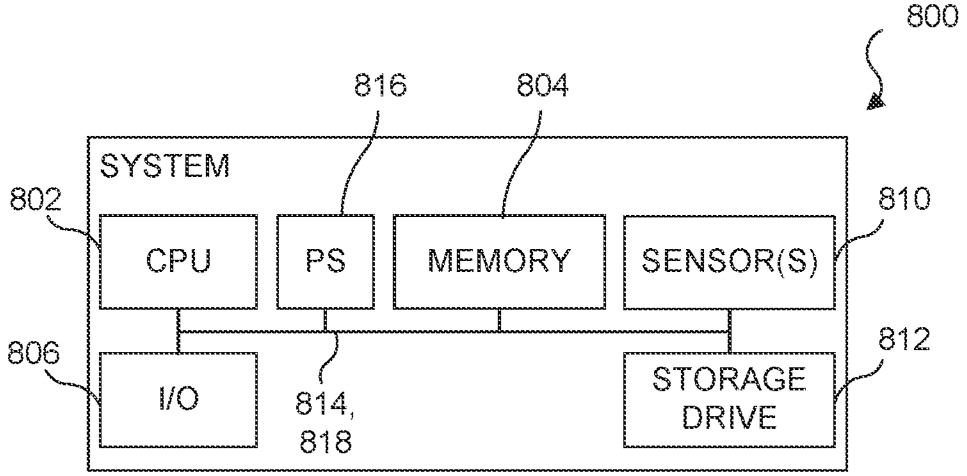

FIG. 8 illustrates an example electronic device 800 in accordance with various embodiments of this disclosure. The device 800 can be one example of a bulk banknote feeder 200. The system 800 includes a controller (e.g., a processor/central processing unit ("CPU")) 802, a memory unit 804, and an I/O device 806. The device 800 further includes at least one capture device 810 for capturing media or inputs to the system through an I/O device. In some embodiments, the capture device is not included. The device 800 also includes a storage drive 812 used for storing content such as PIN inputs. The components 802, 804, 806, 810, and 812 are interconnected by a data transport system (e.g., a bus) 814. A PSU 816 provides power to components of the system 800 via a power transport system 818 (shown with data transport system 814, although the power and data transport systems may be separate).

It is understood that the system 800 may be differently configured and that each of the listed components may actually represent several different components. For example, the CPU 802 may actually represent a multi-processor or a distributed processing system; the memory unit 804 may include different levels of cache memory, and main memory; the I/O device 806 may include monitors, keyboards, touchscreens, and the like; and the storage drive 812 may include hard disks and remote storage locations. Therefore, a wide range of flexibility is anticipated in the configuration of the system 800, which may range from a single physical platform configured primarily for a single user or autonomous operation to a distributed multi-user platform such as a cloud computing system.

The system 800 may use any operating system (or multiple operating systems), including various versions of operating systems provided by Microsoft (such as WINDOWS), Apple (such as Mac OS X), UNIX, RTOS, and LINUX, and may include operating systems specifically developed for handheld devices (e.g., iOS, Android, RTOS, Blackberry, and/or Windows Phone), personal computers, servers, and other computing platforms depending on the use of the system 800. In some embodiments, the system 800 can be a compact system such as a Raspberry Pi running a Linux-based operating system such as Debian. The operating system, as well as other instructions (e.g., for telecommunications and/or other functions provided by the device 800), may be stored in the memory unit 804 and executed by the processor 802. For example, if the system 800 is, or is part of, the device 700, the memory unit 804 may include instructions for performing some or all of the steps, process, and methods described herein.

In various embodiments, a bulk banknote feeder 200 can operate in a single banknote feeding mode 201*a* or a bulk banknote feeding mode 201*b*. The bulk banknote feeder 200 can include an accept inlet 202 and a landing platform 208 installed in the accept inlet 202. The landing platform 208 assembly includes a landing platform 208, landing platform pins 308, landing platform cranks 306, position gears, one or more springs 224, a motor tach segment 310, and a motor tach segment. The landing platform 208 includes slots 318 perpendicular to a motion of the landing platform 208, the landing platform 208 adjusts in relation to an opposing surface of the accept inlet 202. The landing platform pins 308 interface to the slots 318 of the landing platform 208. The landing platform cranks 306 interface with the landing platform pins 308. The position gears 304 can include slots 318, 320 to allow the landing platform pins 308 to travel within the position gears 304. The one or more springs 224 provide rotational force for the landing platform cranks 306 to rotate the landing platform pins 308, the rotational force is translated to an upward force on the landing platform 208.

In various embodiments, a bulk banknote feeder 200 can operate in a single banknote feeding mode 201*a* or a bulk banknote feeding mode 201*b*. The bulk banknote feeder 200 can include an accept inlet 202, a transportation mechanism 226, a landing platform 208, a trailing edge sensor 228, a stacked banknotes sensor 230, a diverter gate 232, a separation wheels 420, and a processor 802 connected to the stacked banknotes sensor 230, the separation wheels 420, and the transportation mechanism 226. The accept inlet 202 is structured to receive a banknote bunch 214. The transportation mechanism 226 is configured to move a banknote along a movement path of the bulk banknote feeder 200. The landing platform 208 can be installed within the accept inlet 202 and is configured to adjust between a single banknote feeding mode 201*a* and a bulk banknote feeding mode 201*b*. The trailing edge sensor 228 can be installed along the movement path and is configured to detect a trailing edge of each banknote. The stacked banknotes sensor 230 can be installed along the movement path and is configured to identify stacked or overlaid banknotes. The diverter gate 232 can be installed along the movement path and configured to reroute refused banknotes that have a trailing edge that has moved past the diverter gate 232 along the movement path. The rerouted refused banknotes are routed to a refuse outlet 204. The separation wheels 420 can be installed along the movement path and are configured to separate stacked banknotes. The processor 802 can be configured to identify, using the stacked banknotes sensor 230, stacked banknotes. The processor 802 is also configured to return, using the transportation mechanism 226, the stacked banknotes that have not cleared the diverter gate 232 to the separation wheels 420. The processor 802 can be further configured to separate, using the separation wheels 420, the stacked banknotes into separated, single banknotes. In addition, the processor 802 can be further configured to move, using the transportation mechanism 226, single banknotes through the movement path as the single banknotes are separated from the stacked banknotes.

A bulk banknote feeder 200 comprising a landing platform 208, a motor 412, a shaft 410 coupled to the motor 412, one or more driving wheels 408 coupled to the shaft 410, an idle wheel 404, a spring 406, a tach sensor 402, separation wheels 420, and a processor 802 coupled to the motor 220, the tach sensor, and the separation wheels 420. The landing platform 208 can receive a banknote bunch 214. The one or more driving wheels 408 can be coupled to the shaft 410, where the motor 412 rotates the one or more driving wheels 408 to advance a top banknote. The idle wheel 404 is in contact with the top banknote and rotates when the top banknote is advanced. The spring 406 in which the idle wheel 404 is mounted is configured to maintain contact of the idle wheel 404 with the top banknote. The tach sensor 402 can be configured to measure a rotation of the idle wheel 404. The separation wheels 420 can separate a top banknote from a stacked banknote. The dual detection magnetic sensor can detect stacked banknotes passing through the separation wheels.

In various embodiments, the bulk banknote feeder 200 can comprise an adjustable landing platform 208. In various embodiments, the processor 802 can stop rotation of the driving wheels 808 when the idle wheel 404 stops rotating. This can help reduce pulling of banknotes underneath the topmost banknote. In various embodiments, the bulk banknote feeder 200 can comprise a stacked banknote sensor 230. The stacked banknote sensor 230 can be optical, magnetic, acoustic, or capacitive. In various embodiments, the tach sensor 402 can be optical, magnetic, capacitive, acoustic, or other type of tach sensor.

In various embodiments, a bulk banknote feeder can include an accept inlet and a processor. The accept inlet can include an adjustable platform. The processor can control the adjustable platform in a single banknote feeding mode to receive single banknotes. The processor can also control the adjustable platform in a bulk banknote feeding mode to receive a banknote bunch of more than one banknote.

In certain embodiments, the adjustable platform is a landing platform at a bottom surface of the accept inlet and is configured to lift the banknote bunch in the bulk banknote feeding mode to a top surface of the accept inlet.

In certain embodiments, the adjustable platform is a top plate at a top surface of the accept inlet and is configured to apply pressure to the banknote bunch against a bottom plate of the accept inlet.

In certain embodiments, the accept inlet further includes a trailing edge sensor on an opposing surface of the accept inlet from the adjustable platform. The processor is further configured to identify a trailing edge of a banknote using the trailing edge sensor.

In certain embodiments, the trailing edge sensor can include an idle wheel, a spring, and a tach sensor. The idle wheel is configured to configured to rotate based on a movement of a first banknote. The spring is positioned through a center of the idle wheel and configured to apply a force on the idle wheel against either the first banknote or a second banknote that is adjacent to the first banknote in the banknote bunch. The tach sensor is configured to measure a rotation of the idle wheel.

In certain embodiments, the trailing edge sensor can further include a driving wheel, a shaft, and a motor. The driving wheel is configured to contact the first banknote. The shaft is coupled to a center of the driving wheel. The motor is coupled to the shaft and configured to rotate the shaft and the driving wheel to the movement of the first banknote by a rotation of the driving wheel contacting the first banknote.

In certain embodiments, a mechanism to move the idle wheel is configured to introduce contact between the idle wheel and the first banknote. The platform is configured to actively move the idle wheel. In certain embodiments, the mechanism to move the idle wheel can be a passive system lifted by a banknote.

In certain embodiments, the processor is further configured to identify that the idle wheel has stopped rotating. The processor is further configured to control the motor to stop rotating the shaft and driving wheel. In certain embodiments, a braking element is added to the idle wheel to stop the idle wheel from rotating when a banknote is not actively rotating the idle wheel. In certain embodiments, the processor discards signals from the tach sensor of the idle wheel when the last banknote has left the platform.

In certain embodiments, the accept inlet further includes a diverter gate installed along a movement path and configured to reroute refused banknotes that have a trailing edge that has moved past the diverter gate along the movement path to a refuse outlet.

In certain embodiments, the accept inlet further includes a stacked banknotes sensor and a separation wheel. The stacked banknotes sensor is installed along a movement path and configured to detect stacked banknotes. The separation wheel is installed along the movement path and configured to separate the stacked banknotes. The processor is further configured to control the separation wheel to separate the stacked banknotes detected by the stacked banknote sensor.

In certain embodiments, the adjustable platform includes slots perpendicular to a movement of the adjustable platform. The accept inlet further includes pins, position gear, and one or more springs. The pins are interfaced to the slots of the adjustable platform. The position gears include slots to interface with the pins and allow the pins to travel within the position gears. The one or more springs are configured to provide a force on the position gears to rotate the pins and move the adjustable platform towards an opposing surface of the accept inlet.

In various embodiments, a method is provided for a bulk banknote feeder including an accept inlet with an adjustable platform. The method includes controlling the adjustable platform in a single banknote feeding mode to receive single banknotes. The method also includes controlling the adjustable platform in a bulk banknote feeding mode to receive a banknote bunch of more than one banknote.

In certain embodiments, the adjustable platform is a landing platform at a bottom surface of the accept inlet and is configured to lift the banknote bunch in the bulk banknote feeding mode to a top surface of the accept inlet.

In certain embodiments, the adjustable platform is a top plate at a top surface of the accept inlet and is configured to apply pressure to the banknote bunch against a bottom plate of the accept inlet.

In certain embodiments, the method further comprises identifying a trailing edge of a banknote using a trailing edge sensor, where the trailing edge sensor is included in the accept inlet on an opposing surface of the accept inlet from the adjustable platform.

In certain embodiments, the method further comprises moving a first banknote to rotate an idle wheel that has a force applied from a spring to force the idle wheel against either the first banknote or a second banknote that is adjacent to the first banknote in the banknote bunch, wherein the spring is positioned through a center of the idle wheel. The method also further comprises measuring a rotation of the idle wheel using a tach sensor.

In certain embodiments, the method further comprises rotating, using a motor coupled to a shaft with a driving wheel, the driving wheel to cause movement of the first banknote by a rotation of the driving wheel contacting the first banknote.

In certain embodiments, the method further comprises identifying that the idle wheel has stopped rotating. The method also further comprises controlling the motor to stop rotating the shaft and driving wheel.

In certain embodiments, the method further comprises rerouting, using a diverter gate installed along a movement path, refused banknotes that have a trailing edge that has moved past the diverter gate along the movement path to a refuse outlet.

In certain embodiments, the method further comprises controlling a separation wheel to separate stacked banknotes detected by a stacked banknote sensor. The stacked banknotes sensor is installed along a movement path and configured to detect the stacked banknotes. The separation wheel is installed along the movement path and configured to separate the stacked banknotes.

In certain embodiments, the method further comprises rotating, using one or more springs coupled to position gears, pins to move the adjustable platform towards an opposing surface. The adjustable platform includes slots perpendicular to a movement of the adjustable platform. The pins are interfaced to the slots of the adjustable platform. The position gears include slots to interface with the pins and allow the pins to travel within the position gears. The one or more springs provide a force on the position gears to rotate the pins and move the adjustable platform towards an opposing surface of the accept inlet.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A bulk banknote feeder comprising:

an accept inlet including an adjustable platform; and a processor configured to:

control the adjustable platform in a single banknote feeding mode to receive single banknotes; and control the adjustable platform in a bulk banknote feeding mode to receive a banknote bunch of more than one banknote, wherein the adjustable platform has different ready positions for the single banknote feeding mode and the bulk banknote feeding mode, and wherein the adjustable platform remains stationary in the ready position during a single banknote feeding operation in the single banknote feeding mode, wherein the accept inlet further includes a trailing edge sensor on an opposing surface of the accept inlet from the adjustable platform; and wherein the processor is further configured to identify a trailing edge of a banknote using the trailing edge sensor, and wherein the trailing edge sensor includes:

an idle wheel configured to rotate based on a movement of a first banknote; and a tach sensor configured to measure a rotation of the idle wheel.

2. The bulk banknote feeder of claim 1, wherein the adjustable platform is a landing platform at a bottom surface of the accept inlet and is configured to lift the banknote bunch in the bulk banknote feeding mode to a top surface of the accept inlet.

3. The bulk banknote feeder of claim 1, wherein the adjustable platform is a top plate at a top surface of the accept inlet and is configured to apply pressure to the banknote bunch against a bottom plate of the accept inlet.

4. The bulk banknote feeder of claim 1, further comprising:

ribs applied to each side of the adjustable platform adjacent to sidewalls of the accept inlet.

5. The bulk banknote feeder of claim 1, further comprising:

ribs applied to a sidewall of the accept inlet adjacent to the adjustable platform.

6. The bulk banknote feeder of claim 1, wherein the accept inlet further includes:

a diverter gate installed along a movement path and configured to reroute refused banknotes that have a trailing edge that has moved past the diverter gate along the movement path to a refuse outlet.

7. The bulk banknote feeder of claim 1, wherein the accept inlet further includes:

a stacked banknotes sensor installed along a movement path and configured to detect stacked banknotes; and a separation wheel installed along the movement path and configured to separate the stacked banknotes, wherein the processor is configured to control the separation wheel to separate the stacked banknotes detected by the stacked banknote sensor.

8. The bulk banknote feeder of claim 1, wherein:

the adjustable platform includes slots perpendicular to a movement of the adjustable platform, and the accept inlet further includes:

pins interfaced to the slots of the adjustable platform;

position gears including slots to interface with the pins and allow the pins to travel within the position gears; and one or more springs configured to provide a force on the position gears to rotate the pins and move the adjustable platform towards the opposing surface of the accept inlet.

9. A method for a bulk banknote feeder including an accept inlet with an adjustable platform, the method comprising:

controlling the adjustable platform in a single banknote feeding mode to receive single banknotes; and controlling the adjustable platform in a bulk banknote feeding mode to receive a banknote bunch of more than one banknote, wherein the adjustable platform has different ready positions for the single banknote feeding mode and the bulk banknote feeding mode, and wherein the adjustable platform remains stationary in the ready position during a single banknote feeding operation in the single banknote feeding mode;

identifying a trailing edge of a banknote using a trailing edge sensor, the trailing edge sensor is included in the accept inlet on an opposing surface of the accept inlet from the adjustable platform;

moving a first banknote to rotate an idle wheel that has a force applied from a spring to force the idle wheel against either the first banknote or a second banknote that is adjacent to the first banknote in the banknote bunch; and measuring a rotation of the idle wheel using a tach sensor.

10. The method of claim 9, wherein the adjustable platform is a landing platform at a bottom surface of the accept inlet and is configured to lift the banknote bunch in the bulk banknote feeding mode to a top surface of the accept inlet.

11. The method of claim 9, wherein the adjustable platform is a top plate at a top surface of the accept inlet and is configured to apply pressure to the banknote bunch against a bottom plate of the accept inlet.

12. The method of claim 9, further comprising:

rotating, using a motor coupled to a shaft with a driving wheel, the driving wheel to cause movement of the first banknote by a rotation of the driving wheel contacting the first banknote.

13. The method of claim 12, further comprising:

identifying that the idle wheel has stopped rotating; and controlling the motor to stop rotating the shaft and the driving wheel.

14. The method of claim 9, further comprising:

rerouting, using a diverter gate installed along a movement path, refused banknotes that have a trailing edge that has moved past the diverter gate along the movement path to a refuse outlet.

15. The method of claim 9, further comprising:

controlling a separation wheel to separate stacked banknotes detected by a stacked banknote sensor;

wherein the stacked banknotes sensor is installed along a movement path and configured to detect the stacked banknotes; and wherein the separation wheel is installed along the movement path and configured to separate the stacked banknotes.

16. The method of claim 9, further comprising:

rotating, using one or more springs coupled to position gears, pins to move the adjustable platform towards the opposing surface of the accept inlet, wherein the adjustable platform includes slots perpendicular to a movement of the adjustable platform, wherein the pins are interfaced to the slots of the adjustable platform, wherein the position gears include slots to interface with the pins and allow the pins to travel within the position gears, and wherein the one or more springs provide a force on the position gears to rotate the pins and move the adjustable platform towards the opposing surface of the accept inlet.

* * * * *